US012040965B2

(12) United States Patent
Dutta

(10) Patent No.: US 12,040,965 B2
(45) Date of Patent: Jul. 16, 2024

(54) SUPPORTING MULTICAST COMMUNICATIONS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/781,376

(22) Filed: Feb. 4, 2020

(65) Prior Publication Data

US 2021/0243111 A1 Aug. 5, 2021

(51) Int. Cl.
*H04L 45/16* (2022.01)
*H04L 9/40* (2022.01)
(Continued)

(52) U.S. Cl.
CPC .............. *H04L 45/16* (2013.01); *H04L 12/08* (2013.01); *H04L 12/4641* (2013.01);
(Continued)

(58) Field of Classification Search
None
See application file for complete search history.

(56) References Cited

U.S. PATENT DOCUMENTS

| 7,260,097 B2 * | 8/2007 | Casey .................. H04L 45/502 370/392 |
| 7,710,970 B2 | 5/2010 | Tingle et al. |

(Continued)

FOREIGN PATENT DOCUMENTS

WO    WO 2019/128621 A1    7/2019

OTHER PUBLICATIONS

Lasserre, M., et al., "Virtual Private LAN Service (VPLS) Using Label Distribution Protocol (LDP) Signaling," Network Working Group, RFC 4762, Jan. 2007, 31 pages.

(Continued)

*Primary Examiner* — Clemence S Han
(74) *Attorney, Agent, or Firm* — Tong, Rea, Bentley & Kim, LLC

(57) ABSTRACT

Various example embodiments for supporting multicast communications in a communication system are presented. Various embodiments for supporting multicast communications may be configured to support multicast communications of multiple virtual private networks over a single multicast distribution tree. Various embodiments for supporting multicast communications of multiple virtual private networks over a single multicast distribution tree may support communication of a packet of a virtual private network within a network, wherein the packet includes a set of tuples associated with a set of egress devices to which the packet is to be delivered via a multicast distribution tree supported within the network, wherein, for each of the egress devices, the respective tuple associated with the respective egress device includes a respective device identifier of the egress device that uniquely identifies the respective egress device within the network and a respective label assigned by the respective egress device for the virtual private network.

19 Claims, 32 Drawing Sheets

(51) Int. Cl.
  *H04L 12/08*   (2006.01)
  *H04L 12/46*   (2006.01)
  *H04L 45/50*   (2022.01)
  *H04L 45/745*  (2022.01)

(52) U.S. Cl.
  CPC ............ *H04L 45/50* (2013.01); *H04L 45/745* (2013.01); *H04L 63/0272* (2013.01)

(56) References Cited

U.S. PATENT DOCUMENTS

| | | | | |
|---|---|---|---|---|
| 8,310,957 | B1* | 11/2012 | Rekhter | H04L 45/16 370/256 |
| 8,339,973 | B1* | 12/2012 | Pichumani | H04L 43/10 370/248 |
| 8,625,465 | B1* | 1/2014 | Aggarwal | H04L 12/4641 370/395.5 |
| 8,953,590 | B1* | 2/2015 | Aggarwal | H04L 12/4675 370/409 |
| 8,958,423 | B2 | 2/2015 | Zhao et al. | |
| 9,584,568 | B2* | 2/2017 | Tanabe | H04L 65/611 |
| 10,027,587 | B1* | 7/2018 | O'Brien | H04L 69/22 |
| 10,999,195 | B1* | 5/2021 | Suryanarayana | H04L 45/16 |
| 2004/0037279 | A1* | 2/2004 | Zelig | H04L 12/4641 370/390 |
| 2004/0090963 | A1* | 5/2004 | Okagawa | H04L 61/255 370/392 |
| 2005/0220072 | A1* | 10/2005 | Boustead | H04L 45/566 370/428 |
| 2006/0168047 | A1* | 7/2006 | Li | H04L 12/66 709/206 |
| 2007/0091827 | A1* | 4/2007 | Boers | H04L 45/16 370/255 |
| 2007/0115985 | A1* | 5/2007 | Choudhury | H04L 45/00 370/392 |
| 2009/0161560 | A1* | 6/2009 | He | H04L 41/12 370/242 |
| 2009/0175274 | A1* | 7/2009 | Aggarwal | H04L 12/1886 370/390 |
| 2011/0299531 | A1* | 12/2011 | Yu | H04L 63/0272 370/392 |
| 2012/0163165 | A1* | 6/2012 | Ra | H04L 45/50 370/235 |
| 2013/0010790 | A1* | 1/2013 | Shao | H04L 12/185 370/390 |
| 2013/0287027 | A1* | 10/2013 | Ra | H04L 45/50 370/392 |
| 2014/0003425 | A1* | 1/2014 | Zhao | H04L 12/1836 370/390 |
| 2014/0071830 | A1* | 3/2014 | Weill | H04L 12/4633 370/392 |
| 2015/0085635 | A1* | 3/2015 | Wijnands | H04L 45/745 370/216 |
| 2015/0131663 | A1* | 5/2015 | Brar | H04L 45/745 370/392 |
| 2016/0285756 | A1* | 9/2016 | Gafni | H04L 45/507 |
| 2016/0330114 | A1* | 11/2016 | Gafni | H04L 45/66 |
| 2018/0324090 | A1* | 11/2018 | Duncan | H04L 12/4641 |
| 2019/0028381 | A1* | 1/2019 | Li | H04L 45/586 |
| 2019/0058606 | A1 | 2/2019 | Wijnands et al. | |
| 2019/0188283 | A1* | 6/2019 | Fuller | G06F 16/1873 |
| 2019/0281011 | A1* | 9/2019 | Pang | H04L 61/5061 |
| 2020/0120020 | A1* | 4/2020 | Dutta | H04L 45/04 |
| 2020/0153728 | A1* | 5/2020 | Xie | H04L 12/4633 |
| 2020/0403903 | A1* | 12/2020 | Xie | H04L 45/48 |
| 2021/0099380 | A1* | 4/2021 | Suryanarayana | H04L 41/0806 |
| 2021/0211324 | A1 | 7/2021 | Dutta | |
| 2021/0243111 | A1* | 8/2021 | Dutta | H04L 45/24 |
| 2022/0166722 | A1* | 5/2022 | Dave | H04L 45/24 |

OTHER PUBLICATIONS

Kompella, K., et al., "Virtual Private LAN Service (VPLS) Using BGP for Auto-Discovery and Signaling," Network Working Group, RFC 4761, Jan. 2007, 28 pages.
Sajassi, A., et al., "BGP MPLS-Based Ethernet VPN," Internet Engineering Task Force (IETF), RFC 7432, Feb. 2015, 56 pages.
Rosen, E., et al., "BGP/MPLS IP Virtual Private Networks (VPNs)," Network Working Group, RFC 4364, Feb. 2006, 47 pages.
Rosen, E., "Multicast in MPLS/BGP IP VPNs," Internet Engineering Task Force (IETF), RFC 6513, Feb. 2012, 88 pages.
Fenner, B., et al., "Protocol Independent Multicast—Sparse Mode (PIM-SM): Protocol Specification (Revised)," Internet Engineering Task Force (IETF), RFC 7761, Mar. 2016, 137 pages.
Adams, A., et al., "Protocol Independent Multicast—Dense Mode (PIM-DM): Protocol Specification (Revised)," Network Working Group, RFC 3973, Jan. 2005, 61 pages.
Wijnands, IJ, et al., "Label Distribution Protocol Extensions for Point-to-Multipoint and Multipoint-to-Multipoint Label Switched Paths," Internet Engineering Task Force (IETF), RFC 6388, Nov. 2011, 39 pages.
Aggarwal, R., et al., "Extensions to Resource Reservation Protocol—Traffic Engineering (RSVP-TE) for Point-to-Multipoint TE Label Switched Paths (LSPs)," Network Working Group, RFC 4875, May 2007, 53 pages.
Wijnands, IJ., et al., "Multicast Using Bit Index Explicit Replication (BIER)," Internet Engineering Task Force (IETF), RFC 8279, Nov. 2017, 43 pages.
Aggarwal, R., et al., "Multicast in Virtual Private LAN Service (VPLS)," Internet Engineering Task Force (IETF), RFC 7117, Feb. 2014, 50 pages.
Aggarwal, R., et al., "MPLS Upstream Label Assignment and Context-Specific Label Space," Network Working Group, RFC 5331, Aug. 2008, 13 pages.
Zhang, Z., et al, "MVPN/EVPN Tunnel Aggregation with Common Labels," BESS, Internet Draft, draft-zzhang-bess-mvpn-evpn-aggregtion-label-00, Feb. 9, 2018, 12 pages.
EP Search Report mailed in corresponding EP Patent Application No. 21 15 3330.2 on Jun. 25, 2021, 11 pages.
Communication pursuant to Article 94(3) EPC, Application No. 21 153 330.2, May 24, 2023, 7 pages.

* cited by examiner

*FIG. 2A*

| 110: FTN TABLE | | |
|---|---|---|
| FEC | NHLFE | |
| | NEXT-HOP | LABEL |
| ... | ... | .... |
| VPN 120, 111 | 111 | L2B |
| VPN 120, 112 | 112 | L2C |
| VPN 120, 113 | 113 | L2D |
| ... | ... | .... |
| VPN 130, 111 | 111 | L3BA |
| VPN 130, 112 | 112 | L3CA |
| VPN 130, 113 | 113 | L3DA |
| .... | .... | .... |
| LSP_AB | 103 | LAB_F |
| LSP_AC | 102 | LAC_E |
| LSP_AD | 103 | LAD_F |

| 110: ILM TABLE | | | |
|---|---|---|---|
| LABEL | NHLFE | | |
| | NEXT-HOP | NEXT-HOP LABEL | CONTEXT |
| ... | ... | .... | .... |
| L2A | Self | None | VPN 120 |
| .... | .... | .... | .... |
| L3AB | Self | None | VPN 130, 111 |
| .... | .... | .... | .... |
| L3AC | Self | None | VPN 130, 112 |
| .... | .... | .... | .... |
| L3AD | Self | None | VPN 130, 113 |
| .... | .... | .... | .... |
| LBA_A | Self | None | LSP_BA |
| .... | .... | .... | .... |
| LCA_A | Self | None | LSP_CA |
| .... | .... | .... | .... |
| LDA_A | Self | None | LSP_DA |

*FIG. 2B*

| 111: FTN TABLE | | |
|---|---|---|
| FEC | NHLFE | |
| | NEXT-HOP | LABEL |
| ... | ... | .... |
| VPN 120, 110 | 110 | L2A |
| VPN 120, 112 | 112 | L2C |
| VPN 120, 113 | 113 | L2D |
| ... | ... | .... |
| VPN 130, 110 | 110 | L3AB |
| VPN 130, 112 | 112 | L3CB |
| VPN 130, 113 | 113 | L3DB |
| .... | .... | .... |
| LSP_BA | 102 | LBA_E |
| LSP_BC | 102 | LBC_E |
| LSP_BD | 103 | LBD_E |

| 111: ILM TABLE | | | |
|---|---|---|---|
| LABEL | NHLFE | | |
| | NEXT-HOP | NEXT-HOP LABEL | CONTEXT |
| ... | ... | .... | .... |
| L2B | Self | None | VPN 120 |
| .... | .... | .... | .... |
| L3BA | Self | None | VPN 130, 110 |
| .... | .... | .... | .... |
| L3BC | Self | None | VPN 130, 112 |
| .... | .... | .... | .... |
| L3BD | Self | None | VPN 130, 113 |
| .... | .... | .... | .... |
| LAB_B | Self | None | LSP_AB |
| .... | .... | .... | .... |
| LCB_B | Self | None | LSP_CB |
| .... | .... | .... | .... |
| LDB_B | Self | None | LSP_DB |

*FIG. 2C*

| 112: FTN TABLE | | |
|---|---|---|
| FEC | NHLFE | |
| | NEXT-HOP | LABEL |
| ... | ... | .... |
| VPN 120, 110 | 110 | L2A |
| VPN 120, 111 | 111 | L2B |
| VPN 120, 113 | 113 | L2D |
| ... | ... | .... |
| VPN 130, 110 | 110 | L3AC |
| VPN 130, 111 | 111 | L3BC |
| VPN 130, 113 | 113 | L3DC |
| .... | .... | .... |
| LSP_CA | 105 | LCA_H |
| LSP_CB | 105 | LCB_H |
| LSP_CD | 104 | LCD_G |

| 112: ILM Table | | | |
|---|---|---|---|
| Label | NHLFE | | |
| | Next-Hop | Next-Hop Label | Context |
| ... | ... | .... | .... |
| L2C | Self | None | VPN 120 |
| .... | .... | .... | .... |
| L3CA | Self | None | VPN 130, 110 |
| .... | .... | .... | .... |
| L3CB | Self | None | VPN 130, 111 |
| .... | .... | .... | .... |
| L3CD | Self | None | VPN 130, 113 |
| .... | .... | .... | .... |
| LAC_C | Self | None | LSP_AC |
| .... | .... | .... | .... |
| LBC_C | Self | None | LSP_BC |
| .... | .... | .... | .... |
| LDC_C | Self | None | LSP_DC |

*FIG. 2D*

| 113: FTN Table | | |
|---|---|---|
| FEC | NHLFE | |
| | NEXT-HOP | LABEL |
| ... | ... | .... |
| VPN 120, 110 | 110 | L2A |
| VPN 120, 111 | 111 | L2B |
| VPN 120, 112 | 112 | L2C |
| ... | ... | .... |
| VPN 130, 110 | 110 | L3AD |
| VPN 130, 111 | 111 | L3BD |
| VPN 130, 112 | 112 | L3CD |
| .... | .... | .... |
| LSP_DA | 105 | LDA_H |
| LSP_DB | 105 | LDB_H |
| LSP_DC | 104 | LDC_G |

| 113: ILM TABLE | | | |
|---|---|---|---|
| LABEL | NHLFE | | |
| | NEXT-HOP | NEXT-HOP LABEL | CONTEXT |
| ... | ... | .... | .... |
| L2D | Self | None | VPN 120 |
| .... | .... | .... | .... |
| L3DA | Self | None | VPN 130, 110 |
| .... | .... | .... | .... |
| L3DB | Self | None | VPN 130, 111 |
| .... | .... | .... | .... |
| L3DC | Self | None | VPN 130, 112 |
| .... | .... | .... | .... |
| LAD_D | Self | None | LSP_AD |
| .... | .... | .... | .... |
| LBD_D | Self | None | LSP_BD |
| .... | .... | .... | .... |
| LCD_D | Self | None | LSP_CD |

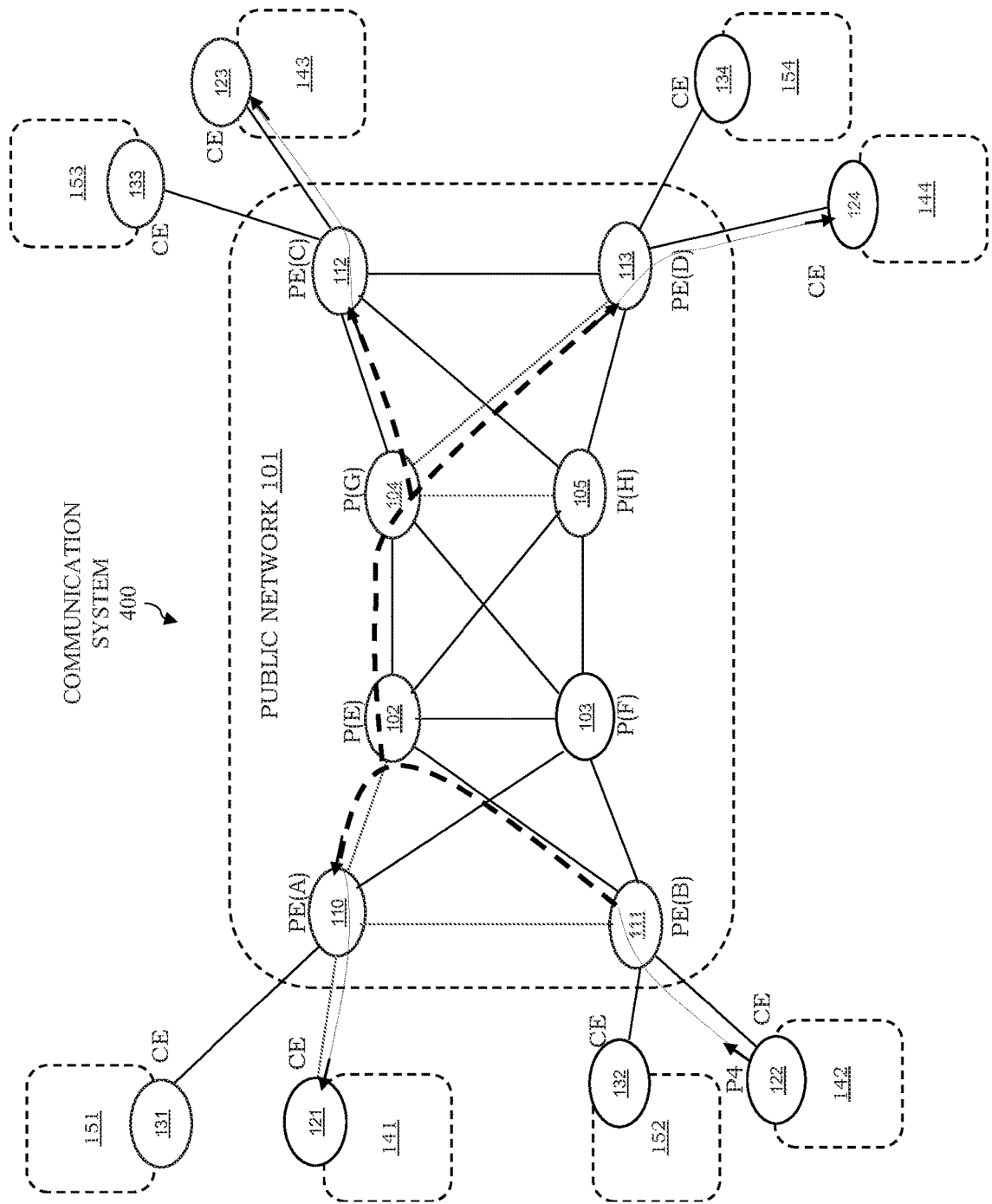

*FIG. 5A*

| PE 110: FTN TABLE | | |
|---|---|---|
| FEC | NHLFE | |
| | NEXT-HOP | LABEL |
| ... | ... | .... |
| VPN 120, 111 | 111 | L2B |
| VPN 120, 112 | 112 | L2C |
| VPN 120, 113 | 113 | L2D |
| ... | ... | .... |
| VPN 130, 111 | 111 | L3BA |
| VPN 130, 112 | 112 | L3CA |
| VPN 130, 113 | 113 | L3DA |
| .... | .... | .... |
| LSP_AB | 103 | LAB_F |
| LSP_AC | 102 | LAC_E |
| LSP_AD | 103 | LAD_F |

| PE 110: ILM TABLE | | | |
|---|---|---|---|
| Label | NHLFE | | |
| | NEXT-HOP | NEXT-HOP LABEL | CONTEXT |
| ... | ... | .... | .... |
| L2A | Self | None | VPN 120 |
| .... | .... | .... | .... |
| L3AB | Self | None | VPN 130, 111 |
| .... | .... | .... | .... |
| L3AC | Self | None | VPN 130, 112 |
| .... | .... | .... | .... |
| L3AD | Self | None | VPN 130, 113 |
| .... | .... | .... | .... |
| LBA_A | Self | None | LSP_BA |
| .... | .... | .... | .... |
| LCA_A | Self | None | LSP_CA |
| .... | .... | .... | .... |
| LDA_A | Self | None | LSP_DA |
| .... | .... | .... | .... |
| ML_110_1 | Self | None | P2MP {111, MLSP_1} |

*FIG. 5B*

| PE 111: FTN TABLE | | |
|---|---|---|
| FEC | NHLFE | |
| | NEXT-HOP | LABEL |
| ... | ... | .... |
| VPN 120, 110 | 110 | L2A |
| VPN 120, 112 | 112 | L2C |
| VPN 120, 113 | 113 | L2D |
| ... | ... | .... |
| VPN 130, 110 | 110 | L3AB |
| VPN 130, 112 | 112 | L3CB |
| VPN 130, 113 | 113 | L3DB |
| .... | .... | .... |
| LSP_BA | 102 | LBA_E |
| LSP_BC | 102 | LBC_E |
| LSP_BD | 103 | LBD_E |
| .... | .... | .... |
| P2MP {111, MLSP_1} | 102 | ML_102_1 |

| PE 111: ILM TABLE | | | |
|---|---|---|---|
| Label | NHLFE | | |
| | NEXT-HOP | NEXT-HOP LABEL | CONTEXT |
| ... | ... | .... | .... |
| L2B | Self | None | VPN 120 |
| .... | .... | .... | .... |
| L3BA | Self | None | VPN 130, 110 |
| .... | .... | .... | .... |
| L3BC | Self | None | VPN 130, 112 |
| .... | .... | .... | .... |
| L3BD | Self | None | VPN 130, 113 |
| .... | .... | .... | .... |
| LAB_B | Self | None | LSP_AB |
| .... | .... | .... | .... |
| LCB_B | Self | None | LSP_CB |
| .... | .... | .... | .... |
| LDB_B | Self | None | LSP_DB |

*FIG. 5C*

| PE 112: FTN TABLE | | |
|---|---|---|
| FEC | NHLFE | |
| | NEXT-HOP | LABEL |
| ... | ... | .... |
| VPN 120, 110 | 110 | L2A |
| VPN 120, 111 | 111 | L2B |
| VPN 120, 113 | 113 | L2D |
| ... | ... | .... |
| VPN 130, 110 | 110 | L3AC |
| VPN 130, 111 | 111 | L3BC |
| VPN 130, 113 | 113 | L3DC |
| .... | .... | .... |
| LSP_CA | 105 | LCA_H |
| LSP_CB | 105 | LCB_H |
| LSP_CD | 104 | LCD_G |

| PE 112: ILM TABLE | | | |
|---|---|---|---|
| LABEL | NHLFE | | |
| | NEXT-HOP | NEXT-HOP LABEL | CONTEXT |
| ... | ... | .... | .... |
| L2C | Self | None | VPN 120 |
| .... | .... | .... | .... |
| L3CA | Self | None | VPN 130, 110 |
| .... | .... | .... | .... |
| L3CB | Self | None | VPN 130, 111 |
| .... | .... | .... | .... |
| L3CD | Self | None | VPN 130, 113 |
| .... | .... | .... | .... |
| LAC_C | Self | None | LSP_AC |
| .... | .... | .... | .... |
| LBC_C | Self | None | LSP_BC |
| .... | .... | .... | .... |
| LDC_C | Self | None | LSP_DC |
| .... | .... | .... | .... |
| ML_112_1 | Self | None | P2MP {111, MLSP_1} |

*FIG. 5D*

| PE 113: FTN TABLE | | |
|---|---|---|
| FEC | NHLFE | |
| | NEXT-HOP | LABEL |
| ... | ... | .... |
| VPN 120, 110 | 110 | L2A |
| VPN 120, 111 | 111 | L2B |
| VPN 120, 112 | 112 | L2C |
| ... | ... | .... |
| VPN 130, 110 | 110 | L3AD |
| VPN 130, 111 | 111 | L3BD |
| VPN 130, 112 | 112 | L3CD |
| .... | .... | .... |
| LSP_DA | 105 | LDA_H |
| LSP_DB | 105 | LDB_H |
| LSP_DC | 104 | LDC_G |

| PE 113: ILM TABLE | | | |
|---|---|---|---|
| LABEL | NHLFE | | |
| | NEXT-HOP | NEXT-HOP LABEL | CONTEXT |
| ... | ... | .... | .... |
| L2D | Self | None | VPN 120 |
| .... | .... | .... | .... |
| L3DA | Self | None | VPN 130, 110 |
| .... | .... | .... | .... |
| L3DB | Self | None | VPN 130, 111 |
| .... | .... | .... | .... |
| L3DC | Self | None | VPN 130, 112 |
| .... | .... | .... | .... |
| LAD_D | Self | None | LSP_AD |
| .... | .... | .... | .... |
| LBD_D | Self | None | LSP_BD |
| .... | .... | .... | .... |
| LCD_D | Self | None | LSP_CD |
| .... | .... | .... | .... |
| ML_110_1 | Self | None | P2MP {111, MLSP_1} |

*FIG. 7A*

| 112: UPSTREAM ILM TABLE FOR 110 | |
|---|---|
| UAL | CONTEXT |
| ... | ...... |
| UAL_120_110 | VPN 120 |
| ... | .... |
| UAL_130_110 | VPN 130 |
| ... | ...... |

*FIG. 7B*

| 112: UPSTREAM ILM TABLE FOR 111 | |
|---|---|
| UAL | CONTEXT |
| ... | ...... |
| UAL_120_111 | VPN 120 |
| ... | .... |
| UAL_130_111 | VPN 130 |
| ... | ...... |

*FIG. 7C*

| 112: UPSTREAM ILM TABLE FOR 113 | |
|---|---|
| UAL | CONTEXT |
| ... | ...... |
| UAL_120_113 | VPN 120 |
| ... | .... |
| UAL_130_113 | VPN 130 |
| ... | ...... |

*FIG. 7D*

| LABEL | NHLFE | | |
|---|---|---|---|
| | NEXT-HOP | NEXT-HOP LABEL | CONTEXT |
| 112: ILM TABLE | | | |
| ... | ... | .... | .... |
| L2C | Self | None | VPN 120 |
| .... | .... | .... | .... |
| L3C | Self | None | VPN 130 |
| .... | .... | .... | .... |
| LAC_C | Self | None | LSP_AC |
| .... | .... | .... | .... |
| LBC_C | Self | None | LSP_BC |
| .... | .... | .... | .... |
| LDC_C | Self | None | LSP_DC |
| .... | .... | .... | .... |
| ML_112_1 | Self | None | P2MP {111, MLSP_1} |

FIG. 8A

```
                                                     ILS
                                                     801
                                                      ↓
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            ILSI                       | Exp |S|    TTL/BSL    |
+-+-+-+-+-+-+-+-+-+-+-+-+-+-+-+-+-+-+-+-+-+-+-+-+-+-+-+-+-+-+-+-+
|                    Index Bit String (IBS)                     |
~                                                               ~
|                                                               |
+-+-+-+-+-+-+-+-+-+-+-+-+-+-+-+-+-+-+-+-+-+-+-+-+-+-+-+-+-+-+-+-+
|            Label 1                    | Exp |S|      TTL      |
+-+-+-+-+-+-+-+-+-+-+-+-+-+-+-+-+-+-+-+-+-+-+-+-+-+-+-+-+-+-+-+-+
//                   //                                       //
//                   //                                       //
+-+-+-+-+-+-+-+-+-+-+-+-+-+-+-+-+-+-+-+-+-+-+-+-+-+-+-+-+-+-+-+-+
|            Label N                    | Exp |S|      TTL      ~
+-+-+-+-+-+-+-+-+-+-+-+-+-+-+-+-+-+-+-+-+-+-+-+-+-+-+-+-+-+-+-+-+
```

FIG. 8B

```
                                                     ILS
                                                     802
                                                      ↓
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            ILSI                       | Exp |S|   Num Stacks  |
+-+-+-+-+-+-+-+-+-+-+-+-+-+-+-+-+-+-+-+-+-+-+-+-+-+-+-+-+-+-+-+-+
|            Index 1                    | Exp |S|      TTL      |
+-+-+-+-+-+-+-+-+-+-+-+-+-+-+-+-+-+-+-+-+-+-+-+-+-+-+-+-+-+-+-+-+
|            Label 1                    | Exp |S|      TTL      |
+-+-+-+-+-+-+-+-+-+-+-+-+-+-+-+-+-+-+-+-+-+-+-+-+-+-+-+-+-+-+-+-+
//                   //                                       //
//                   //                                       //
+-+-+-+-+-+-+-+-+-+-+-+-+-+-+-+-+-+-+-+-+-+-+-+-+-+-+-+-+-+-+-+-+
|            Index N                    | Exp |S|      TTL      |
+-+-+-+-+-+-+-+-+-+-+-+-+-+-+-+-+-+-+-+-+-+-+-+-+-+-+-+-+-+-+-+-+
|            Label N                    | Exp |S|      TTL      ~
+-+-+-+-+-+-+-+-+-+-+-+-+-+-+-+-+-+-+-+-+-+-+-+-+-+-+-+-+-+-+-+-+
```

FIG. 9

ILS 900 

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            ILSI                      | Exp |0|     BSL=1      |
+-+-+-+-+-+-+-+-+-+-+-+-+-+-+-+-+-+-+-+-+-+-+-+-+-+-+-+-+-+-+-+-+    ┐
|0 0 0 0 1 0 0 0 0 0 0 0 0 0 0 0 0 0 0 0 0 1 1 0 0 0 0 0 0 0 1 0|    ├ IBS
+-+-+-+-+-+-+-+-+-+-+-+-+-+-+-+-+-+-+-+-+-+-+-+-+-+-+-+-+-+-+-+-+    ┘
|            1200                      | Exp |0|      TTL       |
+-+-+-+-+-+-+-+-+-+-+-+-+-+-+-+-+-+-+-+-+-+-+-+-+-+-+-+-+-+-+-+-+
|            2000                      | Exp |0|      TTL       |
+-+-+-+-+-+-+-+-+-+-+-+-+-+-+-+-+-+-+-+-+-+-+-+-+-+-+-+-+-+-+-+-+
|            9000                      | Exp |0|      TTL       |  Label
+-+-+-+-+-+-+-+-+-+-+-+-+-+-+-+-+-+-+-+-+-+-+-+-+-+-+-+-+-+-+-+-+  Stack
|            7200                      | Exp |S|      TTL       |
+-+-+-+-+-+-+-+-+-+-+-+-+-+-+-+-+-+-+-+-+-+-+-+-+-+-+-+-+-+-+-+-+
```

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
//        Layer-2 Header (e.g. Ethernet Header) to 102         //
//                                                             //
+-+-+-+-+-+-+-+-+-+-+-+-+-+-+-+-+-+-+-+-+-+-+-+-+-+-+-+-+-+-+-+-+
|           ML_102_1                   | Exp |0|      TTL       |
+-+-+-+-+-+-+-+-+-+-+-+-+-+-+-+-+-+-+-+-+-+-+-+-+-+-+-+-+-+-+-+-+
|            ILSI                      | Exp |0|     BSL=1      |
+-+-+-+-+-+-+-+-+-+-+-+-+-+-+-+-+-+-+-+-+-+-+-+-+-+-+-+-+-+-+-+-+    ┐
|0 0 0 0 0 0 0 0 0 0 0 0 0 0 0 0 0 0 0 0 0 0 0 0 0 0 0 0 1 1 0 1|    ├ IBS
+-+-+-+-+-+-+-+-+-+-+-+-+-+-+-+-+-+-+-+-+-+-+-+-+-+-+-+-+-+-+-+-+    ┘
|            L2A                       | Exp |0|      TTL       |
+-+-+-+-+-+-+-+-+-+-+-+-+-+-+-+-+-+-+-+-+-+-+-+-+-+-+-+-+-+-+-+-+
|            L2C                       | Exp |0|      TTL       |  Label
+-+-+-+-+-+-+-+-+-+-+-+-+-+-+-+-+-+-+-+-+-+-+-+-+-+-+-+-+-+-+-+-+  Stack
|            L2D                       | Exp |1|      TTL       |
+-+-+-+-+-+-+-+-+-+-+-+-+-+-+-+-+-+-+-+-+-+-+-+-+-+-+-+-+-+-+-+-+
//                                                             //
//                          P5                                 //
//                                                             //
+-+-+-+-+-+-+-+-+-+-+-+-+-+-+-+-+-+-+-+-+-+-+-+-+-+-+-+-+-+-+-+-+
```

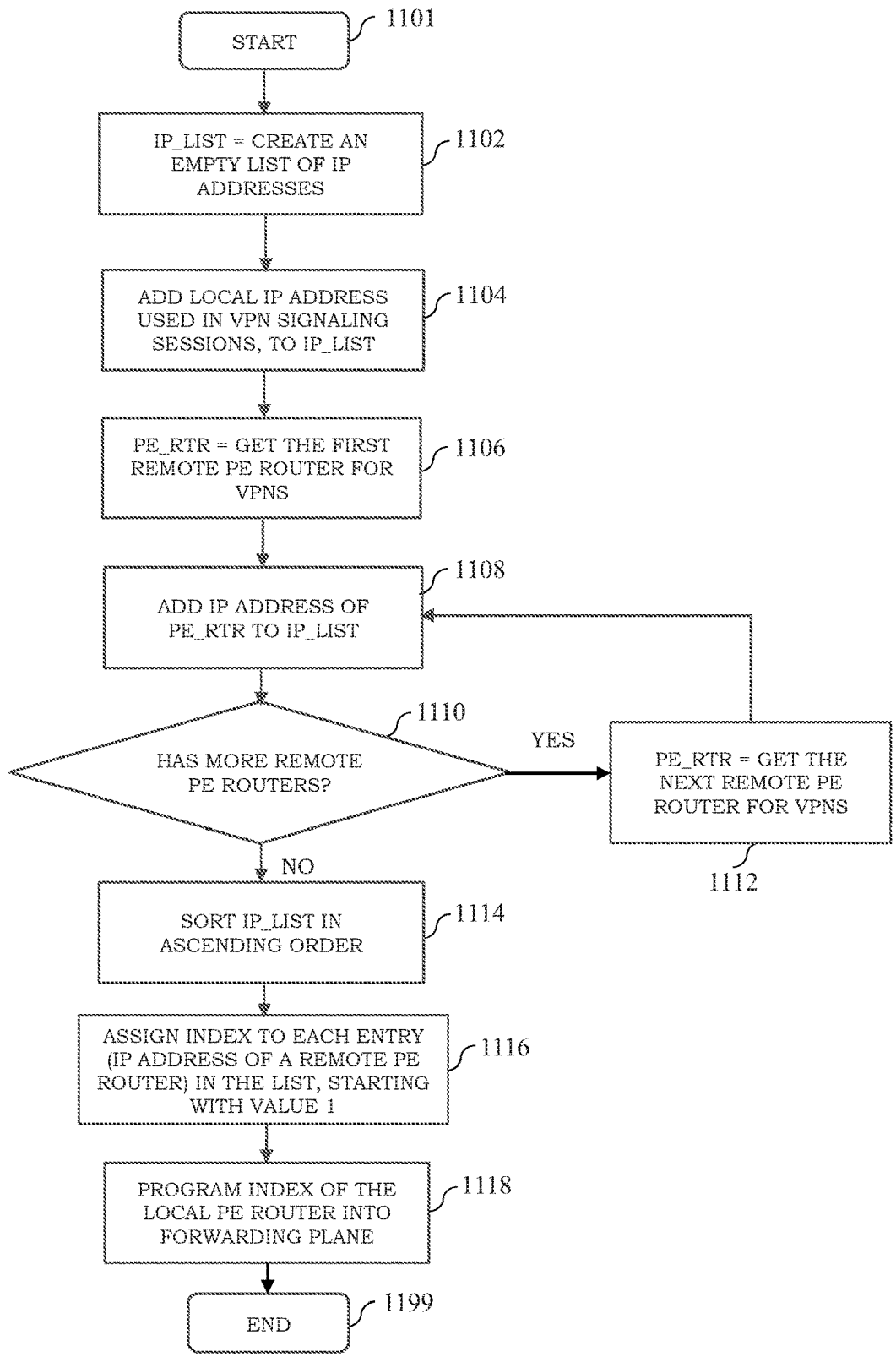

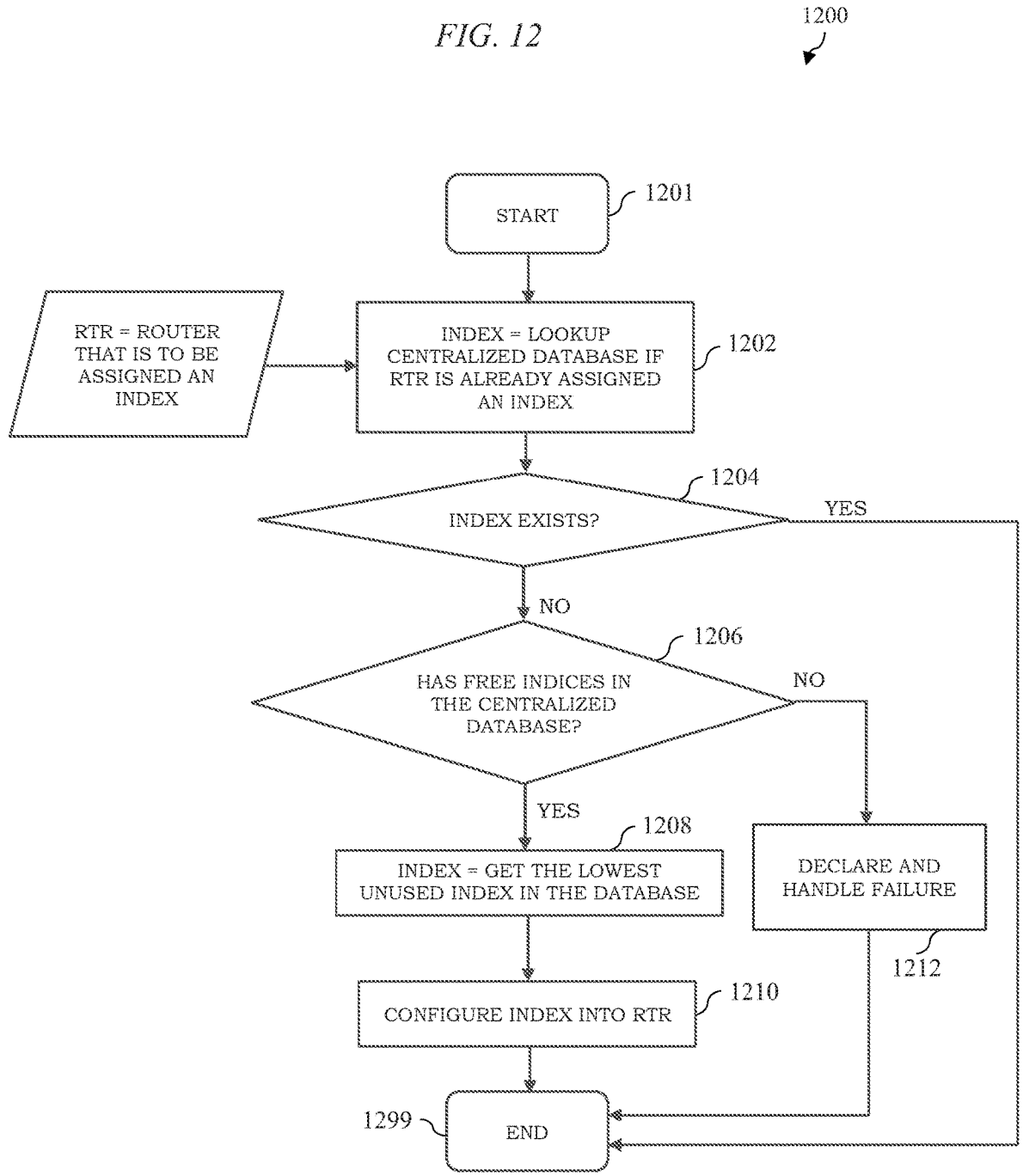

SUPPORTING MULTICAST COMMUNICATIONS

TECHNICAL FIELD

Various example embodiments relate generally to communication systems and, more particularly but not exclusively, to supporting multicast in various types of communication systems.

BACKGROUND

In many communication networks, various communications technologies may be used to support communications.

SUMMARY

In at least some example embodiments, an apparatus includes at least one processor and at least one memory including a set of instructions, wherein the set of instructions is configured to, when executed by the at least one processor, cause the apparatus to support communication of a packet of a virtual private network within a network, wherein the packet includes a tuple associated with an egress device to which the packet is to be delivered via a multicast distribution tree supported within the network, wherein the tuple includes a device identifier of the egress device that uniquely identifies the egress device within the network and a label assigned by the egress device for the virtual private network. In at least some example embodiments, the device identifier of the egress device is determined by the egress device based on communication with at least one other egress device. In at least some example embodiments, the device identifier of the egress device is determined by the egress device based on communication with a network controller. In at least some example embodiments, the device identifier of the egress device comprises an index assigned from a unique index space of the network. In at least some example embodiments, the unique index space of the network is based on a sorting of a respective set of addresses of a respective set of devices of the network. In at least some example embodiments, the tuple is encoded within the packet based on an indexed label stack including an encoding of the tuple and an indexed label stack identifier configured to indicate a presence of the indexed label stack within the packet. In at least some example embodiments, the encoding of the indexed label stack includes an index bit string having a set of bit positions corresponding to a respective set of devices of the network wherein one of the bit positions corresponding to the index of the egress device is set and a label stack encoding the label assigned by the egress device for the virtual private network. In at least some example embodiments, the label assigned by the egress device for the virtual private network is positioned within the label stack based on a position of the index of the egress device within the index bit string. In at least some example embodiments, the encoding of the indexed label stack includes a label pair for the tuple, wherein the label pair for the tuple includes a first label encoding the index of the egress device and a second label encoding the label assigned by the egress device for the virtual private network. In at least some example embodiments, to support communication of the packet within the network, the set of instructions is configured to, when executed by the at least one processor, cause the apparatus to receive the packet at an ingress device of the network via an access link of the ingress device, determine, based on the access link, that the packet is associated with the virtual private network, and forward the packet from the ingress device of the network toward a second device of the network based on a next-hop label configured to identify the second device in the multicast distribution tree. In at least some example embodiments, to forward the packet, the set of instructions is configured to, when executed by the at least one processor, cause the apparatus to generate a multicast packet including the packet and including the next-hop label configured to identify the second device in the multicast distribution tree and forward the multicast packet from the ingress device of the network toward the second device of the network. In at least some example embodiments, to support communication of the packet within the network, the set of instructions is configured to, when executed by the at least one processor, cause the apparatus to receive, at a transit device of the network, a multicast packet including the packet and including a next-hop label identifying the transit device and forward the packet from the transit device toward a second device of the network. In at least some example embodiments, to forward the packet, the set of instructions is configured to, when executed by the at least one processor, cause the apparatus to determine, based on a lookup based on the next-hop label, a next-hop label identifying the second device, create, based on the lookup based on the next-hop label, a copy of the multicast packet, swap the next-hop label identifying the transit device with the next-hop label identifying the second device in the copy of the multicast packet to form thereby a new multicast packet, and forward the new multicast packet from the transit device toward the second device based on the next-hop label identifying the second device. In at least some example embodiments, to support communication of the packet within the network, the set of instructions is configured to, when executed by the at least one processor, cause the apparatus to receive the packet at the egress device, identify, based on the device identifier of the egress device, the tuple including the device identifier of the egress device, identify, based on the tuple including the identifier of the egress device, the label assigned by the egress device for the virtual private network, and forward the packet from the egress device based on the label assigned by the egress device for the virtual private network. In at least some example embodiments, to forward the packet, the set of instructions is configured to, when executed by the at least one processor, cause the apparatus to determine, based on a lookup based on the label assigned by the egress device for the virtual private network, that the packet is associated with the virtual private network and forward the packet network from the egress device based on a forwarding table of the virtual private network. In at least some example embodiments, the multicast distribution tree is selected from a set of available multicast distribution trees of the network based on a determination that a set of leaf devices of the multicast distribution tree includes a set of egress devices to which the packet is to be delivered. In at least some example embodiments, the set of instructions is configured to, when executed by the at least one processor, cause the apparatus to support communication of a second multicast packet associated with a second virtual private network using the multicast distribution tree. In at least some example embodiments, the set of instructions is configured to, when executed by the at least one processor, cause the apparatus to support communication of a second packet intended for delivery to the egress device, wherein the second packet is a unicast packet of the virtual private network, wherein the second packet includes the label assigned by the egress device for the virtual private network.

In at least some example embodiments, a non-transitory computer-readable medium stores a set of instructions configured to cause an apparatus to support communication of a packet of a virtual private network within a network, wherein the packet includes a tuple associated with an egress device to which the packet is to be delivered via a multicast distribution tree supported within the network, wherein the tuple includes a device identifier of the egress device that uniquely identifies the egress device within the network and a label assigned by the egress device for the virtual private network. In at least some example embodiments, the device identifier of the egress device is determined by the egress device based on communication with at least one other egress device. In at least some example embodiments, the device identifier of the egress device is determined by the egress device based on communication with a network controller. In at least some example embodiments, the device identifier of the egress device comprises an index assigned from a unique index space of the network. In at least some example embodiments, the unique index space of the network is based on a sorting of a respective set of addresses of a respective set of devices of the network. In at least some example embodiments, the tuple is encoded within the packet based on an indexed label stack including an encoding of the tuple and an indexed label stack identifier configured to indicate a presence of the indexed label stack within the packet. In at least some example embodiments, the encoding of the indexed label stack includes an index bit string having a set of bit positions corresponding to a respective set of devices of the network wherein one of the bit positions corresponding to the index of the egress device is set and a label stack encoding the label assigned by the egress device for the virtual private network. In at least some example embodiments, the label assigned by the egress device for the virtual private network is positioned within the label stack based on a position of the index of the egress device within the index bit string. In at least some example embodiments, the encoding of the indexed label stack includes a label pair for the tuple, wherein the label pair for the tuple includes a first label encoding the index of the egress device and a second label encoding the label assigned by the egress device for the virtual private network. In at least some example embodiments, to support communication of the packet within the network, the set of instructions is configured to cause the apparatus to receive the packet at an ingress device of the network via an access link of the ingress device, determine, based on the access link, that the packet is associated with the virtual private network, and forward the packet from the ingress device of the network toward a second device of the network based on a next-hop label configured to identify the second device in the multicast distribution tree. In at least some example embodiments, to forward the packet, the set of instructions is configured to cause the apparatus to generate a multicast packet including the packet and including the next-hop label configured to identify the second device in the multicast distribution tree and forward the multicast packet from the ingress device of the network toward the second device of the network. In at least some example embodiments, to support communication of the packet within the network, the set of instructions is configured to cause the apparatus to receive, at a transit device of the network, a multicast packet including the packet and including a next-hop label identifying the transit device and forward the packet from the transit device toward a second device of the network. In at least some example embodiments, to forward the packet, the set of instructions is configured to cause the apparatus to determine, based on a lookup based on the next-hop label, a next-hop label identifying the second device, create, based on the lookup based on the next-hop label, a copy of the multicast packet, swap the next-hop label identifying the transit device with the next-hop label identifying the second device in the copy of the multicast packet to form thereby a new multicast packet, and forward the new multicast packet from the transit device toward the second device based on the next-hop label identifying the second device. In at least some example embodiments, to support communication of the packet within the network, the set of instructions is configured to cause the apparatus to receive the packet at the egress device, identify, based on the device identifier of the egress device, the tuple including the device identifier of the egress device, identify, based on the tuple including the identifier of the egress device, the label assigned by the egress device for the virtual private network, and forward the packet from the egress device based on the label assigned by the egress device for the virtual private network. In at least some example embodiments, to forward the packet, the set of instructions is configured to cause the apparatus to determine, based on a lookup based on the label assigned by the egress device for the virtual private network, that the packet is associated with the virtual private network and forward the packet network from the egress device based on a forwarding table of the virtual private network. In at least some example embodiments, the multicast distribution tree is selected from a set of available multicast distribution trees of the network based on a determination that a set of leaf devices of the multicast distribution tree includes a set of egress devices to which the packet is to be delivered. In at least some example embodiments, the set of instructions is configured to cause the apparatus to support communication of a second multicast packet associated with a second virtual private network using the multicast distribution tree. In at least some example embodiments, the set of instructions is configured to cause the apparatus to support communication of a second packet intended for delivery to the egress device, wherein the second packet is a unicast packet of the virtual private network, wherein the second packet includes the label assigned by the egress device for the virtual private network.

In at least some example embodiments, a method includes supporting communication of a packet of a virtual private network within a network, wherein the packet includes a tuple associated with an egress device to which the packet is to be delivered via a multicast distribution tree supported within the network, wherein the tuple includes a device identifier of the egress device that uniquely identifies the egress device within the network and a label assigned by the egress device for the virtual private network. In at least some example embodiments, the device identifier of the egress device is determined by the egress device based on communication with at least one other egress device. In at least some example embodiments, the device identifier of the egress device is determined by the egress device based on communication with a network controller. In at least some example embodiments, the device identifier of the egress device comprises an index assigned from a unique index space of the network. In at least some example embodiments, the unique index space of the network is based on a sorting of a respective set of addresses of a respective set of devices of the network. In at least some example embodiments, the tuple is encoded within the packet based on an indexed label stack including an encoding of the tuple and an indexed label stack identifier configured to indicate a presence of the indexed label stack within the packet. In at least some example embodiments, the encoding of the indexed label stack includes an index bit string having a set of bit positions corresponding to a respective set of devices of the network wherein one of the bit positions corresponding to the index of the egress device is set and a label stack encoding the label assigned by the egress device for the virtual private network. In at least some example embodiments, the label assigned by the egress device for the virtual private network is positioned within the label stack based on a position of the index of the egress device within the index bit string. In at least some example embodiments, the encoding of the indexed label stack includes a label pair for the tuple, wherein the label pair for the tuple includes a first label encoding the index of the egress device and a second label encoding the label assigned by the egress device for the virtual private network. In at least some example embodiments, supporting communication of the packet within the network includes receiving the packet at an ingress device of the network via an access link of the ingress device, determining, based on the access link, that the packet is associated with the virtual private network, and forwarding the packet from the ingress device of the network toward a second device of the network based on a next-hop label configured to identify the second device in the multicast distribution tree. In at least some example embodiments, forwarding the packet includes generating a multicast packet including the packet and including the next-hop label configured to identify the second device in the multicast distribution tree and forwarding the multicast packet from the ingress device of the network toward the second device of the network. In at least some example embodiments, supporting communication of the packet within the network includes receiving, at a transit device of the network, a multicast packet including the packet and including a next-hop label identifying the transit device and forwarding the packet from the transit device toward a second device of the network. In at least some example embodiments, forwarding the packet includes determining, based on a lookup based on the next-hop label, a next-hop label identifying the second device, creating, based on the lookup based on the next-hop label, a copy of the multicast packet, swapping the next-hop label identifying the transit device with the next-hop label identifying the second device in the copy of the multicast packet to form thereby a new multicast packet, and forwarding the new multicast packet from the transit device toward the second device based on the next-hop label identifying the second device. In at least some example embodiments, supporting communication of the packet within the network includes receiving the packet at the egress device, identifying, based on the device identifier of the egress device, the tuple including the device identifier of the egress device, identifying, based on the tuple including the identifier of the egress device, the label assigned by the egress device for the virtual private network, and forwarding the packet from the egress device based on the label assigned by the egress device for the virtual private network. In at least some example embodiments, forwarding the packet includes determining, based on a lookup based on the label assigned by the egress device for the virtual private network, that the packet is associated with the virtual private network and forwarding the packet network from the egress device based on a forwarding table of the virtual private network. In at least some example embodiments, the multicast distribution tree is selected from a set of available multicast distribution trees of the network based on a determination that a set of leaf devices of the multicast distribution tree includes a set of egress devices to which the packet is to be delivered. In at least some example embodiments, the method includes supporting communication of a second multicast packet associated with a second virtual private network using the multicast distribution tree. In at least some example embodiments, the method includes supporting communication of a second packet intended for delivery to the egress device, wherein the second packet is a unicast packet of the virtual private network, wherein the second packet includes the label assigned by the egress device for the virtual private network.

In at least some example embodiments, an apparatus includes means for supporting communication of a packet of a virtual private network within a network, wherein the packet includes a tuple associated with an egress device to which the packet is to be delivered via a multicast distribution tree supported within the network, wherein the tuple includes a device identifier of the egress device that uniquely identifies the egress device within the network and a label assigned by the egress device for the virtual private network. In at least some example embodiments, the device identifier of the egress device is determined by the egress device based on communication with at least one other egress device. In at least some example embodiments, the device identifier of the egress device is determined by the egress device based on communication with a network controller. In at least some example embodiments, the device identifier of the egress device comprises an index assigned from a unique index space of the network. In at least some example embodiments, the unique index space of the network is based on a sorting of a respective set of addresses of a respective set of devices of the network. In at least some example embodiments, the tuple is encoded within the packet based on an indexed label stack including an encoding of the tuple and an indexed label stack identifier configured to indicate a presence of the indexed label stack within the packet. In at least some example embodiments, the encoding of the indexed label stack includes an index bit string having a set of bit positions corresponding to a respective set of devices of the network wherein one of the bit positions corresponding to the index of the egress device is set and a label stack encoding the label assigned by the egress device for the virtual private network. In at least some example embodiments, the label assigned by the egress device for the virtual private network is positioned within the label stack based on a position of the index of the egress device within the index bit string. In at least some example embodiments, the encoding of the indexed label stack includes a label pair for the tuple, wherein the label pair for the tuple includes a first label encoding the index of the egress device and a second label encoding the label assigned by the egress device for the virtual private network. In at least some example embodiments, the means for supporting communication of the packet within the network includes means for receiving the packet at an ingress device of the network via an access link of the ingress device, means for determining, based on the access link, that the packet is associated with the virtual private network, and means for forwarding the packet from the ingress device of the network toward a second device of the network based on a next-hop label configured to identify the second device in the multicast distribution tree. In at least some example embodiments, the means for forwarding the packet includes means for generating a multicast packet including the packet and including the next-hop label configured to identify the second device in the multicast distribution tree and means for forwarding the multicast packet from the ingress device of the network toward the second device of the network. In at least some example embodiments, the means for supporting communication of the packet within the network includes means for receiving, at a transit device of the network, a multicast packet including the packet and including a next-hop label identifying the transit device and means for forwarding the packet from the transit device toward a second device of the network. In at least some example embodiments, the means for forwarding the packet includes means for determining, based on a lookup based on the next-hop label, a next-hop label identifying the second device, means for creating, based on the lookup based on the next-hop label, a copy of the multicast packet, means for swapping the next-hop label identifying the transit device with the next-hop label identifying the second device in the copy of the multicast packet to form thereby a new multicast packet, and means for forwarding the new multicast packet from the transit device toward the second device based on the next-hop label identifying the second device. In at least some example embodiments, the means for supporting communication of the packet within the network includes means for receiving the packet at the egress device, means for identifying, based on the device identifier of the egress device, the tuple including the device identifier of the egress device, means for identifying, based on the tuple including the identifier of the egress device, the label assigned by the egress device for the virtual private network, and means for forwarding the packet from the egress device based on the label assigned by the egress device for the virtual private network. In at least some example embodiments, the means for forwarding the packet includes means for determining, based on a lookup based on the label assigned by the egress device for the virtual private network, that the packet is associated with the virtual private network and means for forwarding the packet network from the egress device based on a forwarding table of the virtual private network. In at least some example embodiments, the multicast distribution tree is selected from a set of available multicast distribution trees of the network based on a determination that a set of leaf devices of the multicast distribution tree includes a set of egress devices to which the packet is to be delivered. In at least some example embodiments, the apparatus includes means for supporting communication of a second multicast packet associated with a second virtual private network using the multicast distribution tree. In at least some example embodiments, the apparatus includes means for supporting communication of a second packet intended for delivery to the egress device, wherein the second packet is a unicast packet of the virtual private network, wherein the second packet includes the label assigned by the egress device for the virtual private network.

BRIEF DESCRIPTION OF THE DRAWINGS

The teachings herein can be readily understood by considering the following detailed description in conjunction with the accompanying drawings, in which:

FIGS. 2A-2E depict examples of Incoming Label Map (ILM) entries and Forwarding Equivalence Class (FEC) to Next-Hop Label Forwarding Entry (NHLFE) (FTN) entries for provider edge (PE) routers of the communication system of FIG. 1;

FIG. 4 depicts the communication system of FIG. 1 for illustrating multicast based on an MDT in the form of a point-to-multipoint (P2MP) label switched path (LSP);

FIGS. 5A-5D depict examples of updated ILM and FTN Tables at the PE routers of the communication system of FIG. 1 for the P2MP LSP of the communication system of FIG. 4;

FIGS. 7A-7D depict examples of ILM Tables at one of the PE routers of the communication system of FIG. 6 which are maintained at the one of the PE routers of the communication system of FIG. 6;

FIGS. 8A and 8B depict example embodiments of encoding of an Indexed Label Stack (ILS) in a Multiprotocol Label Switching (MPLS) packet;

FIG. 9 depicts an example of an encoding of ILS in an MPLS packet based on the example ILS of FIG. 8A;

FIG. 10 depicts an example of an encoding of a VPN multicast packet that is multicast within the communication system of FIG. 1;

FIG. 11 depicts an example embodiment of a method for dynamic configuration of indexes at remote PE routers;

FIG. 12 depicts an example embodiment of a method for explicit configuration of indexes at remote PE routers;

DETAILED DESCRIPTION

Various example embodiments for supporting multicast communications in a communication system are presented. Various example embodiments for supporting multicast communications may be configured to support multicast communications of multiple virtual private networks (VPNs) over a single multicast distribution tree (MDT). Various example embodiments for supporting multicast communications of multiple VPNs over a single MDT may be configured to support communication of a packet of a virtual private network within a network, wherein the packet includes a set of tuples associated with a set of egress devices to which the packet is to be delivered via a multicast distribution tree supported within the network, wherein, for each of the egress devices, the respective tuple associated with the respective egress device includes a respective device identifier of the egress device that uniquely identifies the respective egress device within the network and a respective label assigned by the respective egress device for the virtual private network. Various example embodiments for supporting multicast communications may be configured to support both unicast and multicast communications for a VPN using the same set of VPN labels, e.g., multicast traffic in the VPN reuses elements typically used for unicast traffic in the VPN (e.g., forwarding state and so forth) and, therefore, eliminates the need for use of an upstream assigned label space or upstream assigned labels to support the multicast traffic in the VPN. It will be appreciated that these and various other example embodiments and advantages or potential advantages of supporting multicast communications of multiple VPNs over a single MDT may be further understood by way of reference to the various figures, which are discussed further below.

Figure 1:
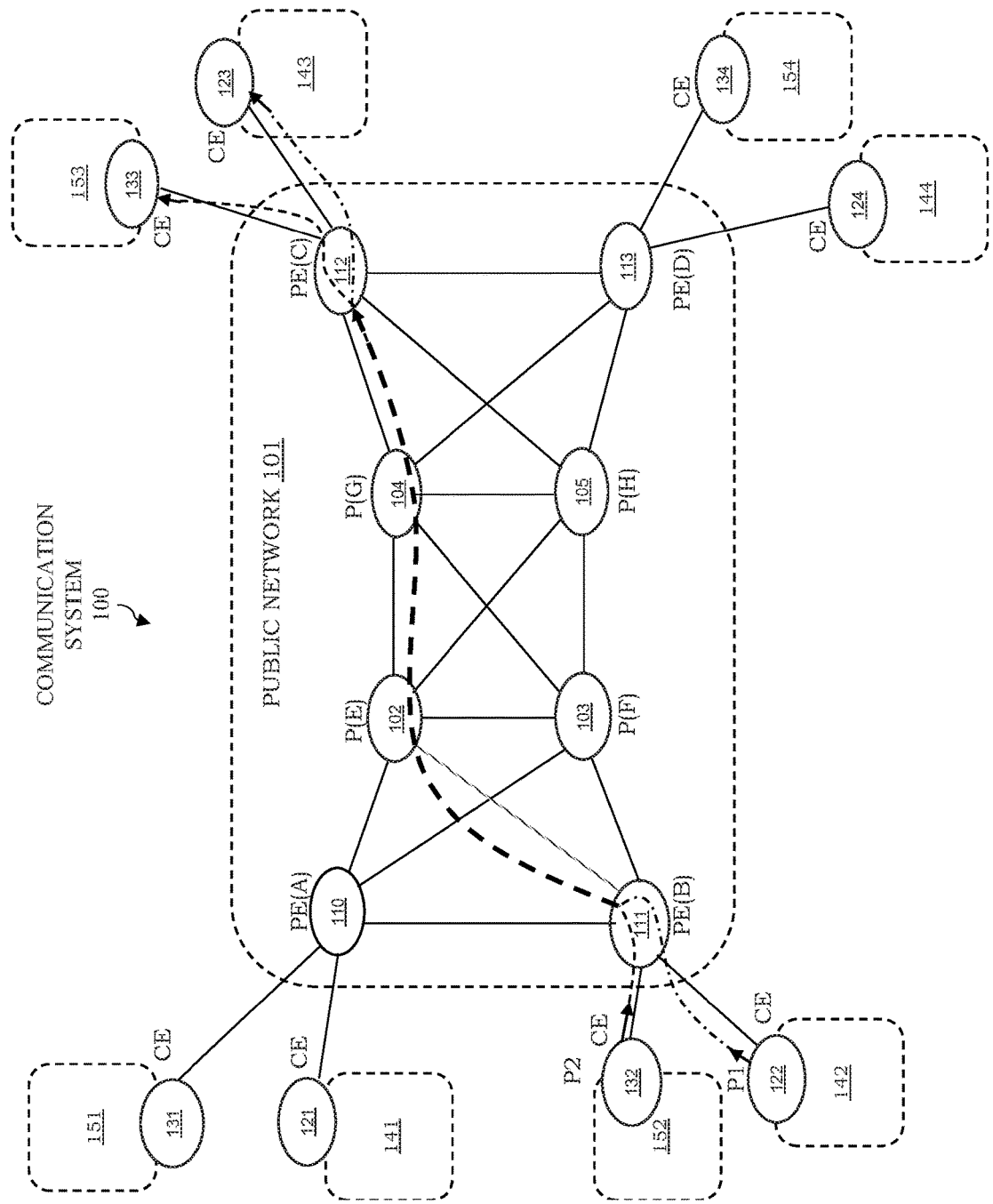
FIG. 1 depicts an example embodiment of a communication system configured to support multicast communications of multiple virtual private networks (VPNs) over a single multicast distribution tree (MDT)

FIG. 1 depicts an example embodiment of a communication system configured to support multicast communications of multiple virtual private networks (VPNs) over a single multicast distribution tree (MDT). In general, a VPN extends a private network across a public network (e.g., a service provider network) and enables users in the VPN to send and receive data across the public network as if they were directly connected to the private network. In general, an MDT is a source tree with a set of one or more sources (e.g., a set of ingress routers, such as one or more ingress PE routers) and branches forming a spanning tree through the network to a set of receivers (e.g., a set of egress routers, such as egress PE routers). For example, such an MDT may have a single source, in which case it may be referred to as a Point-to-Multipoint (P2MP) tree or a Source Specific Multicast (SSM) tree. For example, such an MDT may have multiple sources (e.g., each receiver is also the sender/root) in which case it may be referred to as a Multipoint-to-Multipoint tree or Any Source Multicast (ASM) tree.

In FIG. 1, a public network 101 includes a set of Provider Edge (PE) routers 110-113 (also denoted as A-D) and a set of provider (P) routers 102-105 (also denoted as E-H), respectively. The PE routers are the gateways to access various services (such as VPN) offered by the public network 101. In FIG. 1, the public network 101 offers connectivity between the remote sites of two VPNs denoted as VPN 120 and VPN 130. VPN 120 has four remote sites 141-144 and VPN 130 has four remote sites 151-154. A VPN site is connected to a PE router in the public network 101 via a customer edge (CE) router which belongs to the VPN site. VPN 120 includes CE routers 121-124, which are connected to PE routers 110-113, respectively, via access links. VPN 130 includes CE routers 131-134, which are connected to PE routers 110-113, respectively, via access links. It is noted that, when a PE router receives a packet on an access link from a CE router, the PE router identifies the VPN based on the access link which is configured on the respective VPN.

In FIG. 1, within the public network 101, the PE routers maintain VPN specific forwarding states. A PE router maintains a private forwarding table for each VPN associated with that PE router, which is generically denoted herein as a Native VPN Forwarding Table. The Native VPN Forwarding Table includes the forwarding rules for the "native" packet type of the VPN. For example, for an IP-VPN, the native packet type is an IP packet. Such rules are for (1) forwarding native packets received from an access link (i.e., local site) to one or more remote PE routers (i.e., remote sites) and (2) forwarding native packets received from a remote PE router (i.e., remote site) over an access link (i.e., local site). In an IP-VPN, the Native VPN Forwarding Table, which is referred to as a Virtual Route Forwarder (VRF), includes entries mapping IP prefixes to next-hops (e.g., PE routers, access links, or the like). The use of a VRF at a router for handling forwarding of IP packets may be further understood with respect to the following example.

For example, a VRF at a PE router for an IP-VPN (e.g., VPN z) may include entries as follows: (1) IP prefix=10.10.10.0/24 and next-hop=PE x and (2) IP prefix=116.11.0.0/16 and next-hop=access link y. When the PE router receives an IPv4 packet for the VPN z from an access link and the destination IP address of the packet is 10.10.10.5, the PE router looks up the destination IP address in the VRF to make a forwarding decision. As evident, the lookup matches the prefix 10.10.10.0/24 (based on a longest prefix match (LPM) based lookup), which is reachable via remote PE x, so the PE router needs to send the IPv4 packet to remote PE x. Similarly, when the PE router receives an IPv4 packet for the VPN z from a remote PE router and the destination IP address of the packet is 116.11.12.1, the PE router looks up the destination IP address in the VRF to make a forwarding decision. As evident, the lookup matches the prefix 116.11.0.0/16, which results in forwarding the packet to the locally connected site of VPN z via access link y.

It is noted that, within a public network, VPN specific forwarding takes place from an ingress PE router to an egress PE router (in case of unicast packets) or to a set of egress PE routers (in case of multicast packets). However, a PE router generally cannot send a VPN packet to another PE router as the native packet type, since the PE routers are connected across a public network. So, each pair of PE routers in a VPN may negotiate among themselves a connection for the VPN over the public network. In other words, a VPN connection connects Native VPN Forwarding Tables of the VPN in a pair of PE routers. The native VPN packets are then exchanged over the connection by encapsulating the native packets with an encapsulation that identifies the VPN connection. For example, in MPLS based VPNs, a VPN connection may be set up by exchanging MPLS labels among PE routers as the VPN connection identifiers. This process is discussed further below.

In general, to setup connectivity for a VPN, a PE router allocates an MPLS label from its local label space and advertises the label against the VPN Identifier (VPN-ID) to another PE router connected to a remote site of the VPN. A VPN-ID uniquely identifies a VPN in the network. The MPLS label allocated for a VPN may be denoted as "VPN-Label". An ingress PE router sending a packet for the VPN to an egress PE router would encapsulate the packet with the VPN-Label advertised by the egress PE router. On receipt of the packet, the egress PE router would uniquely associate the packet with its VPN based on the received VPN-Label. It is noted that all PE routers of a VPN may not have a direct signaling session to each other. For example, in BGP-signaled VPNs, the PE routers may have signaling sessions to a common BGP Route Reflector (BGP-RR) through which the VPN advertisements are exchanged among the PE routers. Another scenario could be inter-AS BGP VPNs, wherein PE routers are spanning across multiple Autonomous Systems (ASes). In the context of an "association" of a packet to a VPN based on a VPN-label, VPNs generally may be classified into one two types referred to herein as VPN Type A and VPN Type B, each of which is discussed further below.

In the context of an "association" of a packet to a VPN based on a VPN-label, as indicated above, some VPNs may be classified as Type A VPNs. An egress PE router requires to identify only the VPN associated with a packet received with a VPN-Label, irrespective of the ingress PE router that has sent the packet. So, an egress PE router allocates one VPN-Label per VPN and advertises the same VPN-Label to all ingress PE routers. The VPN in FIG. 1 can be a layer-3 VPN such as IP VPN, wherein each PE router provides a virtual router instance within each VPN. BGP-signaled MPLS-based IP VPN is standardized in RFC 4364 (BGP/MPLS IP Virtual Private Networks (VPNs)). PE routers learn the IP routes within a locally connected VPN site by running a dynamic routing protocol with the CE router of the site or through static configuration of IP routes at the PE router. Those learned routes are advertised by BGP in the context of the VPN-ID (in BGP terminology it is called a Route Distinguisher (RD)) to all remote PE routers; the VPN-Label is exchanged along with the route advertisements. In case of IP VPN, the Native VPN Forwarding Table at the PE router is the Virtual Route Forwarding (VRF) Table. The routes (prefixes) learned in the VPN from remote PE routers and the routes learned from locally connected sites are installed in the VRF of the VPN. An ingress PE router receives an IP packet from a CE router in a VPN, looks up the destination IP address of the packet in corresponding VRF to retrieve the next-hop egress PE router, and sends the packet to the egress PE router with the VPN-Label advertised by the egress PE router. Upon receipt of an IP packet with a VPN-Label, an egress PE router identifies the VPN based on the VPN-Label and looks up the destination IP address of the packet in corresponding VRF to make further a forwarding decision.

In FIG. 1, the VPN can be a Layer-2 (L2) VPN, such as a BGP-signaled MPLS-based Ethernet VPN (EVPN), wherein the PE routers act as Ethernet switches for the VPN sites. EVPN is standardized in RFC 7432 (BGP MPLS-Based Ethernet VPN). Typically, PE routers learn the MAC addresses within a locally connected VPN site by an IEEE style of MAC learning action on the Ethernet packets received on the CE-PE access link (e.g., basically, source MAC addresses on the Ethernet Header are learned as the destinations reachable via the access link). Those learned MAC addresses are advertised by BGP in the context of the VPN-ID (e.g., Route Distinguisher) to all remote PE routers; the VPN-Label is exchanged along with the MAC address advertisements. In the case of EVPN, the Native VPN Forwarding Table at the PE router is a MAC Forwarding Table. A MAC address learned locally from the VPN site by an IEEE style of MAC learning action on an access link is installed in the MAC Forwarding Table with the access link as its next-hop. A MAC address learned from a remote PE router via BGP is installed in the MAC Forwarding Table with the remote PE router as its next-hop. An ingress PE router receives an Ethernet packet from a CE in a VPN and looks up the destination MAC address of the Ethernet packet in corresponding MAC Forwarding Table to retrieve the egress PE router that had advertised the MAC address. The ingress PE router then sends the packet to the egress PE router with the VPN-Label advertised by the egress PE router. Upon receipt of an Ethernet packet with a VPN-Label, the egress PE router forwards the packet to a local VPN site by looking up the destination MAC address of the packet in the MAC Forwarding Table.

In the context of an "association" of a packet to a VPN based on a VPN-label, as indicated above, some VPNs may be classified as Type B VPNs. In such VPNs, an egress PE router requires to identify both the VPN associated with a packet received with a VPN-Label and the ingress PE router that has sent the packet. So, an egress PE router allocates and advertises ones VPN-Label to each of the ingress PE routers in the VPN. An example is a Layer-2 VPN, such as VPLS (Virtual Private LAN Service), wherein the PE routers act as Ethernet switches for the VPN sites. VPLS is also known as Transparent LAN Service (TLS). The VPN-Labels are exchanged between PE routers by using either LDP or BGP signaling protocol. LDP-based VPLS is described in RFC 4762 (Virtual Private LAN Service (VPLS) Using Label Distribution Protocol (LDP) Signaling) and BGP-based VPLS is described in RFC 4761 (Virtual Private LAN Service (VPLS) Using BGP for Auto-Discovery and Signaling). A pair of VPN-Labels exchanged between two PE routers (one for each direction) are termed as a pseudowire (PW) since it provides an emulation of a wire to transmit Ethernet frames between the pair of PE routers. In VPLS, the Native VPN Forwarding Table at the PE router is a MAC Forwarding Table. An ingress PE router receives an Ethernet packet from a CE switch in a VPN and looks up the destination MAC address of the Ethernet packet in corresponding MAC Forwarding Table to retrieve the egress PE router. The ingress PE router also performs an IEEE style of MAC learning action to associate the source MAC address of the packet to the CE switch (i.e., the access link). The MAC learning action installs the learned source MAC address of the packet into MAC Forwarding Table as a destination MAC address and points to CE switch as the next-hop for the address. The ingress PE router then sends the packet to the egress PE router with the VPN-Label advertised by the egress PE router. Upon receipt of an Ethernet packet with a VPN-Label, the egress PE router identifies the VPN and the ingress PE router based on the VPN-Label. The egress PE router performs an IEEE style of MAC learning action to associate the source MAC address of the packet to the ingress PE router and then forwards the packet by looking up the destination MAC address in the MAC Forwarding Table. The MAC learning action installs the learned source MAC address of the packet into the MAC Forwarding Table as a destination MAC address and points to ingress PE router as the next-hop for the MAC address. Due to the MAC learning action, an egress PE router needs to identify both the VPN and ingress PE router associated with the received packet.

It is noted that BGP-EVPN is the alternative of VPLS. As evident, a key difference between BGP-EVPN and VPLS is that BGP-EVPN replaces the IEEE style of MAC learning action on the packets exchanged between a pair of PE routers with the BGP based advertisement of MAC addresses. VPLS is the only described case for VPN Type B; so except for VPLS, all other VPNs are expected to fall into the category of VPN Type A. It is further noted that a VPLS in which a single VPN-Label can be allocated and advertised by a PE router to all remote PE routers also is considered to fall into the category of VPN Type A.

It is noted that, since PE routers are not directly connected with each other, the packets encapsulated by a VPN-Label will be tunneled between the PEs across the public network using various tunneling methods, such as MPLS-based Label Switched Paths (LSPs), MPLS over UDP (MPLSoUDP), IP-based tunneling methods (e.g., Generic Routing Encapsulation (GRE), Virtual Extensible Local Area Network (VXLAN), or the like), or the like. Herein, such tunnels are referred to as Packet Switched Network (PSN) Tunnels. For simplicity, various example embodiments presented herein are primarily illustrated with MPLS LSPs as the PSN Tunnels. MPLS LSPs may be LSPs set-up by protocols (e.g., LDP (Label Distribution Protocol), RSVP-TE (Resource Reservation Protocol—Traffic Engineering), or the like) or may be source routed stateless LSPs (e.g., SR (Segment Routing), SR-TE (Segment Routing—Traffic Engineering), or the like). Between two PE routers, packets from multiple VPNs can be multiplexed and sent on the same PSN tunnel between the PEs since the VPN-Label acts as a demultiplexer to distinguish packets for the VPNs.

Herein, for simplicity, the embodiments illustrate multiple VPNs spanning across the same set of PE routers; however, it is possible that VPNs may have only a subset of PE routers in common.

To illustrate forwarding of VPN packets from one site to another site of a VPN, consider an example in FIG. 1. Assume that the following are the distribution of VPN-Labels by each PE router for VPN 120 of Type A and VPN 130 of Type B. For VPN Type A, the VPN-Labels are denoted by mnemonic "L<middle digit of VPN number><advertising PE>". For VPN Type B, the VPN-Labels are denoted by mnemonic "L<middle digit of VPN number><advertising PE><remote PE>".

In router 110 (PE(A)), the VPN-Labels are as follows. For VPN 120, the labels are as follows: (1) to router 111 (PE(B))=L2A, (2) to router 112 (PE(C))=L2A, and (3) to router 113 (PE(D))=L2A. For VPN 130, the labels are as follows: (1) to router 111 (PE(B))=L3AB, (2) to router 112 (PE(C))=L3AC, and (3) to router 113 (PE(D))=L3AD.

In router 111 (PE(B)), the VPN-Labels are as follows. For VPN 120, the labels are as follows: (1) to router 110 (PE(A))=L2B, (2) to router 112 (PE(C))=L2B, and (3) to router 113 (PE(D))=L2B. For VPN 130, the labels are as follows: (1) to router 110 (PE(A))=L3BA, (2) to router 112 (PE(C))=L3BC, and (3) to router 113 (PE(D))=L3BD.

In router 112 (PE(C)), the VPN-Labels are as follows. For VPN 120, the labels are as follows: (1) to router 110 (PE(A))=L2C, (2) to router 111 (PE(B))=L2C, and (3) to router 113 (PE(D))=L2C. For VPN 130, the labels are as follows: (1) to router 110 (PE(A))=L3CA, (2) to router 111 (PE(B))=L3CB, and (3) to router 113 (PE(D))=L3CD.

In router 113 (PE(D)), the VPN-Labels are as follows. For VPN 120, the labels are as follows: (1) to router 110 (PE(A))=L2D, (2) to router 111 (PE(B))=L2D, and (3) to router 112 (PE(C))=L2D. For VPN 130, the labels are as follows: (1) to router 110 (PE(A))=L3DA, (2) to router 111 (PE(B))=L3DB, and (3) to router 112 (PE(C))=L3DC.

In this example, assume that there is at least one MPLS LSP between each PE router as follows. The LSPs are denoted by mnemonic LSP_<source router><destination router>. The label advertised by each downstream router for the LSP is denoted by mnemonic L<source router><destination router>_<advertising/downstream router>.

For source router 110 (PE(A)), the LSPs are as follows. For destination router 111 (PE(B)), LSP_AB=LSP along path 110→103→111, the label advertised by 103 to 110 is LAB_F, and the label advertised by 111 to 103 is LAB_B. For destination router 112 (PE(C)), LSP_AC=LSP along path 110→102→104→112, the label advertised by router 102 to router 110 is LAC_E, the label advertised by router 104 to router 102 is LAC_G, and the label advertised by router 112 to router 104 is LAC_C. For destination router 113 (PE(D)), LSP_AD=LSP along path 110→103→104→113, the label advertised by router 103 to router 110 is LAD_F, the label advertised by router 104 to router 103 is LAD_G, and the label advertised by router 113 to router 104 is LAD_D.

For source router 111 (PE(B)), the LSPs are as follows. For destination router 110 (PE(A)), LSP_BA=LSP along path 111→102→110, the label advertised by router 102 to router 111 is LBA_E, and the label advertised by router 110 to router 102 is LBA_A. For destination router 112 (PE(C)), LSP_BC=LSP along path 111→102→104→112, the label advertised by router 102 to router 111 is LBC_E, the label advertised by router 104 to router 102 is LBC_G, and the label advertised by router 112 to router 104 is LBC_C. For destination router 113 (PE(D)), LSP_BD=LSP along path 111→102→104→113, the label advertised by router 102 to router 111 is LBD_E, the label advertised by router 104 to router 102 is LBD_G, and the label advertised by router 113 to router 104 is LBD_D.

For source router 112 (PE(C)), the LSPs are as follows. For destination router 110 (PE(A)), LSP_CA=LSP along path 112→105→103→110, the label advertised by router 105 to router 112 is LCA_H, the label advertised by router 103 to router 105 is LCA_F, and the label advertised by router 110 to router 103 is LCA_A. For destination router 111 (PE(B)), LSP_CB=LSP along path 112→105→103→111, the label advertised by router 105 to router 112 is LCB_H, the label advertised by router 103 to router 105 is LAC_F, and the label advertised by router 111 to router 103 is LAC_B. For destination router 113 (PE(D)), LSP_CD=LSP along path 112→104→105→113, the label advertised by router 104 to router 112 is LCD_G, the label advertised by router 105 to router 104 is LCD_H, and the label advertised by router 113 to router 105 is LCD_D.

For source router 113 (PE(D)), the LSPs are as follows. For destination router 110 (PE(A)), LSP_DA=LSP along path 113→105→102→110, the label advertised by router 105 to router 113 is LDA_H, the label advertised by router 102 to router 105 is LDA_E, and the label advertised by router 110 to router 102 is LDA_A. For destination router 111 (PE(B)), LSP_DB=LSP along path 113→105→103→111, the label advertised by router 105 to router 113 is LDB_H, the label advertised by router 103 to router 105 is LDB_F, and the label advertised by router 111 to router 103 is LDB_B. For destination router 112 (PE(C)), LSP_DC=LSP along path 113→104→112, the label advertised by router 104 to router 113 is LDC_G, and the label advertised by router 112 to router 104 is LDC_C.

In the forwarding plane of a PE router, the VPN connectivity to/from other PE routers are programmed in FTN and Incoming Label Map (ILM) Tables. FTN and ILM Tables are not specific to VPNs, but the primary forwarding tables of any MPLS capable router for originating and processing labelled packets, respectively. An egress PE router programs the VPN-Labels advertised by it into the ILM Table. An ILM Table is the forwarding table in a transit or egress MPLS router, which is indexed by the labels advertised by the router from its local label space. Each ILM entry maps to the Next-Hop Label Forwarding Entry (NHLFE) that contains forwarding rules for packets received with the corresponding label. For example, forwarding rules in NHLFEs may include rules such as (1) a rule for, if a packet needs to be forwarded as an MPLS packet, pushing the label(s) for its next-hop into the packet for its next-hop and (2) if this is egress router (self), then the context of the packet contains a pointer to forwarding rules for the packet based on its "native" header of the packet. The ILM entries at each PE router are depicted in FIG. 2A (for router 110), FIG. 2B (for router 111), FIG. 2C (for router 112), and FIG. 2D (for router 113). The ILM entries at a PE router also show the entries for the MPLS LSPs terminating at the PE router since the ILM Table is common for all labelled packets. It is noted that the P routers also program the labels advertised by it for the MPLS LSPs traversing through it, but the ILMs in P routers are not shown as it is not relevant (since the tunneling method can be of any type).

An ingress PE router programs the VPN-Labels advertised by an egress PE router into a Forwarding Equivalence Class (FEC)-To-NHLFE (FTN) Table. In MPLS, a FEC is an identifier assigned to any traffic flow that is identified by a label. For example, {VPN-ID, Egress PE Router} is a type of FEC for VPNs. Similarly, an LSP identifier is a FEC for LSP Tunnels. Each FEC maps to an NHLFE that contains the label(s) to be pushed into the packet for a next-hop. In case of VPN, the next-hop in NHLFE is an egress PE router and the label is the VPN-Label advertised by the egress PE router. In case of an LSP tunnel, the next-hop in the NHLFE is the immediate next-hop of the tunnel and the label is the label advertised by that next-hop of the tunnel. The FTN entries at each PE router are depicted in FIG. 2A (for router 110), FIG. 2B (for router 111), FIG. 2C (for router 112), and FIG. 2D (for router 113). It is noted that each PE router is an ingress as well as egress PE router for a VPN.

Figure 2E:
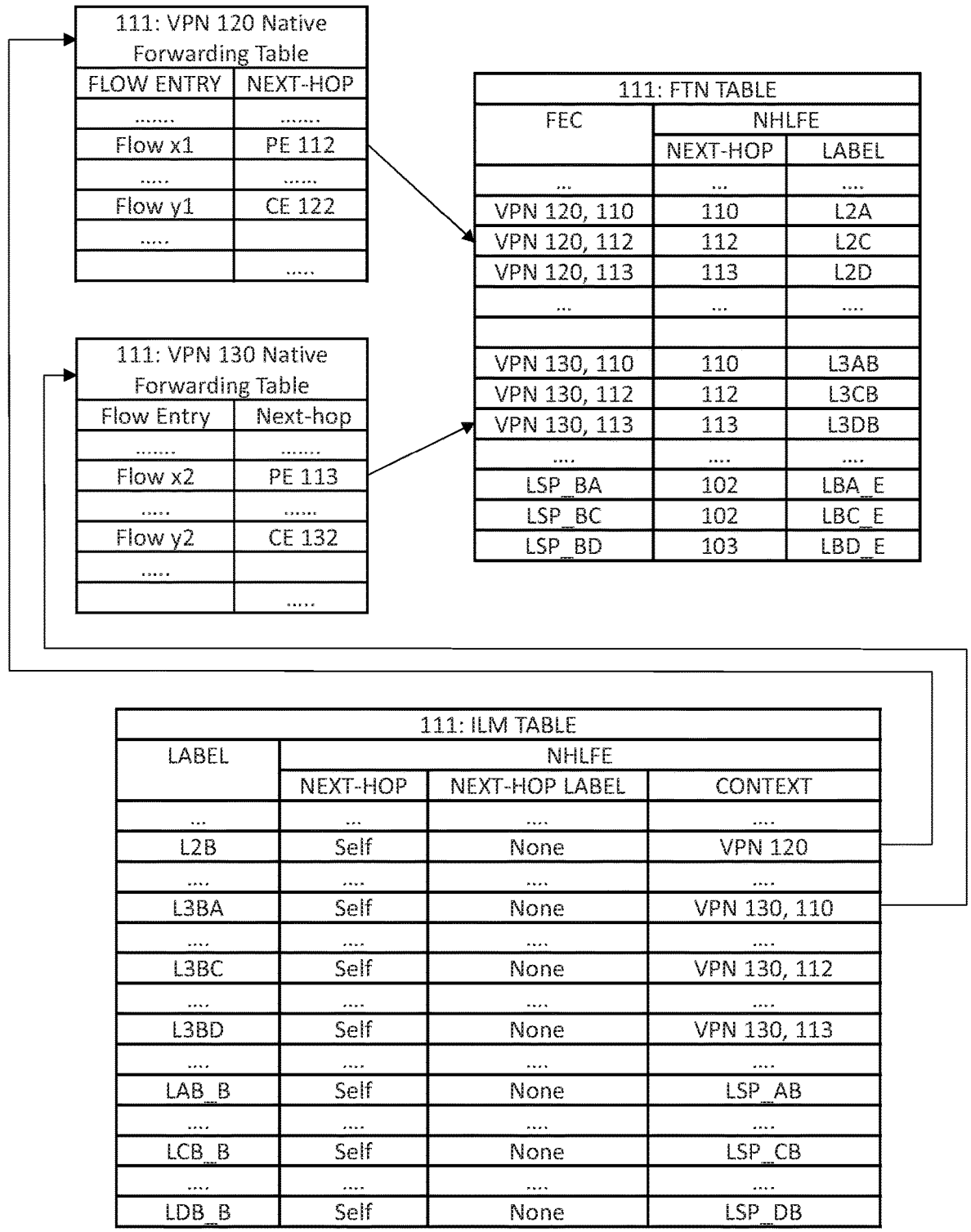

It will be appreciated that, in any PE router, VPN specific forwarding states are maintained in (1) the Native VPN Forwarding Table for the VPN, (2) entries for the VPN in FTN Table to retrieve the VPN-Labels to send packets to remote PE routers, and (3) entries for the VPN-Labels in ILM Table to receive and process VPN-Labeled packets from remote PE routers. The Native VPN Forwarding Tables in PE routers 110-113 are not shown in FIGS. 2A-2D. The same approach is maintained in subsequent examples, as the operations within the Native VPN Forwarding Tables are not relevant. In an ingress PE router, flows (forwarding rules) in the Native VPN Forwarding Tables are linked to VPN specific entries in FTN Table. In an egress PE router, VPN specific entries in ILM Table are linked to Native VPN Forwarding Table. An example of this concept is illustrated in FIG. 2E for PE router 111 (and subsequent examples assume the existence of this concept in PE routers 110, 112, and 113). In FIG. 2E, flow xl in the Native VPN Forwarding Table for VPN 120 is programmed with the next-hop as PE 112. If router 111 receives a native packet from CE 122 for VPN 120 and it matches the flow xl, then it is to be sent to PE 112. So, router 111 looks up the entry {VPN 120, 112} in its FTN Table to retrieve the VPN-Label L2C to be pushed onto the packet. If router 111 receives a labeled packet with label L2B, then the ILM entry for the label indicates the context as VPN 120. So, router 111 pops the label L2B and then looks up the native packet in Native VPN Forwarding Table for VPN 120. If the native packet matches the flow yl, then the packet is forwarded to CE 122. As discussed further below, VPNs may be used to support unicasting of packets and multicasting of packets.

As indicated above, a VPN may be used to support unicast services. This may be further understood with respect to an example as follows.

In this example, assume that CE 122 forwards a packet "P1" to router 111 via access link 122→111. When P1 is received by router 111, it associates P1 to VPN 120 since the access link 122-111 is assigned to VPN 120. Then, router 111 looks up the Native VPN Forwarding Table for VPN 120 to make forwarding decision for P1 based on its destination address. Assume that, based on the lookup, router 111 decides to unicast P1 to router 112 (i.e., next-hop for the packet in the VPN). So, router 111 looks up entry {VPN 120, 112} in the FTN Table (FIG. 2B) and the action in the FTN entry pushes VPN-Label L2C onto P1. Further, router 111 decides to tunnel the VPN labeled packet to router 112 via LSP_BC, so it looks up the FTN entry for LSP_BC and the action in the FTN entry pushes label LBC_E to send P1 to the LSP's next-hop 102. The resultant packet {LBC_E, L2C, P1} is finally sent to router 102. It is noted that, herein, unless indicated otherwise, the left most label is the outermost label in the label stack.

In this example, when the packet {LBC_E, L2C, P1} is received by router 102, it looks up the ILM entry for LBC_E. The action in the ILM entry swaps the LSP label LBC_E with LBC_G towards router 104 and the resultant packet {LBC_G, L2C, P1} is sent to router 104. Similarly, when the packet {LBC_G, L2C, P1} is received by router 104, it swaps the LSP label LBC_G with LBC_C towards router 112 and the resultant packet {LBC_C, L2C, P1} is sent to router 112. When router 112 receives the packet {LBC_C, L2C, P1}, it looks up the topmost label LBC_C in its ILM Table (FIG. 2C). The ILM entry indicates termination of LSP_BC, so router 112 pops label LBC_C. The router 112 then finds another label L2C, so it looks up label L2C in the ILM Table. The ILM entry for L2C indicates it as the egress router for VPN 120, so the label L2C is popped as well. The router 112 then looks up the destination address of the resultant packet P1 in the Native VPN Forwarding Table for VPN 120, which results in forwarding P1 to CE 123. The entire path traversed by P1 from router 122 to router 123 is outlined in FIG. 1 (except the tunneled part wherein it is shown to be merged with the tunnel LSP_BC).

In this example, assume that CE 132 forwards a packet "P2" to router 111 via access link 132→111. When P2 is received by router 111, it associates P2 to VPN 130 since the access link 132-111 is assigned to VPN 130. Then, router 111 looks up the forwarding table for VPN 130 to make forwarding decision for P2 based on its destination address. Assume that, based on the lookup, router 111 decides to unicast P2 to router 112 (i.e., the next-hop for the packet in the VPN). So, router 111 looks up the entry {VPN 130, 112} in its FTN Table (FIG. 2B) and the action in the FTN entry pushes VPN label L3CB onto P2. Further, router 111 decides to tunnel the VPN labelled packet to router 112 via LSP_BC, so it looks up the FTN entry for LSP_BC and the action in the FTN entry pushes label LBC_E to send P2 to the LSP's next-hop router 102. The resultant packet {LBC_E, L3CB, P2} is finally sent to router 102.

In this example, when the packet {LBC_E, L3CB, P2} is received by router 102, it looks up the ILM Table for topmost label LBC_E. The action in the ILM entry swaps the LSP label LBC_E with LBC_G towards router 104 and the resultant packet {LBC_G, L3CB, P2} is sent to router 104.

Similarly, when the packet {LBC_G, L3CB, P2} is received by router 104, it swaps the LSP label LBC_G with LBC_C towards router 112 and the resultant packet {LBC_C, L3CB, P2} is sent to router 112. When router 112 receives the packet {LBC_C, L3CB, P2}, it looks up the topmost label LBC_C in its ILM Table (FIG. 2C). The ILM entry indicates that router 112 is termination of LSP_BC, so router 112 pops the label LBC_C. Then router 112 finds another label L3CB in the packet and looks up that label in the ILM Table. The ILM entry for L3CB indicates that router 112 is the egress router for VPN 130 and the packet is sent from router 111, so the label L3CB is popped as well. The router 112 then looks up the destination address of the resultant packet P2 in the forwarding table for VPN 130, which results in forwarding to CE 133. It may also perform source specific actions on the packet; herein the source is router 111 as determined from the ILM entry for L3CB. The entire path traversed by P2 from router 132 to router 133 is outlined in FIG. 1 with (except the tunneled part, wherein it is shown to be merged with the tunnel LSP_BC).

It is noted that the transmission of packets P1 and P2 across the public network 101 illustrates how packets from different VPNs are multiplexed over a single PSN tunnel LSP_BC (outlined in FIG. 1).

As indicated above, a VPN may be used to support multicast services. A VPN may multicast a packet to a subset of remote sites. When the subset of remote sites includes all the remote sites, then the multicast is usually referred to as a broadcast; however, herein, as a generic convention, the term multicast is used to describe any transmission that requires a packet to be sent to more than one receiver (or remote site). For example, in VPLS, Broadcast, Unlearned Unicast, Multicast (BUM) Ethernet packets are flooded by a PE router to all remote PE routers. In IP VPN, CE routers receive Internet Group Management Protocol (IGMP) join requests from the LAN in the VPN site for the interested IP multicast groups. The CE routers run PIM (Protocol Independent Multicast) protocol with the PE router to which it is connected. The IGMP join from the LAN triggers a PIM join to PE router. Then PE router installs the IP multicast group IP address into the VRF with the CE router as leaf. The PE router becomes the egress/leaf for the multicast group with respect to all remote/ingress PE routers in the VPN. The egress PE router then advertises the group address to all ingress PE routers via BGP in the context of the VPN. In a similar manner, multiple PE routers may advertise interest for the multicast group. When an ingress PE router receives an IP packet from a CE with the destination IP address as multicast group address, then it looks up the VRF of the corresponding VPN to multicast the packet to interested egress PE routers. Multicast in IP VPNs is described in RFC 6513 (Multicast in MPLS/BGP IP VPNs). It is noted that, irrespective of the type of VPN, a multicast packet can be transmitted from an ingress PE router to a set of egress PE routers using multicast with ingress replication or multicast with an MDT, each of which is discussed below.

Figure 3:
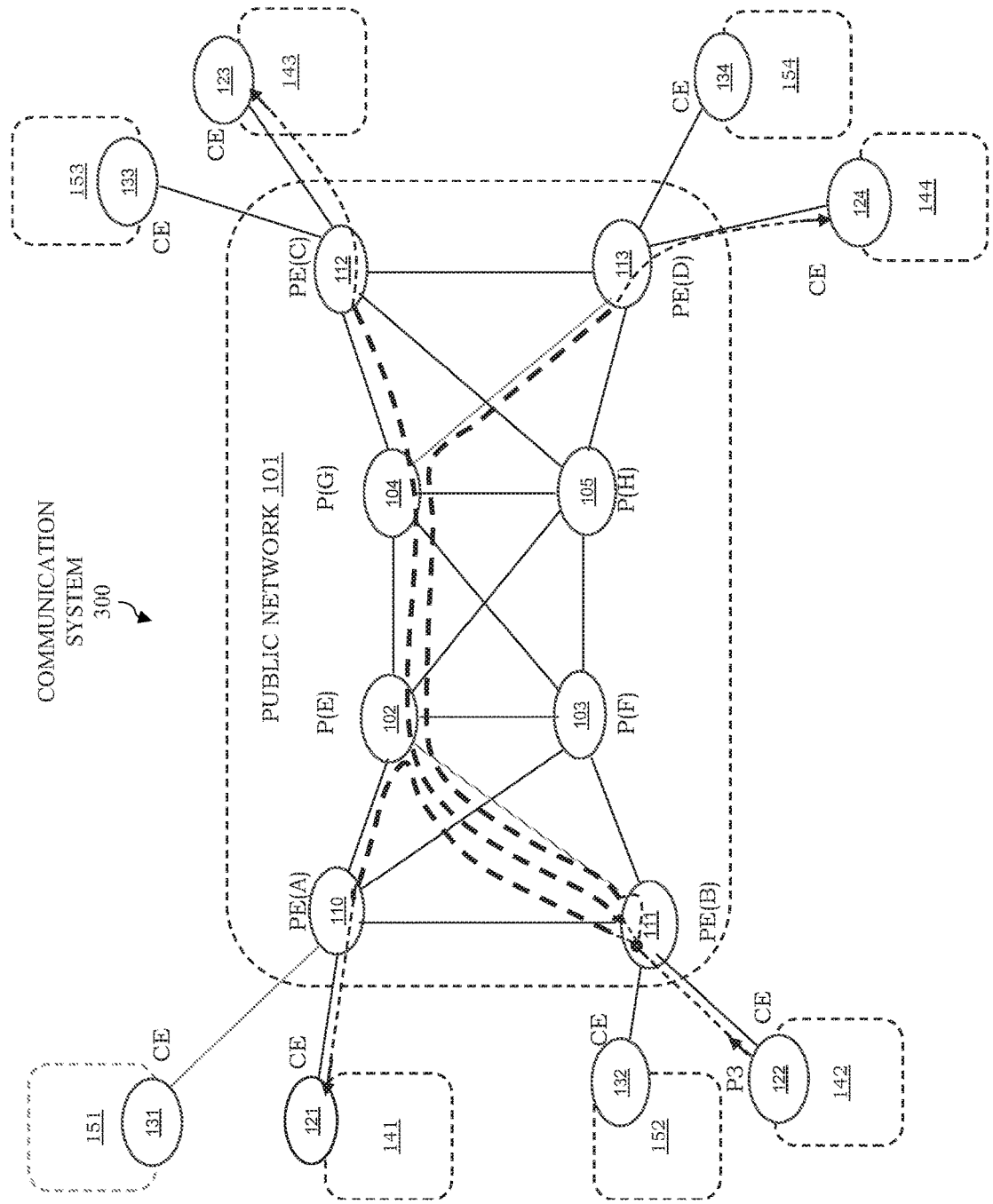
FIG. 3 depicts the communication system of FIG. 1 for illustrating multicast based on ingress replication.

As indicated above, a multicast packet can be transmitted from an ingress PE router to a set of egress PE routers by multicast with ingress replication. In this model, the ingress PE router replicates a copy of the packet to the each of the remote PE routers, and each copy gets forwarded to the respective PE router as a unicast packet. This is illustrated in FIG. 3, which uses same topology and notations as FIG. 1. As depicted in communication system 300 of FIG. 3, CE 122 forwards a packet P3 to router 111 via access link 122→111. When P3 is received by router 111, it associates P3 to VPN 120 since the access link 122-111 is assigned to VPN 120. Assume that, after looking up the destination address of P3 in the forwarding table of VPN 120, router 111 decides to multicast P3 to all remote routers 110, 112, and 113. Then, router 111 unicasts a copy of P3 to each of routers 110, 112, and 113 as follows: (1) the copy to router 110 is sent on LSP_BA as {LBA_E, L2A, P3}, (2) the copy to PE 112 is sent on LSP_BC as {LBC_E, L2C, P3}, and (3) the copy to PE 113 is sent on LSP_BD as {LBD_E, L2D, P3}. Each copy travels independently using similar procedures described above for unicast packets. This model of multicast does not require any additional states other than the ones mentioned in FIGS. 2A-2D.

As indicated above, a multicast packet can be transmitted from an ingress PE router to a set of egress PE routers multicast with an MDT. Ingress replication-based multicast, as discussed above, puts the entire replication load on the ingress PE router and makes no attempt to optimize multicast routing across the public network. For example, the LSPs LSP_BA, LSP_BC, and LSP_BD traverse the common link 111→102. So, three unicast copies of the packet traverse the same link, which is sub-optimal and consumes three times the actual required bandwidth. Similarly, LSP_BC and LSP_BD traverse the common link 102→104. So, an optimal solution is to build an MDT among the PE routers on the VPN. This is illustrated in FIG. 4, which uses same topology and notations as FIG. 1.

In its simplest form, an MDT is a Point-to-Multipoint (P2MP) tree with an ingress router (also called the root) and branches forming a spanning tree through the network to egress routers (also called leaves). The MDT branches out only when it is required to take a diverse path to a subset of egress routers. The ingress router sends a single copy of the packet on the MDT, which is replicated only at the branches on the MDT. The MDT ensures that only one copy of the packet traverses a specific link, so bandwidth is used optimally. In communication system 400 of FIG. 4, a P2MP tree is formed with router 111 as the ingress router and routers 110, 112, and 113 as the egress routers. Traffic on the P2MP tree flows from the ingress towards the egress routers. An MDT could be also a Multipoint-to-Multipoint (MP2MP) tree wherein each leaf is also a root, so any router participating in the MP2MP tree can send packets to other participants as well as receive from other participants. A MP2MP MDT is also referred to as Any Source Multicast (ASM) tree. It will be appreciated that various types of MDTs may be used, as discussed further below.

As indicated above, various types of MDTs may be supported. For example, an MDT may include a stateful IP based multicast tree such as signaled by PIM (e.g., where PIM may be based on RFC 7761 (Protocol Independent Multicast—Sparse Mode (PIM-SM): Protocol Specification (Revised)) or RFC 3973 (Protocol Independent Multicast—Dense Mode (PIM-DM): Protocol Specification (Revised)) or the like, a stateful P2MP LSP such as signaled by mLDP (e.g., mLDP based on RFC 6388 (Label Distribution Protocol Extensions for Point-to-Multipoint and Multipoint-to-Multipoint Label Switched Paths) or the like), P2MP RSVP-TE (e.g., P2MP RSVP-TE based on RFC 4875 (Extensions to Resource Reservation Protocol—Traffic Engineering (RSVP-TE) for Point-to-Multipoint TE Label Switched Paths (LSPs)) or the like), or the like, a stateful MP2MP LSP such as signaled by mLDP or the like, or a stateless multicast tree using Bit Indexed Explicit Replication (BIER) (e.g., BIER based on RFC 8279 (Multicast Using Bit Index Explicit Replication (BIER)) or the like), or the like. For purposes of clarity, various example embodiments presented herein are primarily presented within the context of MPLS-based MDTs, which are generically referred to as MultiPoint (MP) LSPs (which are considered to include both P2MP and MP2MP LSP types); however, it will be appreciated that various example embodiments also may be used within the context of other types of MDTs.

In FIG. 4, the MP LSP is a stateful P2MP LSP signaled by mLDP. mLDP uses leaf initiated LSP setup with reverse path signaling (i.e., label mapping) towards the root. Here, reverse path means the direction of signaling is opposite to the direction of traffic flow. So, in FIG. 4, the egress routers 110, 112, and 113 initiate signaling towards the ingress router 111. The signaling messages follow the shortest path towards ingress router 111. This P2MP LSP is denoted as {111, MLSP_1}, i.e., in the form of {<root>, <some form of a MP LSP identifier>}. The egress router 112 sends the label mapping for {111, MLSP_1} with label ML_112_1 to upstream router 104 as upstream router 104 is the shortest path next-hop towards root router 111 in its unicast routing table. Similarly, the egress router 113 sends the label mapping for {111, MLSP_1} with label ML_113_1 to upstream router 104 as upstream router 104 is the shortest path next-hop towards root router 111 in its unicast routing table. The router 104, on receipt of label mappings from router 112 and router 113, merges the label mappings such that router 104 becomes the branching point for router 112 and router 113. The router 104 then sends a label mapping for {111, MLSP_1} with label ML_104_1 to upstream router 102 as upstream router 102 is the shortest path next-hop towards root router 111 in its unicast routing table. The egress router 110 sends the label mapping for {111, MLSP_1} with label ML_110_1 to upstream router 102 as upstream router 102 is the shortest path next-hop towards root router 111 in the unicast routing table. The router 102, on receipt of label mappings from router 110 and router 104, merges the label mappings such that router 102 becomes the branching point for router 110 and router 104. The router 102 then sends a label mapping for {111, MLSP_1} with label ML_102_1 to upstream router 111 as upstream router 111 is the shortest path next-hop towards root router 111 in its unicast routing table. The router 111, upon receiving the label mapping from router 102 for {111, MLSP_1}, identifies itself as the root and the formation of the P2MP LSP is complete.

In FIG. 4, as indicated above, the MP LSP is a stateful P2MP LSP signaled by mLDP. As a result, establishment of P2MP LSP {111, MLSP_1} as discussed with respect to FIG. 4 results in updates to the ILM and FTN Tables at the PE routers. FIGS. 5A-5D depict examples of updated ILM and FTN Tables at the PE routers of the communication system of FIG. 1 for the P2MP LSP of the communication system of FIG. 4. Namely, the updates to the ILM and FTN Tables as depicted in FIGS. 5A-5D are updates to the ILM and FTN Tables as depicted in FIGS. 2A-2D. It is noted that the ILM Table states of the P2MP LSP in the P routers are not shown. The updates to the ILM and FTN Tables are as flows: (1) an FTN entry is added for the P2MP LSP {111, MLSP_1} into the FTN Table in PE 111 (FIG. 5B), (2) an ILM entry for the P2MP LSP {111, MLSP_1} is added to the ILM Table in PE 110 (FIG. 5A), (3) an ILM entry for the P2MP LSP {111, MLSP_1} is added to the ILM Table in PE 112 (FIG. 5C), and (4) an ILM entry for the P2MP LSP {111, MLSP_1} is added to the ILM Table in PE 113 (FIG. 5D).

It will be appreciated that, using P2MP LSP {111, MLSP_1} of FIG. 4, any packet can be multicast from router 111 to the routers 110, 112, and 113 as follows. The packet is sent from router 111 to router 102 with label ML_102_1 (using the FTN entry for the LSP in FIG. 5B). On receipt of the packet, the router 102 replicates the packet into two copies as follows: (1) Copy 1: Incoming label ML_102_1 is swapped with label ML_110_1 and is sent to branch next-hop router 110 an (2) Copy 2: Incoming label ML_102_1 is swapped with label ML_104_1 and is sent to branch next-hop router 104. When Copy 1 is received by router 110, the label ML_110_1 identifies that it is the egress router for the P2MP LSP {111, MLSP_1} so router 110 pops label ML_110_1 and the resultant packet is delivered to the context associated with the LSP. When Copy 2 is received by router 104, router 104 replicates the packet into two copies as follows: (1) Copy 3: Incoming label ML_104_1 is swapped with label ML_112_1 and is sent to branch next-hop router 112 and (2) Copy 4: Incoming label ML_104_1 is swapped with label ML_113_1 and is sent to branch next-hop router 113. When Copy 3 is received by router 112, the label ML_112_1 identifies that it is the egress router for the P2MP LSP {111, MLSP_1}, so router 112 pops label ML_112_1 and the resultant packet is delivered to the context associated with the LSP. When Copy 4 is received by 113, the label ML_113_1 identifies that it is the egress router for the P2MP LSP {111, MLSP_1}, so router 113 pops the label ML_113_1 and the resultant packet is delivered to the context associated with the LSP.

It will be appreciated that, although omitted for purposes of clarity, each PE router as the root can have one more MDTs to one or more subsets of remote PE routers as the egress/leaf devices.

In some example embodiments, there can be an exclusive MDT per VPN (e.g. 1:1 mapping). Since each egress PE router advertises its own VPN-Label from its local label space, the VPN-Labels cannot be used to multiplex multicast packets from multiple VPNs on a single MDT. Here, one solution is to dedicate an MDT exclusively to a VPN for sending its multicast traffic. If a VPN has multicast flow states with disjoint subsets of egress PE routers, then the VPN may use one dedicated MDT for each disjoint subset of egress PE routers. This is illustrated in FIG. 4. The egress routers 110, 112, and 113 of the P2MP LSP 1111, MLSP_11 are pinned to receive traffic for VPN 120 only. This means that any packets received on the P2MP LSP by the egress routers are directly looked up the forwarding table of VPN 120 to make further forwarding decisions. The ingress router 111 of the P2MP LSP 1111, MLSP_11 is pinned to send traffic for VPN 120 only. Since the P2MP LSP is dedicated for VPN 120, no VPN specific label is pushed before forwarding the packet on the LSP. The VPN packet with its "native" header is directly sent on the P2MP LSP, with the P2MP LSP specific label only. This may be further understood with respect to the following example.

In this example, assume that CE 122 forwards a packet P4 to router 111 on access link 122→111. The ingress PE router 111, since the link 122-111 is configured for VPN 120, on receipt of P4, associates P4 with VPN 120. The router 111 looks up the destination address of P4 in the forwarding table of VPN 120 and decides to multicast the packet to egress PE routers 110, 112, and 113 via P2MP LSP {111, MLSP_1}. So, router 111 pushes the LSP's next-hop label ML_102_1 and sends the resultant packet {ML_102_1, P4} to router 102. The router 102, on receipt of the packet {ML_102_1, P4}, replicates the packet into two copies as follows: (1) Copy 1: Incoming label ML_102_1 is swapped with label ML_110_1 and the resultant packet {ML_110_1, P4} is sent to branch next-hop router 110 and (2) Copy 2: Incoming label ML_102_1 is swapped with label ML_104_1 and the resultant packet {ML_104_1, P4} is sent to branch next-hop router 104. When Copy 1 is received by router 110, the label ML_110_1 identifies that it is the egress router for the P2MP LSP 1111, MLSP_11 which is tied to VPN 120, so router 110 pops label ML_110_1 and forwards P4 to CE 112 by looking up the forwarding table of VPN 120. When Copy 2 is received by router 104, the router 104 replicates the packet into two copies as follows: (1) Copy 3: Incoming label ML_104_1 is swapped with label ML_112_1 and the resultant packet {ML_112_1, P4} is sent to branch next-hop router 112 and (2) Copy 4: Incoming label ML_104_1 is swapped with label ML_113_1 and the resultant packet {ML_113_1, P4} is sent to branch next-hop router 113. When Copy 3 is received by router 112, the label ML_112_1 identifies that it is the egress router for the P2MP LSP {111, MLSP_1} which is tied to VPN 120, so router 112 pops label ML_112_1 and forwards P4 to CE 123 by looking up the forwarding table of VPN 120. When Copy 4 is received by router 113, the label ML_113_1 identifies that it is the egress router for the P2MP LSP {111, MLSP_1} which is tied to VPN 120, so router 113 pops label ML_113_1 and forwards P4 to CE 124 by looking up the forwarding table of VPN 120. It is noted that this method does not need any additional states other than the ones shown in FIGS. 5A-5D.

In some example embodiments, there can be an exclusive MDT supporting multiple VPNs (e.g., an N:1 mapping in which multiple VPNs are aggregated on an MDT). This may be used in some cases since use of a 1:1 mapping of VPNs to MDTs as discussed above may result in a scalability issue since the number of MDTs required is at least the number of VPNs provisioned across the PE routers. This is essentially equivalent to pushing VPN specific states to the core of the network (i.e., the P routers). In order to avoid such scalability issues, multicast flows from multiple VPNs may be aggregated or multiplexed on a single MDT, wherein egress routers of the MDT are common egress routers for all those aggregated flows. In this arrangement, the ingress PE router pushes a VPN specific label before pushing the MDT encapsulation on the packet, based on which egress routers can demultiplex the VPN associated with a received packet. Since each egress router would receive the same VPN specific label, the VPN specific label cannot be allocated from the local label space of an egress PE router; rather the label is allocated by the ingress PE router and is referred to as an upstream assigned label (UAL). The UAL introduced the concept of upstream assigned label space at a PE router since the UAL does not belong to the local label space (which is the space for downstream assigned labels) of the PE router. UALs and upstream assigned label spaces are described in RFC 5331 (MPLS Upstream Label Assignment and Context-Specific Label Space). In the current context, "upstream" in the upstream assigned label space is the root/ingress router of the MDT. An ingress PE router would allocate a UAL for each VPN from its upstream assigned label space and would advertise the UAL to all remote PE routers. For the remote PE routers, this means that the ingress PE router may send multicast packets for the VPN over an MDT with that UAL. This is based on each remote PE router maintaining an Upstream ILM Table for the ingress PE router, wherein each UAL advertised by the ingress PE router is programmed and mapped to the context (i.e., VPN). In a VPN, since any PE router can be ingress for a multicast flow, every PE router advertises a UAL for a VPN to rest of the PE routers. So, a PE router programs an Upstream ILM Table for each of the remote PE routers. It is noted that these Upstream ILM Tables are programmed by a PE router in addition to the default ILM Table. When an egress router receives a labeled packet on an MDT underneath the MDT encapsulation (e.g., if the MDT is a P2MP LSP, then the MDT encapsulation is the label of the LSP) then, by default, the egress router assumes the next label to be an UAL. Then, the egress router looks up the UAL in the Upstream ILM Table programmed for the ingress/root of the MDT in order to determine the context/VPN associated with the UAL. An example is presented with respect to FIG. 6.

Figure 6:
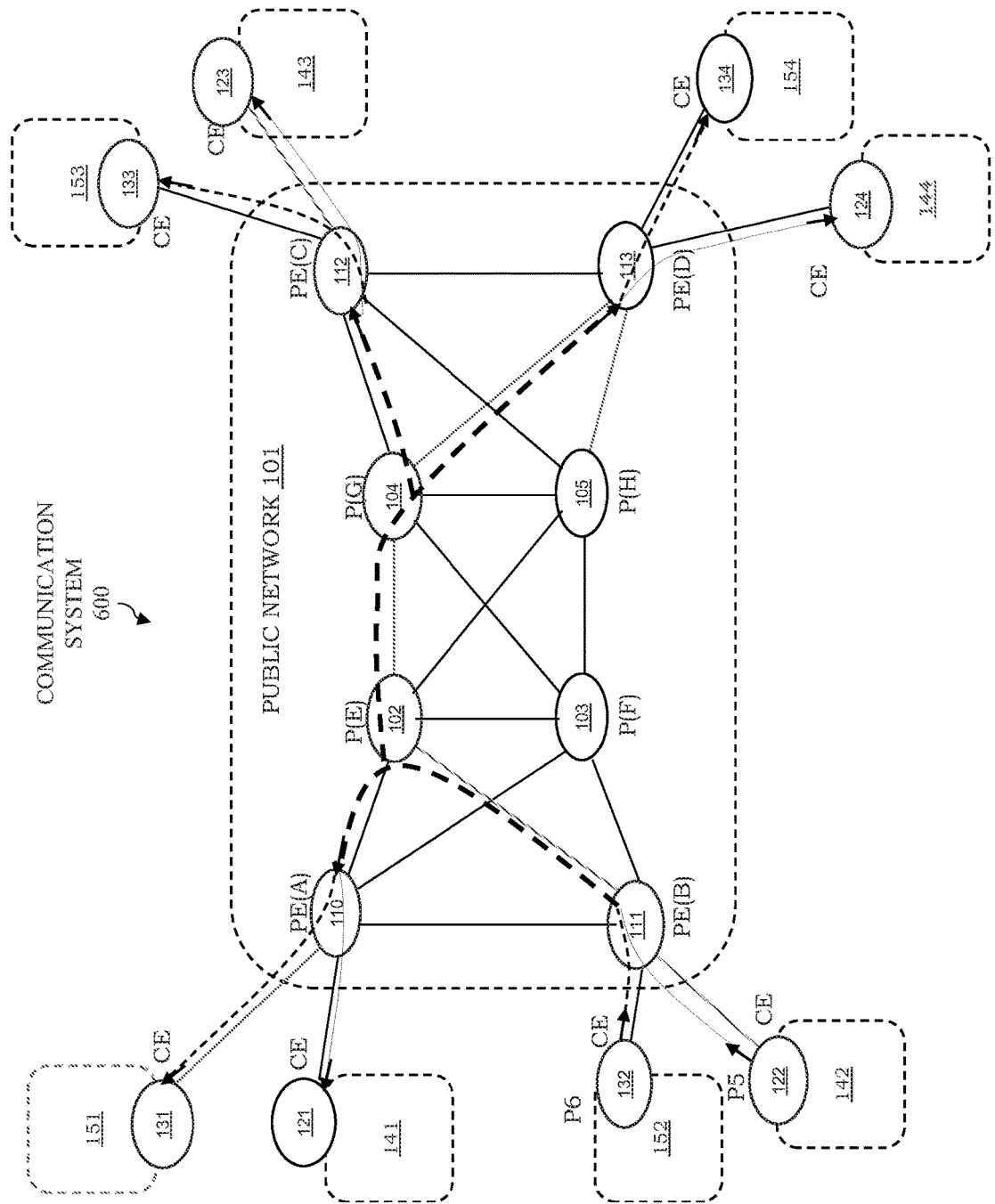
FIG. 6 depicts the communication system of FIG. 1 for illustrating aggregation of multicast packets from multiple VPNs on a P2MP LSP MDT based on use of upstream assigned labels (UAL) and upstream assigned label spaces.

FIG. 6 depicts the communication system of FIG. 1 for illustrating aggregation of multicast packets from multiple VPNs on a P2MP LSP MDT based on use of upstream assigned labels (UAL) and upstream assigned label spaces. In this scheme, a PE router that aggregates multicast traffic from multiple VPNs on a single MDT also assigns a UAL per VPN from its upstream assigned label space. This is in addition to the VPN-Label allocated from its local label space to receive unicast traffic on the VPN from remote PE router(s). In FIG. 6, the PE routers allocated UALs for VPN 120 and VPN 130 as follows (where the UALs are denoted by mnemonic UAL_<VPN Number>_<Upstream PE Router>): (1) for VPN 120, 110=UAL_120_110, 111=UAL_120_111, 112=UAL_120_112, and 113=UAL_120_113 and (2) for VPN 130, 110=UAL_130_110, 111=UAL_130_111, 112=UAL_130_112, and 113=UAL_130_113. Here, each PE router advertises the UALs to remote PE routers in the context of respective VPNs by using signaling protocols such as BGP, LDP, or the like. A PE router, upon receipt of the advertisement of UAL from a remote/upstream PE router, programs the UAL into the Upstream ILM Table for the remote/upstream PE router. FIGS. 7A-7D depict the resultant Upstream ILM Tables at PE router 112, which are maintained at PE router 112 in addition to the default ILM Table depicted in FIG. 5C. More specifically, FIGS. 7A-7C depict Upstream ILM Tables at PE router 112, whereas FIG. 7D depicts the Default ILM Table of FIG. 5C. In a similar manner, the PE routers 110, 111, and 113 also maintain upstream ILM Tables for their respective remote PE routers (although these have been omitted for purpose of brevity). The use of UALs and upstream assigned label spaces for aggregation of multicast packets from multiple VPNs on a P2MP LSP MDT may be further understood with respect to the following examples which are based on FIGS. 6 and 7.

In FIG. 6, assume that CE 122 forwards a packet P5 to router 111 over the access link 122→111. When router 111 receives the packet P5, it associates the packet P5 with VPN 120. The router 111 looks up the forwarding table of VPN 120, which results in multicast of the packet to PE routers 110, 112, and 113. The router 111 decides to multicast the packet using P2MP LSP {111, MLSP_1} that bears the respective PE routers as leaves. So, the router 111 pushes the UAL label UAL_120_111 assigned to VPN 120 onto P5, then pushes the P2MP LSP label ML_102_1, and then sends the resultant packet {ML_102_1, UAL_120_111, P5} to router 102. The router 102, upon receipt of the packet, looks up the outermost label ML_102_1 in its ILM Table which results in replicating the packet into following two copies: (1) Copy 1: The outermost label ML_102_1 is swapped with label ML_110_1 and the resultant packet {ML_110_1, UAL_120_111, P5} is sent to branch next-hop router 110 and (2) Copy 2: The outermost label ML_102_1 is swapped with label ML_104_1 and the resultant packet {ML_104_1, UAL_120_111, P5} is sent to branch next-hop router 104. When Copy 1 is received by router 110, the outermost label ML_110_1 identifies that it is the leaf router for the P2MP LSP 1111, MLSP_11, so router 110 pops label ML_110_1 and finds label UAL_120_111 underneath. The root of the P2MP LSP is router 111, so router 110 looks up UAL_120_111 in the upstream ILM Table for router 111, which results in association of the packet with VPN 120. The router 110 pops UAL_120_111 and forwards P5 to CE 121 by looking up the forwarding table of VPN 120. When Copy 2 is received by router 104, router 104 looks up the outermost label ML_104_1 in its ILM Table which results in replicating the packet into following two copies: (1) Copy 3: The outermost label ML_104_1 is swapped with label ML_112_1 and the resultant packet {ML_112_1, UAL_120_111, P5} is sent to branch next-hop router 112 and (2) Copy 4: The outermost label ML_104_1 is swapped with label ML_113_1 and the resultant packet {ML_113_1, UAL_120_111, P5} is sent to branch next-hop router 113. When Copy 3 is received by router 112, the outermost label ML_112_1 identifies that it is the leaf router for the P2MP LSP 1111, MLSP_11, so router 112 pops label ML_112_1 and finds label UAL_120_111 underneath. The root of the LSP is 111, so router 112 looks up UAL_120_111 in the upstream ILM Table for router 111 (FIG. 7B) which results in association of the packet with VPN 120. The router 112 pops label UAL_120_111 and forwards P5 to CE 123 by looking up the forwarding table of VPN 120. When Copy 5 is received by router 113, the outermost label ML_113_1 identifies that it is the leaf router for the P2MP LSP 1111, MLSP_11, router 113 pops label ML_113_1 and finds label UAL_120_111 underneath. The root of the LSP is 111, so router 113 looks up UAL_120_111 in the upstream ILM for 111 which results in association of the packet with VPN 120. The router 113 pops label UAL_120_111 and forwards P5 to CE 124 by looking up the forwarding table of VPN 120.

In FIG. 6, assume that CE 132 forwards a packet P6 to the router 111 over the access link 132→111. The router 111, upon receiving the packet P6, associates the packet with VPN 130. The router 111 looks up the forwarding table of VPN 130 which results in multicast of the packet to the routers 110, 112, and 113. The router 111 decides to multicast the packet using P2MP LSP {111, MLSP_1} that bears the respective PE routers as leaves. The router 111 pushes the UAL label UAL_130_111 assigned to VPN 130 onto P6, then pushes the P2MP LSP label ML_102_1, and then the resultant packet {ML_102_1, UAL_130_111, P6} to router 102. This packet is forwarded along the P2MP LSP and processed by leaf routers in a similar fashion as described above for packet P5.

It will be appreciated that, in a similar manner, any of the other routers 110, 112, an 113 can aggregate multicast packets from multiple VPNs to a subset of remote PE routers using respective UALs assigned to the VPNs and an MDT (rooted at the PE router and with the remote PE routers as the leaves).

Various example embodiments for supporting multicast communications may be configured to support use of network wide unique indices assigned to routers of a network for enabling the routers to receive both unicast traffic and multicast traffic in a VPN based on a downstream assigned VPN label (e.g., the same VPN Label can be encoded in unicast packets as well as multicast packets for the VPN among any pair of PE routers). Various example embodiments use the VPN specific entries in the FTN Table and in the default ILM Table at PE routers, for both unicast and multicast in VPNs, and, thus, do not incur any additional overhead in the forwarding plane.

Various example embodiments for supporting multicast communications may be configured to use network wide unique indices assigned to routers of a network in order to support encoding of an Indexed Label Stack (ILS), or other similar stack, in a MPLS packet that carries the tuples of {index, label} called Indexed Label Entries (ILEs), wherein the index in the ILE is the network wide unique index assigned to the receiving router (e.g., LSR) of the label in the ILE. It will be appreciated that, although primarily presented with respect to example embodiments in which the index is a network wide unique index assigned to a router, in at least some embodiments the index may have a different meaning or use in the receiving router (e.g., an identifier of a label space (i.e., other than the local label space) in the receiving router to which the label belongs or the like).

Various example embodiments for supporting multicast communications may be configured to use network wide unique indices assigned to routers of a network in order to support N:1 aggregation of multicast packets from multiple VPNs on a single MDT. Here, a PE router participating in any VPN is assigned a network wide unique integer index. The multicast packets for a VPN exchanged among PE routers encode an ILS, containing ILEs, wherein each ILE encodes the index of an egress PE router and the VPN-Label advertised by the PE router for the VPN from its local label space. An ILE is the indication of the VPN-Label in the local label space of the receiving PE router assigned with the index of the ILE. This enables simplified N:1 aggregation of multicast packets from multiple VPNs on a single MDT, without using an upstream assigned label space or upstream assigned labels (and, thus, obviating a need for PE routers to manage upstream assigned label spaces in addition to local label spaces) and without using Upstream ILM Tables (and, thus, obviating a need for PE routers to maintain additional forwarding state for Nx(M-1) entries which would otherwise be needed since there would be N number of VPNs among M number of PE routers such that the PE routers would need to maintain (M-1) number of upstream ILMs each containing N entries). It will be appreciated that, unlike the default ILM Table for downstream assigned labels (which may be maintained as an array requiring O(1) lookups to process a downstream assigned VPN Label since the local label space is a linear space of labels in a specific range), the implementation and lookup of an Upstream ILM Table is complex since, although upstream assigned label space is linear with respect to the upstream router, it generally is not possible to maintain an Upstream ILM Table as an array (e.g., because (1) the size of the upstream label space at the upstream router is unknown to the downstream PE router and (2) even though the size of the upstream label space can be advertised by the upstream PE router through modifications to VPN signaling protocols, it is not optimal to keep (M-1) number of Upstream ILM Tables as an array of the advertised size (wherein M is the total number of PE routers) and, thus, Upstream ILM Tables usually are implemented in compressed (space conserving) form such as using a hash table or other form of key→value-based lookup method that uses the UAL as the key (i.e., the implementation of the Upstream ILM Table, and lookup of UAL, is costly). As such, it will be appreciated that various embodiments may reduce or even eliminate various overheads and complexities which might otherwise be present when supporting multicast on VPNs.

Various example embodiments for supporting multicast communications may be configured to aggregate multicast from multiple VPNs on a single MDT, without using an upstream assigned label space, UALs, or Upstream ILM Tables, by using a single downstream assigned VPN Label per VPN to send and receive both unicast and multicast packets. It will be appreciated that such embodiments may be further understood with respect to FIG. 6. Here, each PE router allocates the downstream assigned VPN Labels and, thus, the VPN Labels allocated and advertised by PE routers for VPN 120 and VPN 130 in FIG. 5 prevail; however, additionally, each PE router participating in any VPN is assigned a unique index (e.g., integer or other suitable value) in the network. It is noted that, as discussed further below, such a network-wide unique index can be allocated to a PE router either dynamically or statically.

In at least some example embodiments, as indicated above, a network-wide unique index can be allocated to a PE router dynamically. The index may be dynamically computed by each PE router upon establishment of signaling sessions (e.g., BGP, LDP) to all remote PE routers. This method may be used when there is a full mesh of signaling sessions between all participating PE routers. As signaling sessions run atop IP (or any IP based transport such as TCP, UDP, or the like), so from the full mesh of signaling sessions, a PE router knows the IP addresses of all remote PE routers. Then, a PE router sorts all PE routers (including itself) by ascending order of their IP addresses and accordingly assigns indices 1 to P to the PE routers, wherein P is the max number P of PE routers. Thus, each PE router builds its own local copy of the PE→index mapping, which is consistent across the network. This may be further understood by way of reference to FIG. 6. For example, assume that, in FIG. 6, PE routers 110-113 are assigned the following IPv4 addresses that are also used to establish the signaling sessions: (1) router 110=10.10.10.1, (2) router 111=11.11.11.1, (3) router 112=12.12.12.1, and (4) router 113=13.13.13.1. So, each PE router sorts the IP addresses in following order and, accordingly, assigns network wide unique indexes to all PE routers as follows: (1) 10.10.10.1=>index 1=>PE 110, (2) 11.11.11.1=>index 2=>PE 111, (3) 12.12.12.1=>index 3=>PE 112, and (4) 13.13.13.1=>index 4=>PE 113.

In at least some example embodiments, as indicated above, a network-wide unique index can be allocated to a PE router statically. The index is statically assigned to a PE router from a network wide unique index space. The network wide unique index space may be also managed by a centralized controller (e.g., a centralized network management entity, a Software Defined Networking (SDN) controller, or the like). This may be further understood by way of reference to FIG. 6. Assume that, in FIG. 6, PE routers 110-113 are assigned the following indexes statically: (1) 110=index 1, (2) 111=index 2, (3) 112=index 3, and (4) 113=index 4. It is noted that static assignment may be used when PE routers do not have a direct signaling session with each other. For example, in BGP signaled VPNs, the PE routers may have signaling session to a common BGP Route Reflector (BGP-RR) through which the VPN advertisements are exchanged among the PE routers. Another scenario could be inter-AS BGP VPNs, wherein PE routers are spanning across multiple Autonomous Systems (ASes). When indexes are statically assigned, then VPN advertisements will include the index along with the VPN-Label.

Various example embodiments for supporting multicast communications may be configured to aggregate multicast from multiple VPNs on a single MDT based on use of an "Indexed Label Stack" (ILS) in a packet (e.g., MPLS packet), which conceptually encodes a stack of tuples of {index, label}. A tuple {index, label} is termed as an "Indexed Label Entry" (ILE). Within an ILE, the 'index' is a network wide unique integer index assigned to the receiver of the 'label'. For example, in FIG. 6, the VPN-label L2C is assigned by PE 112 to receive a packet for VPN 120 from remote PE routers. So, the ILE including the VPN Label can be encoded within ILS as {3, L2C}. Various example embodiments for supporting multicast communications may be configured to aggregate multicast traffic in VPNs on a single MDT by re-using the VPN-Label advertised by each egress PE router of the MDT. When a multicast packet for a VPN is sent by an ingress PE router to a set of egress PE routers, then the ingress PE router encodes an ILS containing ILEs for each of the egress PE routers (wherein an ILE encodes the index of the egress PE router and the VPN-Label advertised by the egress PE router for that VPN), pushes the ILS (which acts as a demultiplexer of the VPN to the egress PE routers) into the multicast packet, pushes MDT encapsulation onto the ILS, and sends the resulting packet on the MDT. Eventually, each egress PE router receives the packet on the MDT, removes MDT encapsulation and then processes the ILS. An egress PE router looks for the ILE that matches the index assigned to the egress PE router and uses the VPN-Label in the matching ILE to lookup in the default ILM Table in the egress PE router. The ILM table entry indicates that the context of the VPN-Label is a VPN, so the PE router pops the ILS and forwards the packet based on lookup in the forwarding table of the corresponding VPN.

Various example embodiments for supporting multicast communications, as discussed above, make it possible that (1) multicast packets from multiple VPNs can be aggregated on a single MDT using the ILSes of the respective VPNs (as by using the concept above each egress PE router of the MDT can map a received ILS to its corresponding VPN) and (2) the same VPN-Label can be encoded in unicast packets as well as in multicast packets for the VPN among any pair of PE routers. Thus, multicast traffic in a VPN reuses the forwarding state and infrastructure in the PE routers that is designated for the unicast traffic and, as such, eliminates the need for an upstream assigned label space and upstream ILMs. As such, a single downstream assigned VPN-Label may be used to receive both unicast and multicast packets for a VPN.

It is noted that the size of the ILS on a multicast packet is linearly dependent on the number of egress routers of the packet, i.e., the size of ILS grows as O(P), wherein P is the number of egress routers. So, various example embodiments presented herein may be useful when number of PE routers in a VPN is limited enough to cause tolerable overhead on ILS. In many cases, a VPN site has less than 50 sites (i.e., PE routers). So, considering 4B of MPLS Label, the overhead of ILS where a VPN includes 50 sites would be at least 4B×50=200B. It is noted that an embodiment of an efficient method to encode ILS is presented in FIG. 8A, wherein indices of PE routers consume very little overheard within the ILS and so VPN-Labels are only considered. For a packet having a size of 1500B size, the resulting overhead from use of the ILS would be approximately 13%.

It will be appreciated that, although primarily presented herein with respect to example embodiments in which ILS and ILE are used within the context of supporting communications of VPNs, in at least some example embodiments ILS and ILE may be used within other types of communication contexts (e.g., for supporting communications other than communications of VPNs).

It will be appreciated that the aggregation of multicast packets from multiple VPNs on a single MDT may be further understood with respect to the following two examples which are based on FIG. 6.

This first example is based on multicast packet P5 in FIG. 6. CE 122 forwards a packet P5 to router 111 over the access link 122→111. When router 111 receives the packet P5, the router 111 associates the packet P5 with VPN 120. The router 111 looks up the forwarding table of VPN 120, which results in multicast of the packet P5 to the routers 110, 112, and 113. The router 111 decides to multicast the packet using P2MP LSP {111, MLSP_1} that bears the respective PE routers as leaves. It encodes the ILS containing ILEs for routers 110, 112, and 113 as ILS={<1, L2A>, <3, L2C>, <4, L2D>}. It is noted that herein, unless indicated otherwise, an ILE would be denoted as enclosed within "<" and ">". The router 111 pushes the ILS, pushes the P2MP LSP label ML_102_1, and sends the resultant packet {ML_102_1, ILS={<1, L2A>, <3, L2C>, <4, L2D>}, P5} to router 102.

In continuation of this first example, on receipt of the packet, router 102 looks up the outermost label ML_102_1 in its ILM Table, which results in replicating the packet into following two copies: (1) Copy 1: The outermost label ML_102_1 is swapped with label ML_110_1 and the resultant packet {ML_110_1, ILS={<1, L2A>, <3, L2C>, <4, L2D>}, P5} is sent to branch next-hop 110 and (2) Copy 2: The outermost label ML_102_1 is swapped with label ML_104_1 and the resultant packet {ML_104_1, ILS={<1, L2A>, <3, L2C>, <4, L2D>}, P5} is sent to branch next-hop 104.

In continuation of this first example, when Copy 1 is received by router 110, router 110 looks up the outermost label ML_110_1 in its ILM Table. The ILM entry identifies that it is the egress/leaf router for the P2MP LSP 1111, MLSP_11. So, the router 110 pops label ML_110_1 and finds ILS={<1, L2A>, <3, L2C>, <4, L2D>}, underneath. The router 110 looks for the ILE within the ILS that matches its assigned index 1, and the matching ILE is <1, L2A>. So, the router 110 looks up the label L2A in the ILE in its ILM Table (FIG. 2A), which maps the label to VPN 120, so router 110 pops the ILS. The router 110 then forwards P5 to CE 121 by looking up the forwarding table of VPN 120.

In continuation of this first example, when Copy 2 is received by router 104, router 104 looks up the outermost label ML_104_1 in its ILM Table which results in replicating the packet into following two copies: (1) Copy 3: The outermost label ML_104_1 is swapped with label ML_112_1 and the resultant packet {ML_112_1, ILS={<1, L2A>, <3, L2C>, <4, L2D>}, P5} is sent to branch next-hop 112 and (2) Copy 4: The outermost label ML_104_1 is swapped with label ML_113_1 and the resultant packet {ML_113_1, ILS={<1, L2A>, <3, L2C>, <4, L2D>}, P5} is sent to branch next-hop 113.

In continuation of this first example, when Copy 4 is received by router 112, router 112 looks up the outermost label ML_112_1 in its ILM Table. The ILM entry identifies that router 112 is the egress/leaf router for the P2MP LSP {111, MLSP_1}. So, the router 112 pops label ML_112_1 and finds ILS={<1, L2A>, <3, L2C>, <4, L2D>}, underneath. The router 112 looks for the ILE within the ILS that matches its assigned index 3, and the matching ILE is <3, L2C>. So, the router 112 looks up the label L2C in the ILE in its ILM Table (FIG. 2C), which maps the label to VPN 120, so the router 112 pops the ILS. The router 112 then forwards P5 to CE 123 by looking up the forwarding table of VPN 120.

In continuation of this first example, when Copy 5 is received by router 113, router 113 looks up the outermost label ML_113_1 in its ILM Table. The ILM entry identifies that router 113 is the egress/leaf router for the P2MP LSP {111, MLSP_1}. So, the router 113 pops label ML_113_1 and finds ILS={<1, L2A>, <3, L2C>, <4, L2D>}, underneath. The router 113 looks for the ILE within the ILS that matches its assigned index 4, and the matching ILE is <4, L2D>. So, the router 113 looks up the label L2D in the ILE in its ILM Table (FIG. 2D), which maps the label to VPN 120, so the router 113 pops the ILS. The router 113 then forwards P5 to CE 124 by looking up the forwarding table of VPN 120.

This second example is based on multicast packet P6 in FIG. 6. Assume that CE 132 forwards a packet P6 to router 111 over the access link 132→111. When the router 111 receives the packet, the router 111 associates the packet with VPN 130. The router 111 looks up the forwarding table of VPN 130 which results in multicast of the packet to routers 110, 112, and 113. The router 111 encodes the ILS containing ILEs for routers 110, 112, and 113 as ILS={<1, L3AB>, <3, L3CB>, <4, L3DB>} and pushes the ILS onto packet P6. The router 111 decides to multicast the packet using P2MP LSP {111, MLSP_1} that bears the respective PE routers as leaves. So, the router 111 pushes the P2MP LSP label ML_102 onto the packet, and sends the resultant packet {ML_102, ILS={<1, L3AB>, <3, L3CB>, <4, L3DB>}, P6} to router 102. This packet is forwarded along the P2MP LSP and processed by leaf routers in a similar fashion as described for packet P5 in the first example.

Various example embodiments for supporting multicast communications, as discussed above, may be configured to use network wide unique indices assigned to routers of a network in order to support N:1 aggregation of multicast packets from multiple VPNs on a single MDT. Various example embodiments for supporting multicast communications may be configured to use the same VPN label, advertised by a PE router for a VPN from its local label space, to receive both unicast and multicast packets from a remote PE router (i.e., reuses the common packet forwarding infrastructure for both unicast and multicast packets). Various example embodiments for supporting multicast communications may be configured to solve problems in the category of Type A and Type B.

It will be appreciated that the encoding of the ILS in an MPLS packet may be performed in various ways, examples of which are presented in FIGS. 8A and 8B.

FIGS. 8A and 8B depict example embodiments of encoding of an ILS in an MPLS packet.

FIG. 8A depicts an example embodiment of encoding of an ILS in an MPLS packet. The ILS 801 of FIG. 8A includes three parts as follows: (1) an ILS Indicator (ILSI), (2) an Index Bit String (IBS), and (3) a Label Stack.

The ILSI is configured to provide an indication of the presence of the ILS in the MPLS packet. When an ILS is embedded in an MPLS label stack that includes "other" labels, a receiving router will need to be able to distinguish unambiguously between the ILS and the other labels. For example, in the case of tunneled VPN packets, the ILS is further encapsulated by the label of a MP LSP tunnel. To distinguish an ILS, the label immediately preceding the IBS is the ILSI (where preceding means closer to the top of the label stack and farther from the bottom of stack indication). ILSI is a special label that is not expected to be used for any other purposes (although it will be appreciated that it may be). It will be appreciated that a value of ILSI can be reserved at the International Assigned Numbers Authority (TANA) registry on Special-Purpose Labels. The EXP field in the ILSI is set to 0 as is it not expected to have any significance. The S-bit in the ILSI will be set to 0 since further labels will follow the ILSI. The TTL field in the ILSI has a special significance in that the TTL field is defined as a "BSL" field that indicates the length of the IBS that follows the ILSI. It is noted that the following BSL values may be used: (1) BSL=1, means the Index Bit String is of length 32-bits, (2) BSL=2, means the Index Bit String is of length 64 bits, (3) BSL=3, means the Index Bit String is of length 96 bits, and (4) BSL=4, means the Index Bit String is of length 128 bits. For example, BSL 1 can support up a maximum of 32 PE routers in a VPN, BSL 2 can support up to maximum of 64 PE routers in a VPN, and so forth. It will be appreciated that the BSL values may be assigned in other ways, other BSL values may be assigned, or the like, as well as various combinations thereof.

The IBS, which follows the ILSI, encodes, in a compressed form, the indices of all labels included in the ILS (i.e., the index part from each {index, label} tuple). The IBS encodes the indices of the labels as a bit string. A given index is encoded in the IBS by the setting the corresponding bit position in the IBS to 1 (it is noted that the bit positions are numbered from 1 onwards). For example, index 16 may be encoded in the IBS by setting bit position 16. When the ILS is encoded for multicast packets in a VPN, then the index assigned to each egress PE router of the multicast packet is encoded in IBS. The length of the IBS is specified in the BSL field in the ILSI.

The Label Stack, which follows the IBS, encodes the label part from each {index, label} tuple to be encoded in ILS. The labels are ordered in the label stack by ascending number of corresponding indices. When ILS is encoded for multicast packets in a VPN, then the VPN-Label advertised by each egress PE router of the multicast packet is encoded in the label stack. The EXP and TTL fields in a label will be set as required by the application. The S-bit is set to 0 if a label is not the last label in the stack. If a label is the last label in the stack, then S-bit is set to 1 if no more labels follow in the MPLS packet, otherwise the S-bit is set to 0.

It is noted that a receiver may find the label corresponding to an index as follows. The receiver checks whether the bit position is set for the index in the IBS. If the bit position is not set for the index in the IBS, then there is no label for the receiver. If the bit position is set for the index in the IBS, then the receiver finds the absolute sequence number of that bit position. The absolute sequence number of the bit position may be computed as: (number of lower bits preceding this bit that are set+1). The absolute sequence number is the index of the label in the label stack. Thus, the total number of labels in the label stack is determined by the total number of bit positions set in the IBS and, accordingly, the size of the ILS is determined as (total number of labels in the label stack+size of ILSI (=4B)+size of IBS as determined by BSL field in ILSI).

FIG. 8B depicts an example embodiment of encoding of an ILS in an MPLS packet. It will be appreciated that, while the encoding of the ILS as presented in FIG. 8A may be useful within the context of applications requiring a relatively small number of routers to be assigned indices (e.g., 20 routers, 50 routers, 100 routers, or the like). For example, some applications may require a very large number of routers to be assigned indices (e.g., 500 routers, 1000 routers, or the like). In the case of 1000 routers, for example, encoding the indices in an IBS may not be optimal as it may require a bit string of size 1024. For example, if the ILS includes an {index, label} for an index 1000, but the total number of such tuples is only 8, then the IBS alone consumes 128B, which is equivalent to use of 32 MPLS Labels to represent the indices for the 8 MPLS labels. In at least some example embodiments, as presented with respect to FIG. 8B, an index may be encoded as another label, so that {index, tuple} is a stack of two consecutive labels and, thus, N indices may be encoded using N pairs of index/tuple labels. As a result, for the example above in which there are only 8 indices that need to be communicated but one of them has a value of 1000, instead of the IBS of size equal to 32 MPLS labels, only 8 MPLS labels would be needed to represent the indices. For such applications, the encoding of the ILS also may include a top MPLS label including an ILSI field that is configured to indicate the presence of the ILS and a Number of Label Stacks (Num Stacks) field that is configured to indicate the number of {index, label} stacks that follow the ILSI and that are used to encode the indices. The Num Stacks field may be provided by reusing the 8-bit TTL field. Accordingly, the ILS 802 of FIG. 8B includes an ILSI followed by N pairs of {index, label} stacks.

It will be appreciated that, although an ILS may be encoded in various ways (e.g., as presented with respect to FIG. 8A and FIG. 8B or in various other ways), for purposes of clarity in describing various example embodiments, various example embodiments presented herein are primarily presented within the context of encoding of the ILS as presented with respect to FIG. 8A.

FIG. 9 depicts an example of an encoding of ILS in an MPLS packet based on the example ILS of FIG. 8A. The ILS 900 of FIG. 9 may be represented as {<index=10, label=2000>, <index=2, label=1200>, <index=28, label=7200>, <index=11, label=9000>}. The {index, label} tuples are sorted by their respective index fields, which are as follows: {<index=2, label=1200>, <index=10, label=2000>, <index=11, label=9000>, <index=28, label=7200>}. Since the maximum index value is 28, the indices can be encoded is an IBS of size 32-bit. So, the BSL in the ILSI is set to 1. The indices 2, 10, 11, and 28 are set into the IBS. The labels from the sorted tuples are pushed in the sorted order. With respect to finding the label corresponding to an index, it will be appreciated that, in FIG. 9, the absolute sequence number of bit position 11 is 3 and, thus, since the absolute sequence number is the index of the label in the label stack, the label corresponding to index 11 is the third label, which is 9000.

FIG. 10 depicts an example of an encoding of a VPN multicast packet that is multicast within the communication system of FIG. 1. FIG. 10 depicts the encoding of packet P5 in FIG. 5 that is multicast by the router 111 to the egress routers 110, 112, and 113 as {ML_102_1, ILS={<1, L2A>, <3, L2C>, <4, L2D>}, P5} to the router 102. The packet begins with the appropriate layer-2 header to reach the router 102. If the link 111→102 is of type Ethernet, then the Layer-2 header is an Ethernet Header that encodes the destination MAC address as a MAC address in the router 102. The Layer-2 header is followed by the label ML_102_1 of the P2MP LSP to its next-hop router 102. That label is followed by the ILS that encodes the {index, VPN-Label} tuples to the egress routers 110, 112, and 113. Since the maximum index in ILS is 4, an IBS of size 32-bit is used. Bits 1, 3, and 4 are encoded in the IBS. VPN labels are pushed into label stack by order of their respective indices. The label stack is followed by P5. Since VPN-Label L2D is the last label, the S-bit is set to 1.

It will be appreciated that the allocation of an index to a router may be performed in various ways. When an index is to be assigned to a router for any application, then an unused index (not assigned to any router) will be allocated from a network wide unique index space. Then the allocated index will be configured into the router. As discussed further below, there are two approaches for allocation and configuration of the index: dynamic configuration and static configuration.

In at least some example embodiments, a router can automatically configure the network wide unique index for itself, as well as learn the indices of other routers, when all the following conditions are satisfied: (1) VPN is the only application in the network that is assigning the indices to routers (i.e., PE routers), (2) each of the PE routers in VPN has a direct signaling session with each other (i.e., full mesh of signaling sessions), and (3) each PE router is using the same IP address for signaling sessions with all remote PE routers (it also means that the signaling protocol is based on IP or a transport layer that runs atop IP, such as TCP or UDP). From the full mesh of signaling sessions, a PE router knows the IP addresses of all remote PE routers. Then, a PE router sorts all remote PE routers, including itself, by ascending order of their IP addresses and accordingly assigns index 1 to index P, wherein P is the max number of PE routers. Thus, each PE router builds its own local copy of all PE→index mappings, which is consistent across the network (i.e., across all remote PE routers). It will be appreciated that this process may be further understood with respect to the following example.

For example, assume that, in FIG. 6, routers 110-113 are assigned the following IPv4 addresses that are also used to establish the signaling sessions: (1) 110=10.10.10.1, (2) 111=11.11.11.1, (3) 112=12.12.12.1, and (4) 113=13.13.13.1. So, each PE router sorts the IP addresses in the following order and accordingly assigns network wide unique indexes to all PE routers as follows: (1) 10.10.10.1=>index 1=>PE 110, (2) 11.11.11.1=>index 2=>PE 111, (3) 12.12.12.1=>index 3=>PE 112, and (4) 13.13.13.1=>index 4=>PE 113. It is noted that every time a new signaling session is established between two PE routers or an existing session is terminated, the procedure is run again at the PE routers for reassignment of index values. Since signaling sessions from a PE router to other PE routers are set up or torn down asynchronously, so in order to maintain consistency of index assignment across all PE routers a PE router may delay the reassignment of index values using a configured delay timer. An example embodiment of a procedure for dynamic configuration of indices at remote PE routers is presented in FIG. 11.

FIG. 11 depicts an example embodiment of a method for dynamic configuration of indexes at remote PE routers. It will be appreciated that, although primarily presented as being performed serially, at least a portion of the functions of method 1100 may be performed contemporaneously or in a different order than as presented with respect to FIG. 11. The method 1100 begins at block 1101. Block 1102 creates an empty list of IP addresses. The method 1100 then proceeds to block 1104. Block 1104 adds the IP address of the PE router used in signaling sessions for the VPN into the list of IP addresses. The method 1100 then proceeds to block 1106. Block 1106 retrieves the first remote PE router that has VPN sites. The method 1100 then proceeds to block 1108. Block 1108 adds the IP address of the remote PE router to the list of IP addresses. The method 1100 then proceeds to block 1110. Block 1110 makes a determination as to whether there are more remote PE routers with VPN sites. If there are more remote PE routers, then method 1100 proceeds to block 1112, otherwise, the method 1100 proceeds to block 1114. Block 1112 retrieves the next remote PE router and the method 1100 then returns to block 1108. Block 1114 is reached from block 1110 when there are no more remote PE routers, which means that the IP addresses of all remote PE routers and the IP address of the local PE router have been added to the list of IP addresses. Block 1114 sorts the list of IP addresses in ascending order by the values of the IP addresses. The method 1100 then proceeds to block 1116. Block 1116 assigns indexes to the entries in the list of IP addresses in ascending order, starting from the index value of 1. At block 1116, each PE router gets the network wide unique index. The method 1100 then proceeds to block 1118. Block 1118 programs the index of the local IP address in the forwarding plane. The forwarding plane will refer to this programmed index to process ILS encoded packets, i.e., to determine the {index, label} tuple targeted for this PE router. After block 1118, method 1100 proceeds to block 1199, where the method 1100 ends.

In at least some example embodiments, a router may be assigned an index based on an explicit (i.e., static) configuration of the indexes to the routers. A router participating in an application X may be assigned an index from a centralized database that maintains a network-wide unique index space of routers. The centralized database can be hosted and managed by an SDN controller, hosted and managed by a management system overseeing the configuration of the network, an offline database that is manually maintained, or the like. It will be appreciated that there could be other alternate methods for allocating a unique index to a PE router. Once the index is allocated, then it is configured into the router, which activates the applications that are dependent on the index. For example, when the application X is VPN, then the router is a PE router participating in VPNs. FIG. 12 below is the flowchart that illustrates the procedure. An example embodiment of a procedure for explicit configuration of indices at remote PE routers is presented in FIG. 12.

FIG. 12 depicts an example embodiment of a method for explicit configuration of indexes at remote PE routers. It will be appreciated that, although primarily presented as being performed serially, at least a portion of the functions of method 1200 may be performed contemporaneously or in a different order than as presented with respect to FIG. 12. The method 1200 begins at block 1201. The input to method 1200 is an identifier of the router (=Rtr) that is to be assigned a network wide unique index. In at least some embodiments, the identifier could be an IP address of the router. Block 1202 looks up the centralized database to determine if the Rtr is already assigned an index (e.g., for another application Y). The method 1200 then proceeds to block 1204. Block 1204 makes a determination as to whether the index is found for the router. If an index is found at block 1204, that means that there is no need to allocate the index, and application X can reuse the existing index, and the method 1200 proceeds to block 1299, where the method 1200 ends. If an index is not found in block 1204, then method 120 proceeds to block 1206. Block 1206 makes a determination as to whether there are unused indices in the centralized database. If no unused indices are available (which means that the index space has been exhausted and has reached its maximum utilization), then method 1200 proceeds to block 1212. Block 1212 declares a failure to allocate an index for Rtr and performs any required actions. After block 1212, method 1200 proceeds to block 1299, where the method 1200 ends. If the check at block 1206 finds unused indices available, then the method 1200 proceeds to block 1208. Block 1208 allocates the lowest unused index in the database to the router. The method 1200 then proceeds to block 1210. Block 1210 configures the index into the router. Block 1210 makes the index usable by the application X in the router and activates the application X (without the index, the application X won't be activated). After block 1210, method 1200 proceeds to block 1299, where the method 1200 ends.

Figure 13:
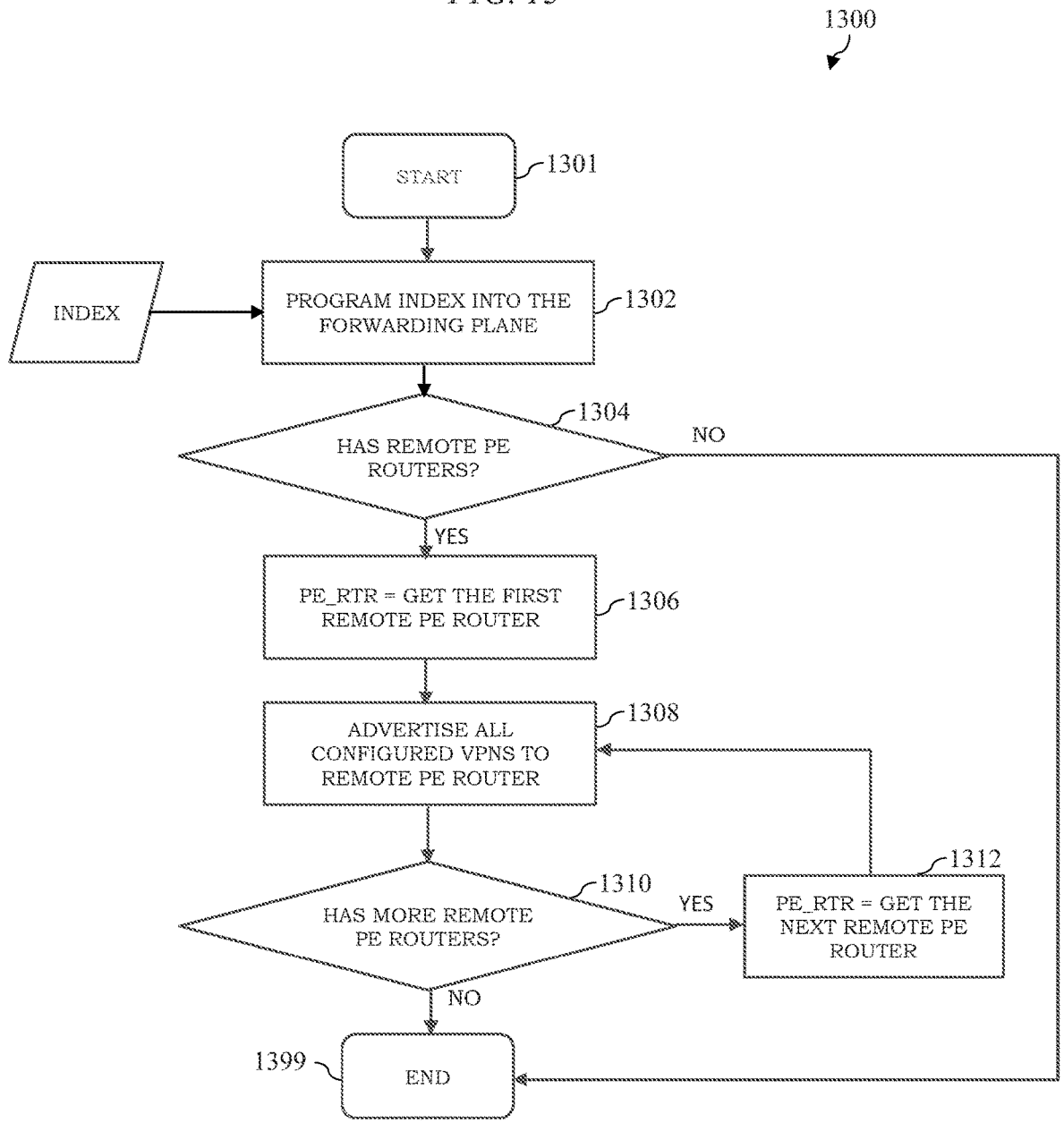
FIG. 13 depicts an example embodiment of a method for configuration of an index into a PE router.

FIG. 13 depicts an example embodiment of a method for configuration of an index into a PE router. It will be appreciated that method 1300 may be used when the application X that uses the router index is VPN. In method 1300, as discussed further below, the router index is programmed into the forwarding plane of the PE router and each VPN configured in the PE router is advertised with {index, VPN-Label} to the relevant remote PE routers over the respective signaling sessions. It will be appreciated that the method 1300 of FIG. 13 may be used as block 1210 of FIG. 12. It will be appreciated that, although primarily presented as being performed serially, at least a portion of the functions of method 1300 may be performed contemporaneously or in a different order than as presented with respect to FIG. 13. The method 1300 begins at block 1301. The input to method 1300 is the index allocated to the PE router. Block 1302 programs the index into the forwarding plane of the PE router. This enables the PE router to receive and process ILS packets now onwards. The method 1300 then proceeds to block 1304. Block 1304 checks if the PE router has any active VPN capable signaling sessions to at least one remote PE router. If there are no signaling sessions, then there is nothing more to do and the method 1300 proceeds to block 1399, where method 1300 ends; otherwise the method 1300 proceeds to block 1306. Block 1306 retrieves the first signaling session, which is already established to a remote PE router. The method 1300 then proceeds to block 1308. Block 1308 advertises all configured VPNs in the router to the signaling session. The method 1300 then proceeds to block 1310. Block 1310 checks if there are more active signaling sessions in the PE router. If block 1310 finds no more signaling sessions, then method 1300 proceeds to block 1399, where the method 1300 ends; otherwise method 1300 proceeds to block 1312. Block 1312 retrieves the next VPN capable signaling session to a remote PE router. From block 1312, method 1300 returns to block 1308, and subsequent blocks are repeated to evaluate all VPNs configured in the system to the signaling session.

Figure 14:
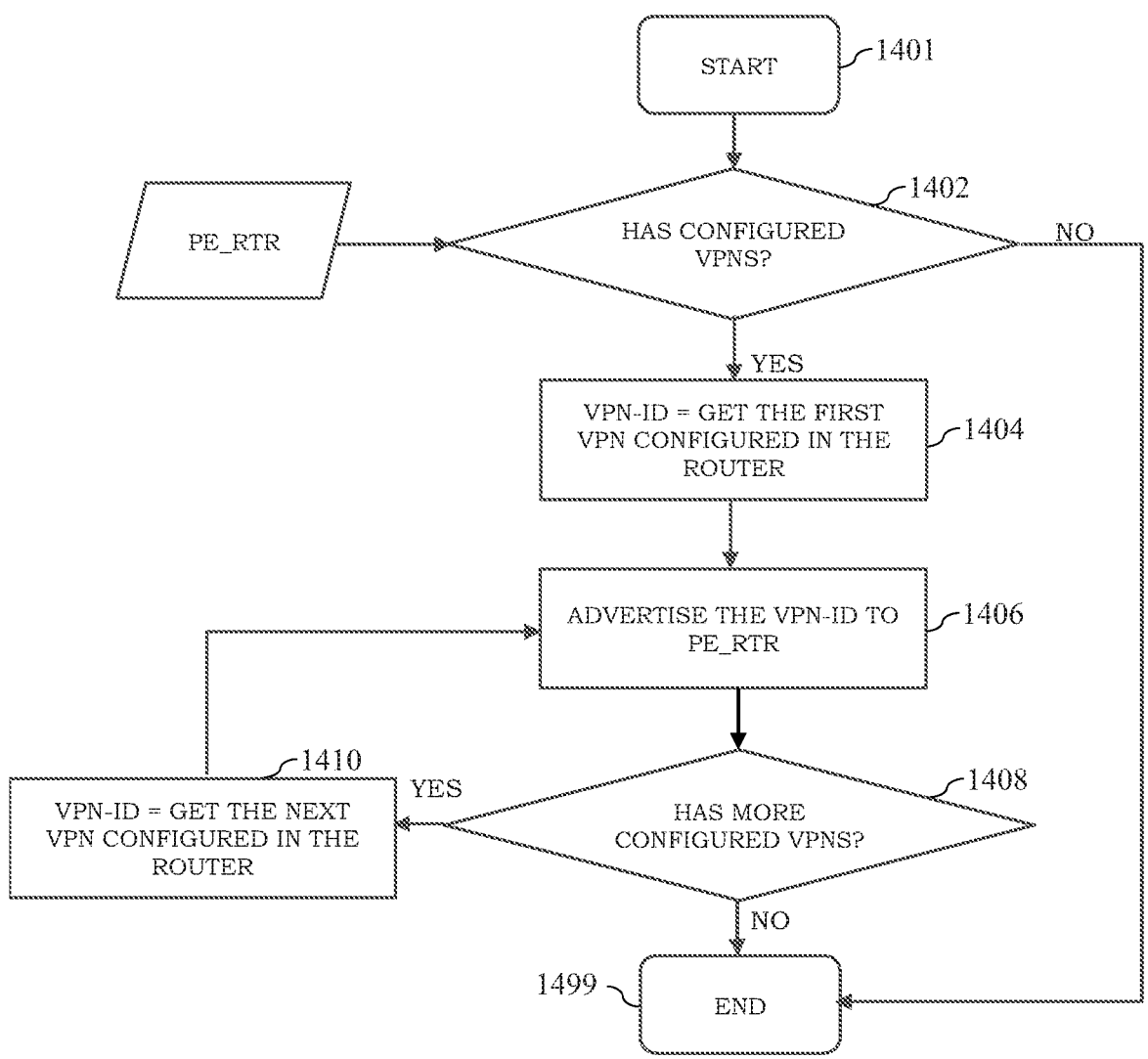
FIG. 14 depicts an example embodiment of a method for advertising configured VPNs on a signaling session.

FIG. 14 depicts an example embodiment of a method for advertising configured VPNs on a signaling session. It will be appreciated that the method 1400 of FIG. 14 may be used as block 1308 of FIG. 13. It also will be appreciated that the method 1400 of FIG. 14 may be executed by a PE router when a signaling session to remote PE router is established, such that all VPNs configured in the PE router may be advertised to the remote PE router. It will be appreciated that, although primarily presented as being performed serially, at least a portion of the functions of method 1400 may be performed contemporaneously or in a different order than as presented with respect to FIG. 14. The method 1400 begins at block 1401. The input to method 1400 is the remote PE router with which the PE router has a VPN capable signaling session. Block 1402 checks if there are any VPNs configured in the PE router. If no VPNs are configured in the PE router, then method 1400 proceeds to block 1499, where the method 1400 ends; otherwise the method 1400 proceeds to block 1404. Block 1404 retrieves the details of the first VPN configured in the PE router. The method 1400 then proceeds to block 1406. Block 1406 advertises the VPN over the signaling session to remote PE router. Then method 1400 then proceeds to block 1408. Block 1408 checks if there are more VPNs configured in the system. If yes, then method 1400 proceeds to block 1410, otherwise the method 1400 proceeds to block 1499, where the method 1400 ends. Block 1410 retrieves the details of the next VPN configured in the system. From block 1410, the method 1400 returns to block 1406, and the subsequent blocks are repeated for this VPN.

Figure 15:
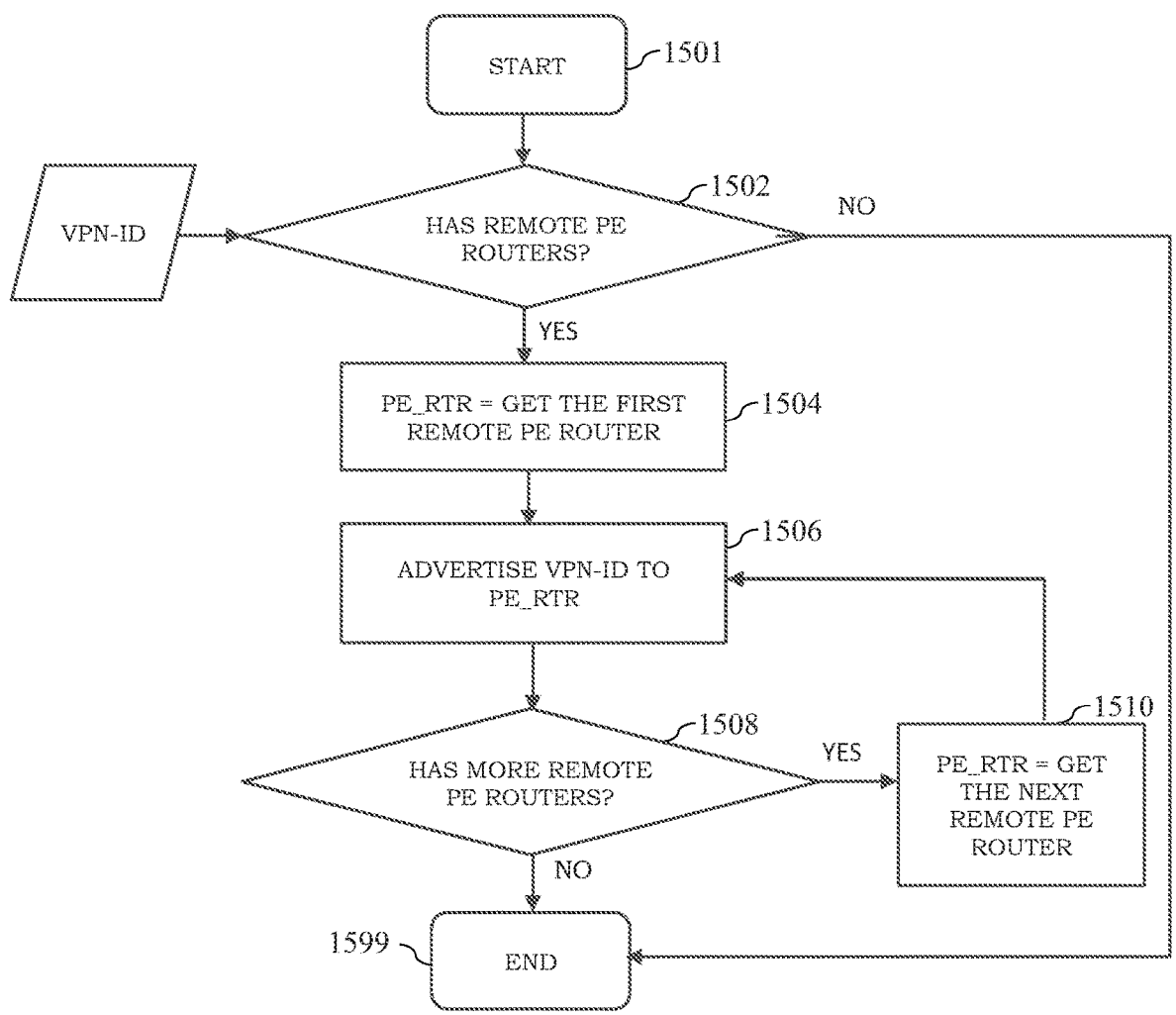
FIG. 15 depicts an example embodiment of a method for advertisement of a configured VPN by a PE router.

FIG. 15 depicts an example embodiment of a method for advertisement of a configured VPN by a PE router. It also will be appreciated that the method 1500 of FIG. 15 may be executed by a PE router when a VPN is configured at a PE router and needs to be advertised on all VPN capable signaling sessions. It will be appreciated that, although primarily presented as being performed serially, at least a portion of the functions of method 1500 may be performed contemporaneously or in a different order than as presented with respect to FIG. 15. The method 1500 begins at block 1501. The input to method 1500 is a VPN with its VPN-ID. Block 1502 checks if the PE router has any active VPN capable signaling sessions to at least one remote PE router. If there is no signaling session, then there is nothing more to do and the method 1500 proceeds to block 1599, where the method 1500 ends; otherwise, the method 1500 proceeds to block 1504. Block 1504 retrieves the first signaling session which is already established to a remote PE router. The method 1500 then proceeds to block 1506. Block 1506 advertises the VPNs on the signaling session. The method 1500 then proceeds to block 1508. Block 1508 checks if there are more active signaling sessions in the PE router. If block 1508 finds no more signaling sessions, then the method 1500 proceeds to block 1500 where the method 1500 ends; otherwise, the method 1500 proceeds to block 1510. Block 1510 retrieves the next VPN capable signaling session to a remote PE router. From block 1510, the method 1500 returns to block 1506, and subsequent blocks are repeated for the VPN on this signaling session.

Figure 16:
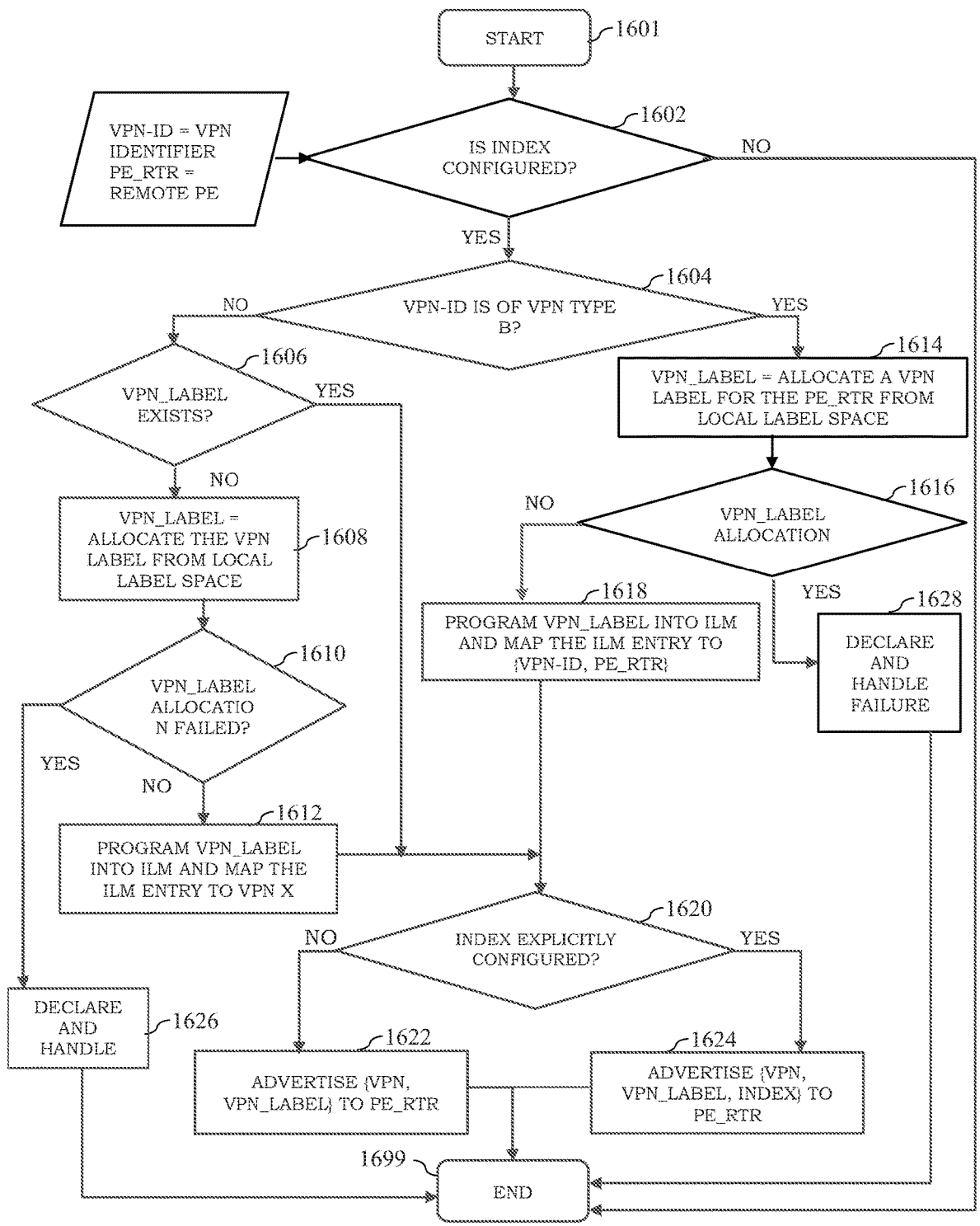
FIG. 16 depicts an example embodiment of a method for use by a PE router to advertise a configured VPN to a remote PE router over a signaling session.

FIG. 16 depicts an example embodiment of a method for use by a PE router to advertise a configured VPN to a remote PE router over a signaling session. It will be appreciated that the method 1600 of FIG. 16 may be used as block 1406 of FIG. 14 and as block 1506 of FIG. 15. It will be appreciated that the signaling session may be BGP, LDP, or the like. It will be appreciated that, although primarily presented as being performed serially, at least a portion of the functions of method 1600 may be performed contemporaneously or in a different order than as presented with respect to FIG. 16. The method 1600 begins at block 1601. The inputs to method 1600 are the VPN-ID and the remote PE Router.

Block 1602 checks if the local PE router is configured with an index. If not, then the VPN cannot be advertised and the method 1600 proceeds to block 1699, where the method 1600 ends; otherwise, the method 1600 proceeds to block 1604. Block 1604 checks if the VPN-ID is of VPN Type B (e.g., VPLS or the like). If the VPN-ID is not of VPN Type B, then the method 1600 proceeds to block 1606; otherwise, the method 1600 proceeds to block 1614.

Block 1606 (executed for non-VPN Type-B after block 1604) checks if a VPN-Label is already allocated for the VPN-ID (in VPN Type A, the same VPN-Label is advertised to all remote PE routers, so advertisement to the first PE router will only trigger allocation of the VPN-Label). If the VPN-Label not yet allocated, the method 1600 proceeds to block 1608; otherwise, the method 1600 proceeds to block 1620. Block 1608 allocates the VPN-Label, from the local label space, for the VPN-ID. The method 1600 then proceeds to block 1610. Block 1610 checks if the VPN-Label allocation has failed (e.g., there are no more free labels in the local label space or the like). If the VPN-Label allocation has not failed, then the method 1600 proceeds to block 1612; otherwise, the method 1600 proceeds to block 1626. Block 1612 programs the VPN-Label into the forwarding plane (i.e., ILM Table) and maps it to the context of the VPN-ID. The method 1600 then proceeds to block 1620. Block 1626 declares a failure in advertising the VPN due to label allocation failure and performs any required actions (e.g., shutting down the entire VPN or the like). After block 1626, method 1600 proceeds to block 1699, where the method 1600 ends.

Block 1614 (executed for VPN Type-B after block 1604) allocates a VPN-Label from the local label space (and it is noted that, in VPN Type-B, a VPN-Label is allocated for a VPN is specific to a remote PE router). Then the method 1600 proceeds to block 1616. Block 1616 checks if the VPN-Label allocation has failed (e.g., there are no more free labels in local label space or the like). If the VPN-Label allocation has not failed, then the method 1600 proceeds to block 1618; otherwise, the method 1600 proceeds to block 1628. Block 1618 programs the VPN-Label into the forwarding plane (i.e., ILM Table) and maps it to the context of {VPN-ID, Remote PE Router}. It is noted that, for VPN Type B, the VPN-Label is specific to the remote PE Router. The method 1600 then proceeds to block 1620. Block 1628 declares a failure in advertising the VPN due to label allocation failure and performs any required actions. After block 1628, method 1600 proceeds to block 1699, where the method 1600 ends.

Block 1620 checks if the index was configured explicitly. If the index was not configured explicitly (which means index was computed dynamically), then the method 1600 proceeds to block 1622; otherwise, the method 1600 proceeds to block 1624. Block 1622 advertises the mapping of VPN-ID to VPN-Label, to the remote PE router, using the methods of the protocol (e.g., BGP, LDP) used in the signaling session to the remote PE router. After block 1622, the method 1600 proceeds to block 1699, where the method 1600 ends. Block 1624 advertises the mapping of VPN-ID to {index, VPN-Label} to the remote PE router using the methods of the protocol (e.g., BGP, LDP) used in the signaling session to the remote PE router. It will be appreciated that block 1624 may support enhancements to signaling protocols to include the "index" while advertising a label. After block 1624, method 1600 proceeds to block 1699, where the method 1600 ends.

Figure 17:
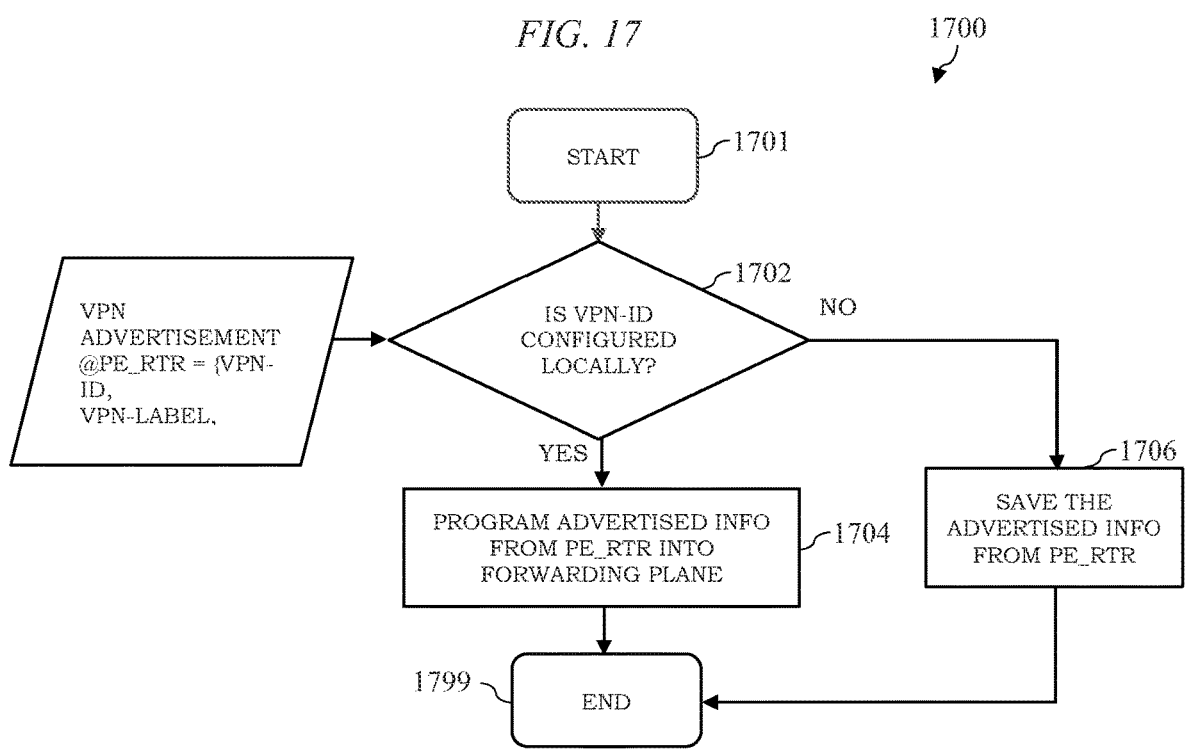
FIG. 17 depicts an example embodiment of a method for use by a PE router to process an advertisement of a VPN from a remote PE router.

FIG. 17 depicts an example embodiment of a method for use by a PE router to process an advertisement of a VPN from a remote PE router. It will be appreciated that, although primarily presented as being performed serially, at least a portion of the functions of method 1700 may be performed contemporaneously or in a different order than as presented with respect to FIG. 17. The method 1700 begins at block 1701. The input to method 1700 is the advertisement from the remote PE router that includes of the following: (1) PE-Rtr (the remote PE router from which the advertisement is received), (2) VPN-ID (the VPN Identifier), (3) VPN-Label (the label assigned for the VPN by the remote PE router from its local label space), and (4) Index (if present, the network wide unique index of the remote PE router). Block 1702 checks if the VPN is configured locally in the PE router. If the VPN is configured locally in the PE router, then the method 1700 proceeds to block 1704; otherwise, the method 1700 proceeds to block 1706. Block 1704 programs the advertised information in the forwarding plane, so that VPN packets to be sent to the remote/egress PE router can pick up the required VPN-Label/ILS from the forwarding plane. After block 1704, method 1700 proceeds to block 1799, where the method 1700 ends. Block 1706 saves the received advertisement for future use (i.e., when the VPN is configured locally). After block 1706, method 1700 proceeds to block 1799, where the method 1700 ends.

Figure 18:
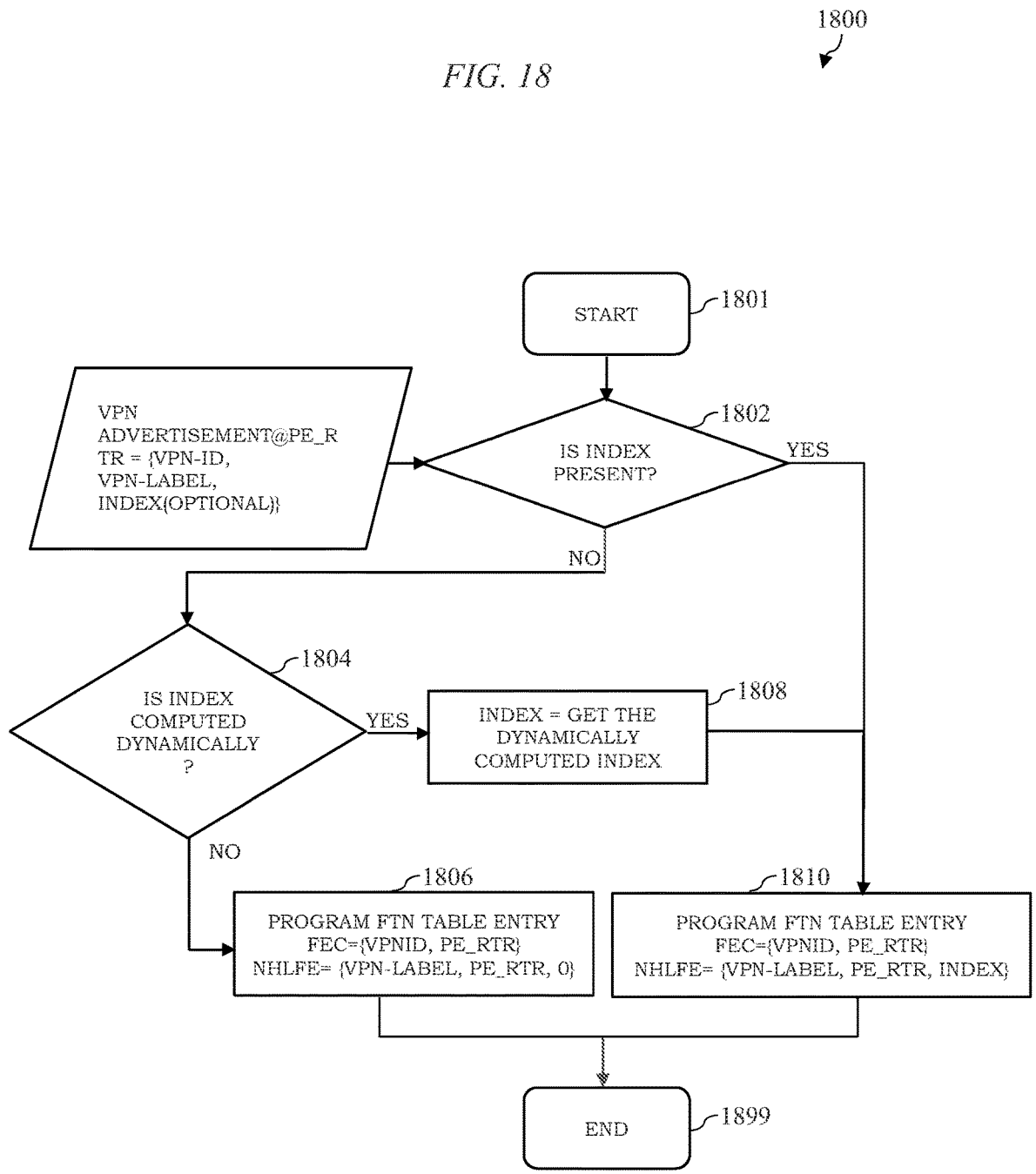
FIG. 18 depicts an example embodiment of a method for use by an ingress PE router to program an advertisement of a VPN from a remote PE router into a forwarding plane of the ingress PE router.

FIG. 18 depicts an example embodiment of a method for use by an ingress PE router to program an advertisement of a VPN from a remote PE router into a forwarding plane of the ingress PE router. It will be appreciated that the method 1800 of FIG. 18 may be used as block 1704 of FIG. 17. It will be appreciated that, although primarily presented as being performed serially, at least a portion of the functions of method 1800 may be performed contemporaneously or in a different order than as presented with respect to FIG. 18. The method 1800 begins at block 1801. The input to method 1800 is the advertisement from the remote PE router that includes of the following: (1) PE-Rtr (the remote PE router from which the advertisement is received), (2) VPN-ID (the VPN Identifier), (3) VPN-Label (the label assigned for the VPN by the remote PE router from its local label space), and (4) Index (if present, the network wide unique index of the remote PE router). Block 1802 checks if an index is present in the advertisement. If an index is present in the advertisement, then the method 1800 proceeds to block 1810; otherwise, the method 1800 proceeds to block 1804. Block 1804 checks if an index of the remote PE router is computed dynamically. If the index of the remote PE router is not computed dynamically, then the method 1800 proceeds to block 1806; otherwise, the method 1800 proceeds to block 1808. Block 1806, programs the FTN Table for the FEC={VPN-ID, PE_Rtr} with NHLFE={label=VPN-Label, Next-hop=PE_Rtr, index=0}; the index in NHLFE is 0 as there is no index. After block 1806, the method 1800 proceed to block 1899, where the method 1800 ends. Block 1808 gets the dynamically computed index for the remote PE router. The method 1800 then proceeds to block 1810. Block 1810 programs the FTN Table for the FEC={VPN-ID, PE_Rtr} with NHLFE={label=VPN-Label, Next-hop=PE_Rtr, index=Index}. After block 1810, method 1800 proceeds to block 1899, where the method 1800 ends.

Figure 19:
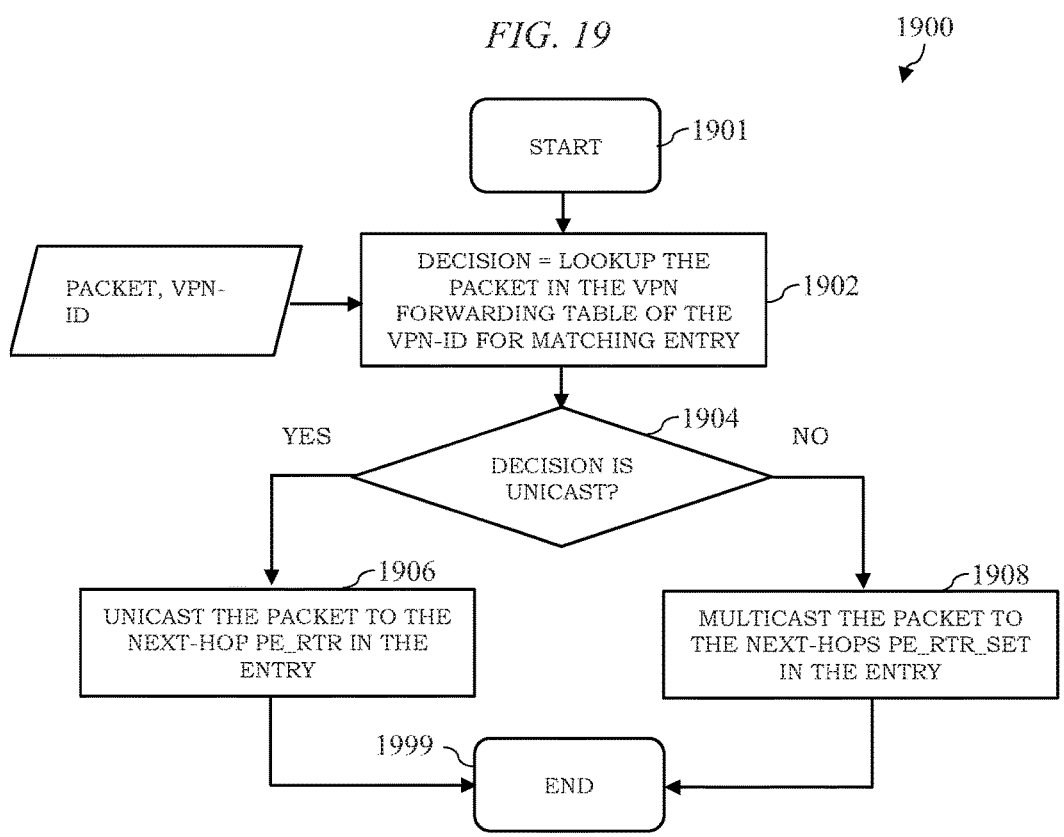
FIG. 19 depicts an example embodiment of a method for use by an ingress PE router to forward a packet in a VPN.

FIG. 19 depicts an example embodiment of a method for use by an ingress PE router to forward a packet in a VPN. It will be appreciated that the method 1900 may be executed after an incoming packet on an access link is classified to a VPN by the ingress PE router. It will be appreciated that, although primarily presented as being performed serially, at least a portion of the functions of method 1900 may be performed contemporaneously or in a different order than as presented with respect to FIG. 19. The method 1900 begins at block 1901. The inputs to method 1900 include (1) Packet (a packet received from a locally connected VPN site) and (2) VPN-ID (the identifier of the VPN associated with Packet, after classification of Packet to the VPN by the ingress PE router). Block 1902 looks up the destination address of the Packet in the Native VPN forwarding table (of the VPN-ID) to make a forwarding decision. The method 1900 then proceeds to block 1904. Block 1904 checks if the decision from block 1902 is unicast of the packet to a remote PE router or multicast of the packet to a set of remote PE routers. If the decision from block 1902 is unicast of the packet to a remote PE router, then the method 1900 proceeds to block 1906, where the packet is unicast to the remote PE router, and then proceeds to block 1999, where the method 1900 ends. If the decision from block 1902 is multicast of the packet to a set of remote PE routers, then the method 1900 proceeds to block 1908, where the packet is multicast to the set of remote PE router, and then proceeds to block 1999, where the method 1900 ends.

Figure 20:
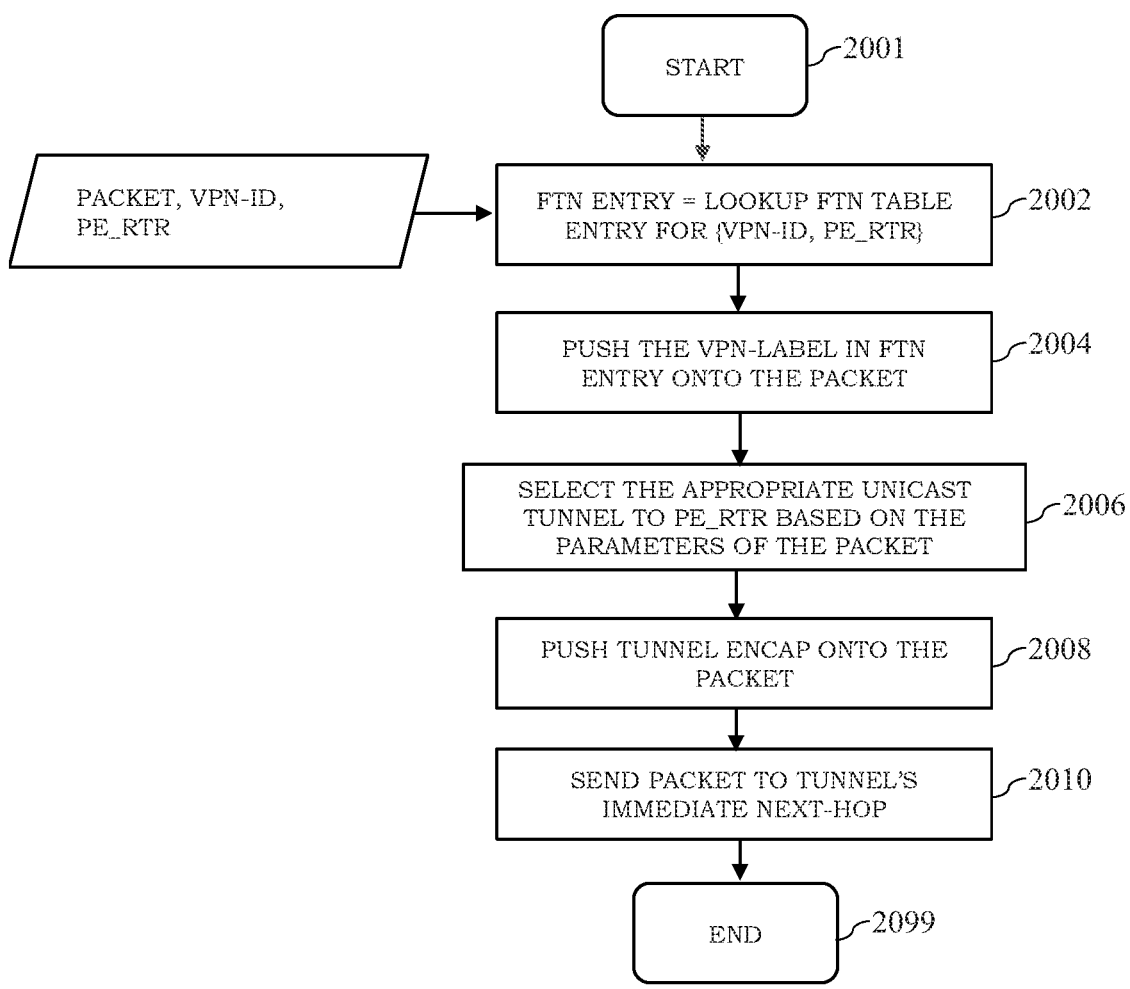
FIG. 20 depicts an example embodiment of a method for unicast of a VPN packet to a remote egress PE router.

FIG. 20 depicts an example embodiment of a method for unicast of a VPN packet to a remote egress PE router. It will be appreciated that the method 2000 of FIG. 20 may be used as block 1906 of FIG. 19. It will be appreciated that, although primarily presented as being performed serially, at least a portion of the functions of method 2000 may be performed contemporaneously or in a different order than as presented with respect to FIG. 20. The method 2000 begins at block 2001. The inputs to method 2000 include (1) Packet (a VPN packet to be unicast), (2) VPN-ID (an identifier of the VPN associated with Packet), and (3) PE_Rtr (the remote/egress PE router to which Packet is being unicast. Block 2002 looks up the entry in FTN Table that corresponds to the {VPN-ID, PE_Rtr}. The method 2000 then proceeds to block 2004. Block 2004 pushes the VPN-Label in the FTN entry onto the Packet. Block 2006 selects the appropriate unicast tunnel to the PE_Rtr. The selection could be based on a static configuration (e.g., the FTN entry of the VPN is linked to the tunnel) or the selection could be dynamic (e.g., the tunnel could be dynamically chosen from a set of available tunnels based on QoS requirements of the packet). It will be appreciated that various selection criteria are possible. The method 2000 then proceeds to block 2008. Block 2008 pushes the tunnel encapsulation onto the packet. The method 2000 then proceeds to block 2010. Block 2010 sends the packet to the immediate next-hop of the tunnel. After block 2010, method 2000 proceeds to block 2099, where the method 2000 ends.

Figure 21A:
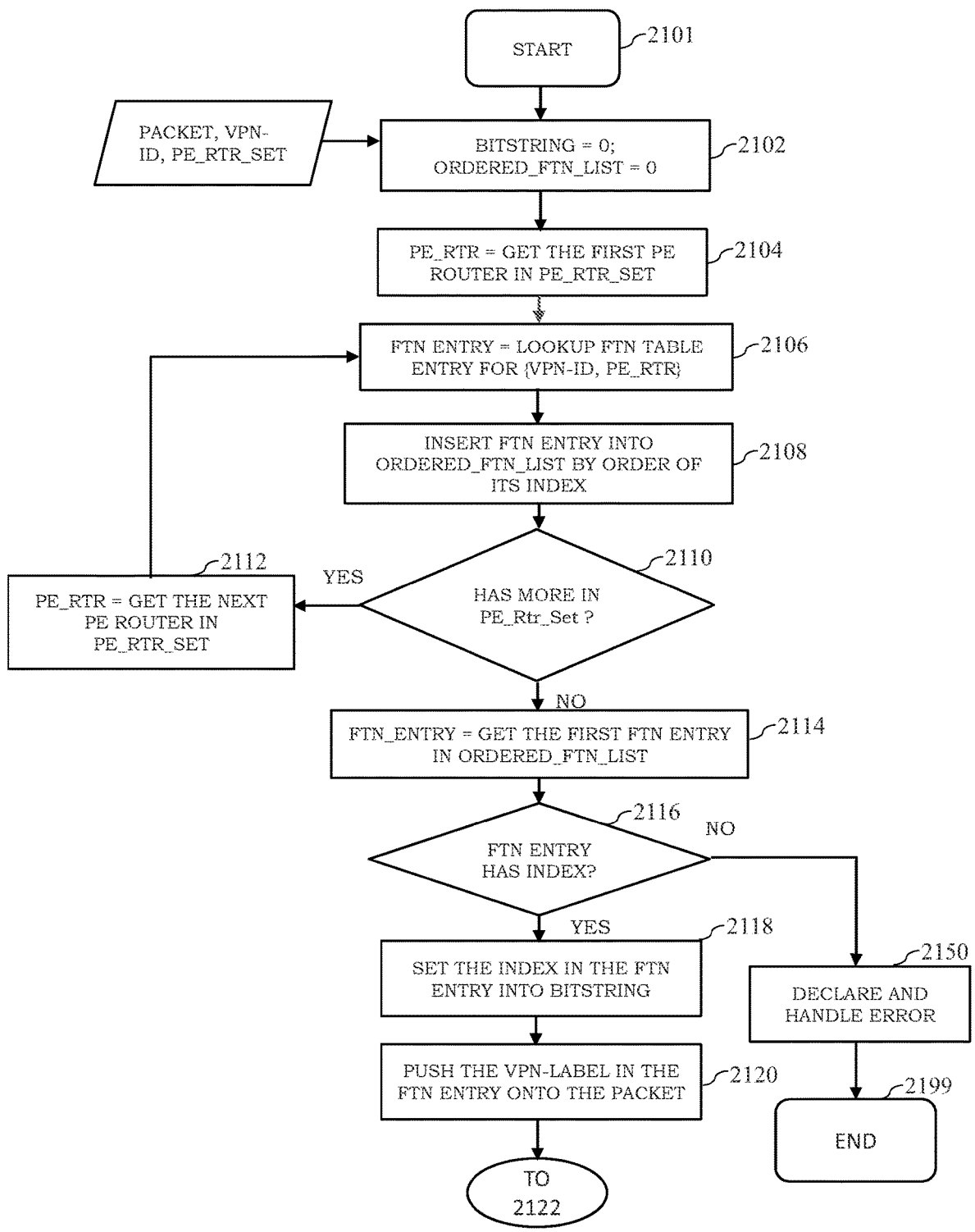
FIGS. 21A-21B depict an example embodiment of a method for multicast of a VPN packet to a set of remote egress PE routers.
Figure 21B:
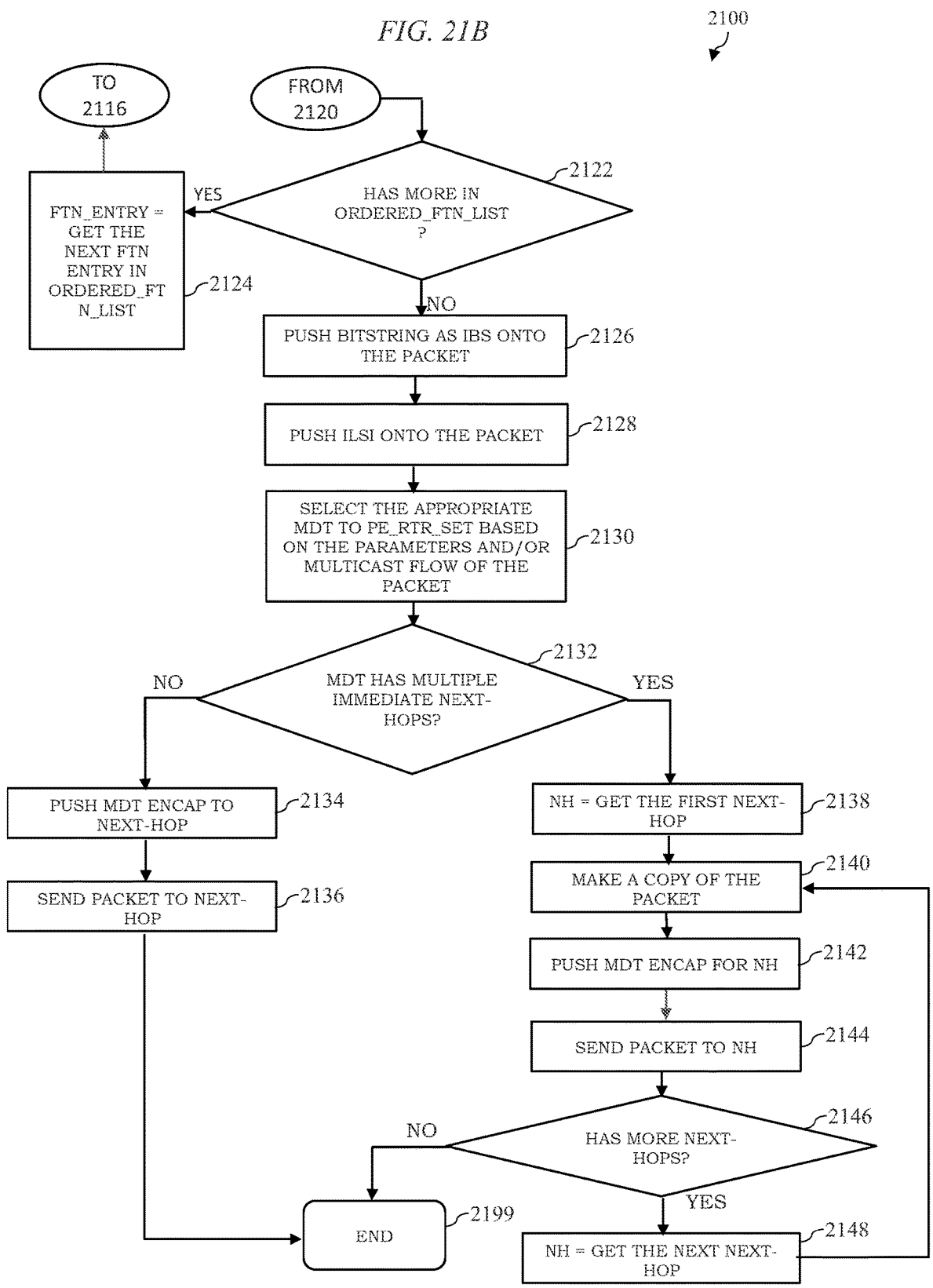

FIGS. 21A-21B depict an example embodiment of a method for multicast of a VPN packet to a set of remote egress PE routers. It will be appreciated that the method 2100 of FIGS. 21A-21B may be used as block 1908 of FIG. 19. It will be appreciated that, although primarily presented as being performed serially, at least a portion of the functions of method 2100 may be performed contemporaneously or in a different order than as presented with respect to FIGS. 21A-21B. The method 2100 begins at block 2101. The inputs to method 2100 include (1) Packet (a VPN packet to be multicast), (2) VPN-ID (an identifier of the VPN associated with Packet), and (3) PE_Rtr_Set (the set of remote/egress PE routers to which Packet is being multicast). It is noted that, in general, method 2100 encapsulates the VPN packet with the ILS that encodes the {index, VPN-Label} tuples of all egress PE routers and sends the packet on an MDT that has the egress PE routers as the leaves. It is further noted that, for purposes of clarity, method 2100 encodes the ILS in the format described in FIG. 8A; however, it will be appreciated that the ILS may be encoded in other formats (e.g., the format of FIG. 8B or any other suitable formats).

Block 2102 initializes an empty bit string and an empty list of FTN entries, wherein the FTN entries are to be inserted in "descending" order of the index associated with the label. The method 2100 then proceeds to block 2104. Block 2104 retrieves the first egress PE router in the PE_Rtr_Set. The method 2100 then proceeds to block 2106. Block 2106 looks up the FTN entry for the {VPN-ID, egress PE router}. The method 2100 then proceeds to block 2108. Block 2108 inserts the FTN entry into the ordered list of FTN entries, by the index associated with the label. The method 2100 then proceeds to block 2110. Block 2110 checks if there are more remote PE routers in PE_Rtr_Set. If there are more PE routers, then the method 2100 proceeds to block 2112; otherwise, the method 2100 proceeds to block 2114.

Block 2112 retrieves the next PE router in PE_Rtr_Set, and the method 2100 then returns to block 2106 to repeat the subsequent blocks for the next PE router. Block 2114 retrieves the first FTN entry in the list. The method 2100 then proceeds to block 2116. Block 2116 checks if the FTN entry is programmed with a non-zero index. If the FTN entry is not programmed with a non-zero index, then the packet is not multicast as it cannot encode its label in the ILS and the method 2100 proceeds to block 2150. Block 2150 declares that there was an error with multicasting the packet or performs an alternate ways of multicasting the packet (e.g., using ingress replication or the like). After block 2150, method 2000 proceeds to block 2199, where the method 2000 ends. If the FTN entry is programmed with a non-zero index, then the method 2100 proceeds to block 2118.

Block 2118 sets the bit position in the bit string, wherein the bit position is the value of the index associated with the label in the FTN entry. The method 2100 then proceeds to block 2120. Block 2120 pushes the VPN-Label in the FTN entry onto the packet. The EXP field in the VPN label is set to a value based on the QoS associated with packet. The value may be also specific to the egress PE router corresponding to the VPN-label. The TTL field in the VPN label may be set to a discretionary value that would minimize loop if any. The S-bit in the VPN label is set to 1 if this is the first VPN label being pushed and no other labels already exist atop the packet. The method 2100 then proceeds to block 2122. It is noted that the VPN-Label is now pushed in descending order so that VPN-Labels are encoded in ascending order from the top of the label stack. Block 2122 checks if there are more entries in the list of FTN entries. If there are more entries in the list of FTN entries, then the method 2100 proceeds to block 2124; otherwise, the method 2100 proceeds to block 2126. Block 2124 retrieves the next FTN Entry in the ordered list of FTN entries and the method 2100 then returns to block 2116, and subsequent blocks are repeated for the next FTN entry. Block 2126, which is reached when VPN-Labels to all egress PE routers have been pushed onto the packet and corresponding indices are set in the bit string, pushes the bit string as the IBS onto the packet. The method 2100 then proceeds to block 2128. Block 2128 pushes the ILSI onto the packet. The size of the IBS is encoded in the BSL field in ILSI. Block 2128 completes the encoding of ILS onto the packet. The method 2100 then proceeds to block 2130.

Block 2130 selects the appropriate MDT to the egress PE routers. The selection of the MDT can be based on the various parameters of the packet (e.g., QoS), statically configured for the multicast flow (in the native VPN Forwarding Table), or the like. It will be appreciated that various selection criteria are possible. The method 2100 then proceeds to block 2132. Block 2132 checks if the MDT has multiple immediate next-hops (means if packet needs to be replicated to multiple next-hops). If the MDT has multiple immediate next-hops, then the method 2100 proceeds to block 2138; otherwise, the method 2100 proceeds to block 2134. Block 2134 pushes the MDT encapsulation for the only immediate next-hop. The method 2100 then proceeds to block 2136. Block 2136 pushes the required layer-2 encapsulation to reach the immediate next-hop and sends the packet to the immediate next-hop. After block 2136, the method 2100 proceeds to block 2199, where the method 2100 ends. Block 2138 retrieves the first immediate next-hop of the MDT. It proceeds to block 2140. Block 2140 makes a copy of the packet, and then proceeds to block 2142. Block 2142 pushes the MDT encapsulation for the immediate next-hop. The method 2100 then proceeds to block 2144. Block 2144 pushes the required layer-2 encapsulation to reach the immediate next-hop and sends the packet to the immediate next-hop. The method 2100 then proceeds to block 2146. Block 2146 checks if there are more immediate next-hops in the MDT, to replicate the packet. If there are more immediate next-hops, then method 2100 proceeds to block 2148; otherwise, the method 2100 proceeds to block 2199, where the method 2100 ends. Block 2148 retrieves the next immediate next-hop of the MDT and the method 2100 then returns to block 2140 to repeat the subsequent blocks to send a copy of the packet to this next-hop.

It will be appreciated that the method 2100 may be modified in various ways (e.g., many of the blocks of method 2100 may be considered to be conceptual blocks which may be implemented in various ways). For example, the blocks 2104-2112 that perform the ordering of FTN entries by descending order of their indices associated with respective VPN-Labels may be modified in various ways, such as by using an implementation which may program an ordered list of FTN entries to a set of egress PE routers a priori, and then link that list to the multicast flow(s) in a VPN Forwarding Table, wherein the packets for the multicast flow(s) need to be multicast to that set of egress PE routers (e.g., in which case the method 2100 may start at block 2114). For example, an implementation may prebuild the ILS from the FTN entries of the set of egress PE routers and then simply link the ILS to the multicast flow(s) in a VPN Forwarding Table that multicasts packets to that set of egress PE routers (e.g., in which case the method 2100 may start at block 2130).

Figure 22:
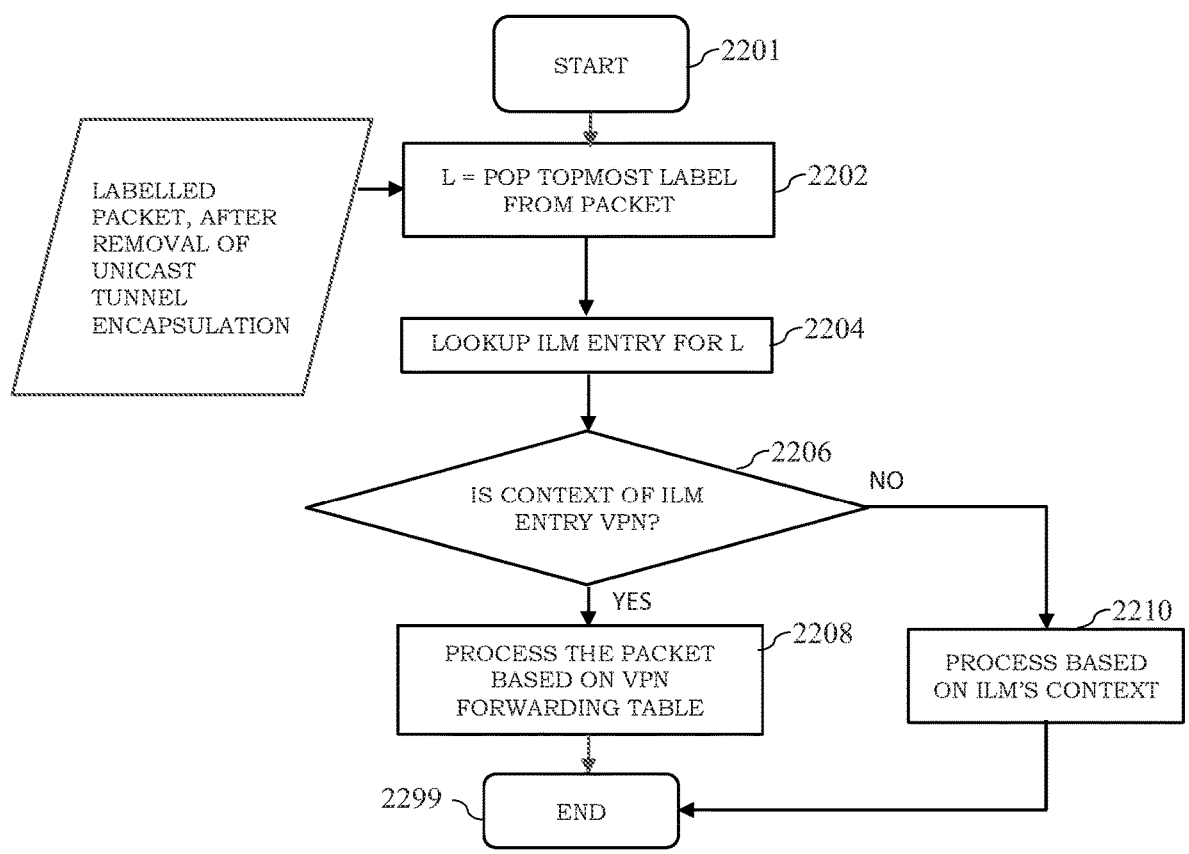
FIG. 22 depicts an example embodiment of a method for use by a PE router for processing a labeled unicast VPN packet received on a unicast tunnel which terminates at the PE router.

FIG. 22 depicts an example embodiment of a method for use by a PE router for processing a labeled unicast VPN packet received on a unicast tunnel which terminates at the PE router. It will be appreciated that, although primarily presented as being performed serially, at least a portion of the functions of method 2200 may be performed contemporaneously or in a different order than as presented with respect to FIG. 22. The method 2200 begins at block 2201. The input to method 2200 is the labeled packet after removal of unicast tunnel encapsulation. Block 2202 reads the topmost label value and then pops the label from the packet. The method 2200 then proceeds to block 2204. Block 2204 looks up the topmost label in the ILM Table. The method 2200 then proceeds to block 2206. Block 2206 checks if the context in the ILM entry is VPN. If the context in the ILM entry is not VPN, then the method 2200 proceeds to block 2210; otherwise, the method 2200 proceeds to block 2208. Block 2210 processes the packet based on the context of the ILM. Block 2208 looks up the VPN Forwarding Table to make a further forwarding decision of the packet and handle the packet accordingly. After block 2208, method 2200 proceeds to block 2299, where the method 2200 ends.

Figure 23A:
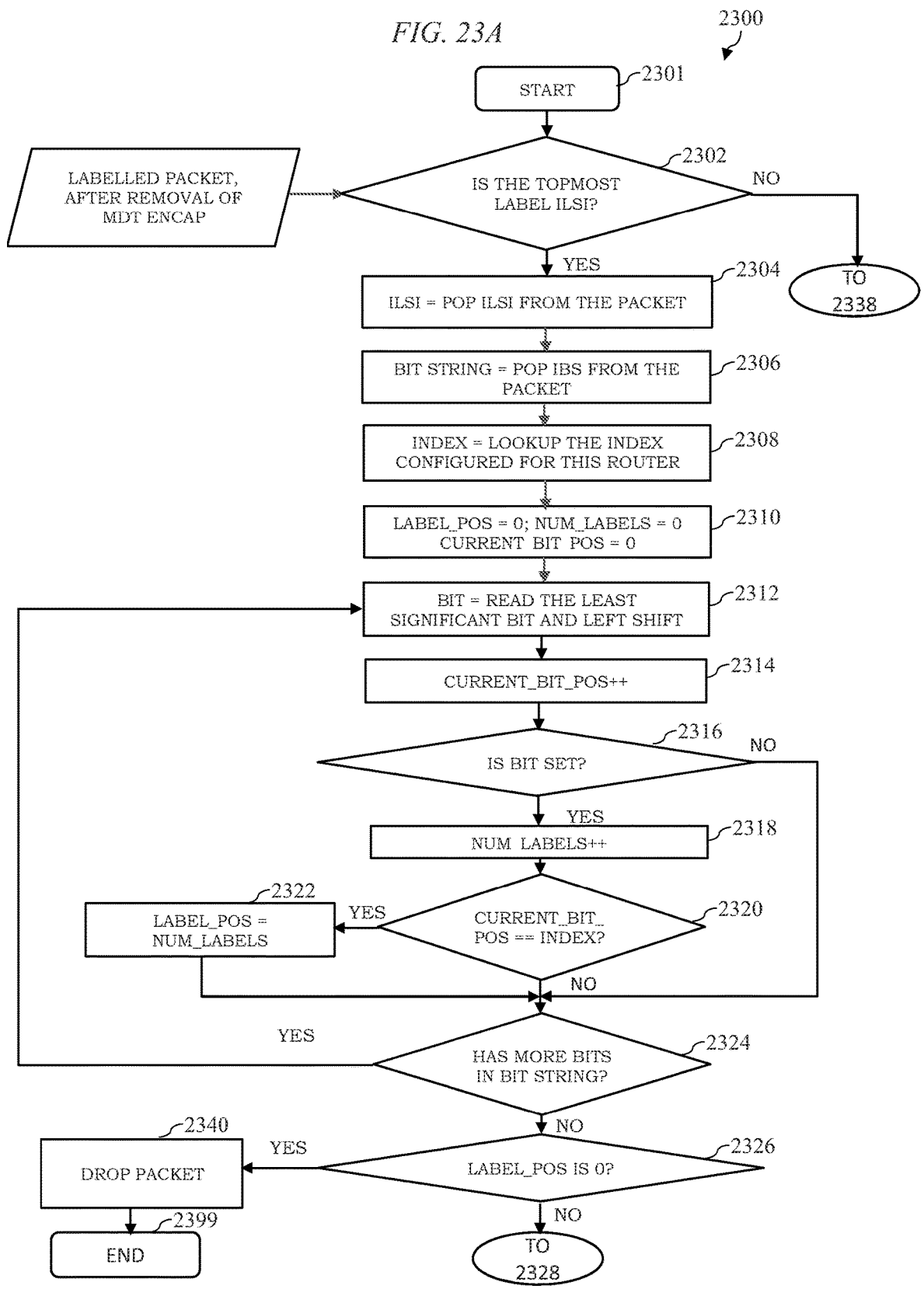
FIGS. 23A-23B depict an example embodiment of a method for use by a PE router for processing a labeled multicast VPN packet received on an MDT which terminates at the PE router.
Figure 23B:
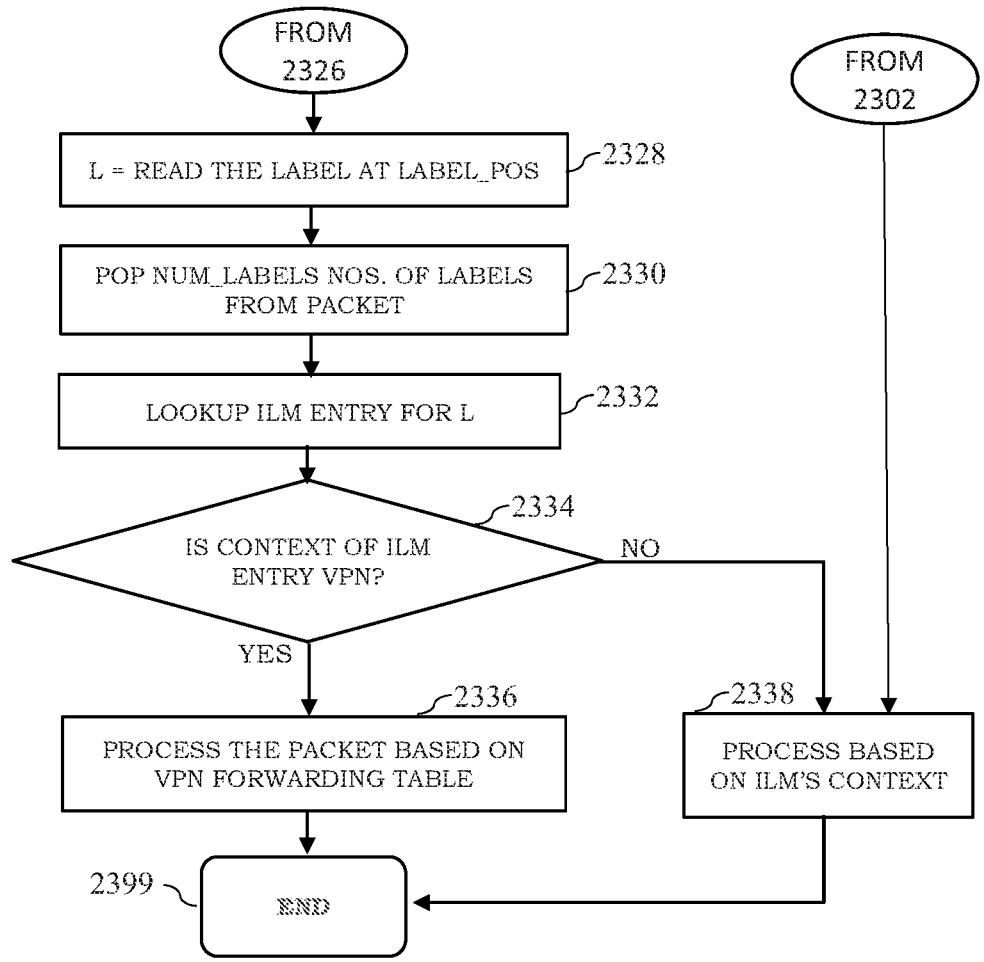

FIGS. 23A-23B depict an example embodiment of a method for use by a PE router for processing a labeled multicast VPN packet received on an MDT which terminates at the PE router. It will be appreciated that, although primarily presented as being performed serially, at least a portion of the functions of method 2300 may be performed contemporaneously or in a different order than as presented with respect to FIGS. 23A-23B. The method 2300 begins at block 2301. The input to method 2300 is the labeled packet after removal of MDT encapsulation. Block 2302 checks if the topmost label in the packet is ILSI. If the topmost label in the packet is not ILSI, then the method 2300 proceeds to block 2338; otherwise, the method 2300 proceeds to block 2304. Block 2304 is the starting point for processing the ILS on the packet. Block 2304 reads the ILSI and then pops the ILSI from the packet. The method 2300 then proceeds to block 2306. Block 2306 reads the IBS into a Bit String, based on the size of the IBS specified in BSL field of ILSI, and then pops the IBS from the packet leaving the label stack part of the ILS. The method 2300 then proceeds to block 2308. Block 2308 looks up the index configured on the PE router. The method 2300 then proceeds to block 2310. Block 2310 initializes the following local variables to help find the label in the label stack of ILS which corresponds to the configured router index: (1) Label_Pos (the index to the label in the label stack of ILS, that corresponds to the configured router index), (2) Num_Labels (the total number of labels in the label stack of ILS), and (3) Current_Bit_Pos (the running bit position while processing the Bit String (copied from IBS)). The method 2300 then proceeds to block 2312. Block 2312 reads the value in the least significant bit position in the Bit String and then shifts the BitString to the right by one-bit position. The method 2300 then proceeds to block 2314. Block 2314 increments the Current_Bit_Pos to update the number of bits read so far. The method 2300 then proceeds to block 2316. Block 2316 checks if the bit value read at block 2312 is set (e.g., equal to 1). If the bit value is not set, then the method 2300 proceeds to block 2324; otherwise, the method 2300 proceeds to 2318. Block 2318 increments Num_Labels to update the number of set bit positions read so far. The method 2300 then proceeds to block 2320. Block 2320 checks if the Current_Bit_Pos is equal to the index of the router. If the Current_Bit_Pos is equal to the index of the router, then the method 230 proceeds to block 2322; otherwise, the method 2300 proceeds to block 2324. Block 2322 sets the Label_Pos to Num_Labels (i.e., the sequence number of the Current_Bit_Pos among set bits). The Label_Pos is now the index of the label for this PE router in the label stack. The method 2300 then proceeds to block 2324. Block 2324 checks if there are more bit positions to process in the Bit String. If there are more bit positions to process in the Bit String, then the method 2300 returns to block 2312, and the subsequent blocks are executed for the next bit position. If there are no more bit positions to process in the Bit String, then the method 2300 proceeds to block 2326. Block 2326 checks if the value of Label_Pos is 0, which means if the bit position corresponding to the router index is set in the Bit String. If the value of Label_Pos is 0, then it means the ILS does not have any label for this router and the method 2300 proceeds to block 2340. Block 2340 drops the packet and the method 2300 then proceeds to block 2399, where the method 2300 ends. If the value of Label_Pos is not 0, then the method 2300 proceeds to block 2328. Block 2328 reads the label at Label_Pos in the label stack of the ILS. The method 2300 then proceeds to block 2330. Block 2330 pops the Num_Labels number of labels from the packet. At this point the entire ILS has been removed from the packet. The method 2300 then proceeds to block 2332. Block 2332 looks up the label read at block 2328 in the ILM Table. The method 2300 then proceeds to block 2334. Block 2334 checks if the ILM entry is programmed for a VPN context. If the ILM entry is programmed for a VPN context, then the method 2300 proceeds to block 2336; otherwise, the method 2300 proceeds to block 2338. Block 2338 processes the label based on its context in the ILM Table.

Figure 24:
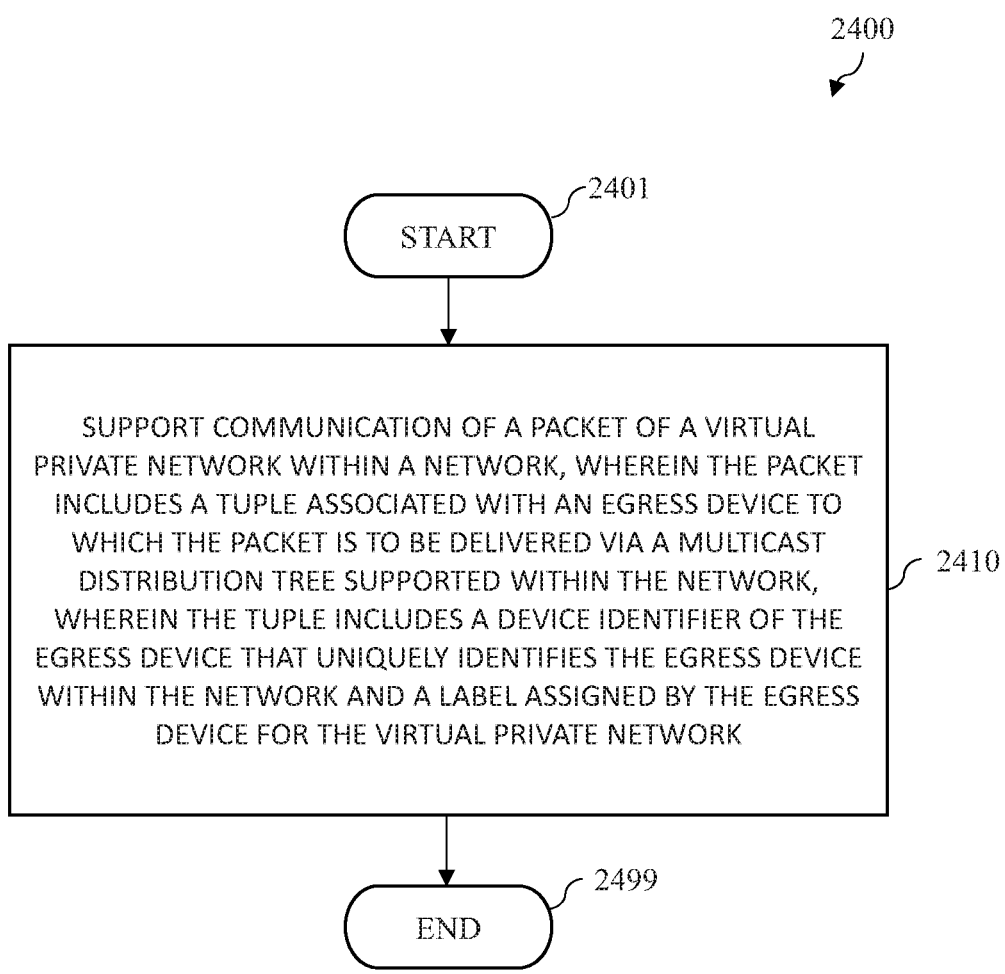
FIG. 24 depicts an example embodiment of a method for use by a network device to support communication of a packet.

FIG. 24 depicts an example embodiment of a method for use by a network device to support communication of a packet. It will be appreciated that, although primarily presented as being performed serially, at least a portion of the functions of method 2400 may be performed contemporaneously or in a different order than as presented with respect to FIG. 24. At block 2401, method 2400 begins. At block 2410, support communication of a packet of a virtual private network within a network, wherein the packet includes a tuple associated with an egress device to which the packet is to be delivered via a multicast distribution tree supported within the network, wherein the tuple includes a device identifier of the egress device that uniquely identifies the egress device within the network and a label assigned by the egress device for the virtual private network. At block 2499, method 2400 ends. It will be appreciated that various packet communication support functions presented herein with respect to FIGS. 1-23 may be incorporated within the context of method 2400 of FIG. 24.

Various example embodiments for supporting multicast communications of multiple VPNs over a single MDT may provide various advantages or potential advantages. For example, various example embodiments for supporting multicast communications of multiple VPNs over a single MDT may enable simplified N:1 aggregation of multicast packets from multiple VPNs on a single MDT without using an upstream assigned label space or upstream assigned labels (and, thus, obviating a need for PE routers to manage upstream assigned label spaces in addition to local label spaces) and without using Upstream ILM Tables (and, thus, obviating a need for PE routers to maintain additional forwarding state for Nx(M-1) entries which would otherwise be needed since there would be N number of VPNs among M number of PE routers such that the PE routers would need to maintain (M-1) number of upstream ILMs each containing N entries). Various example embodiments for supporting multicast communications of multiple VPNs over a single MDT may provide various other advantages or potential advantages.

Figure 25:
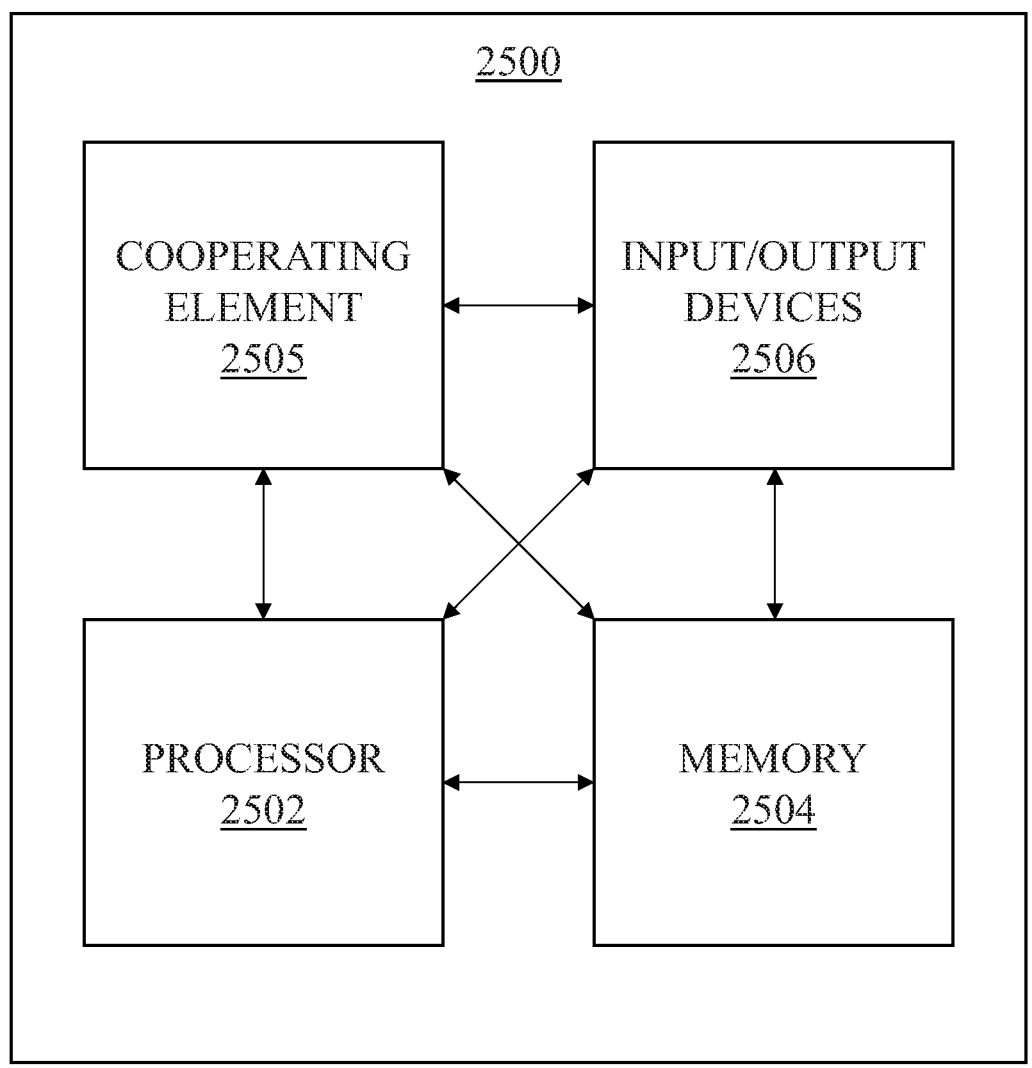
FIG. 25 depicts an example embodiment of a computer suitable for use in performing various functions presented herein.

FIG. 25 depicts an example embodiment of a computer suitable for use in performing various functions presented herein.

The computer 2500 includes a processor 2502 (e.g., a central processing unit (CPU), a processor, a processor having a set of processor cores, a processor core of a processor, or the like) and a memory 2504 (e.g., a random access memory, a read only memory, or the like). The processor 2502 and the memory 2504 may be communicatively connected. In at least some example embodiments, the computer 2500 may include at least one processor and at least one memory including computer program code, wherein the at least one memory and the computer program code are configured to, with the at least one processor, cause the computer to perform various functions presented herein.

The computer 2500 also may include a cooperating element 2505. The cooperating element 2505 may be a hardware device. The cooperating element 2505 may be a process that can be loaded into the memory 2504 and executed by the processor 2502 to implement various functions presented herein (in which case, for example, the cooperating element 2505 (including associated data structures) can be stored on a non-transitory computer-readable storage medium, such as a storage device or other suitable type of storage element (e.g., a magnetic drive, an optical drive, or the like)).

The computer 2500 also may include one or more input/output devices 2506. The input/output devices 2506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2500 may represent a general architecture and functionality suitable for implementing functional elements described herein, portions of functional elements described herein, or the like, as well as various combinations thereof. For example, computer 2500 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions that, when executed by the at least one processor, cause the apparatus to:
support communication of a packet of a virtual private network within a network, wherein the packet is intended for delivery to a set of egress devices via a multicast distribution tree supported within the network, wherein the packet includes an indexed label stack, wherein the indexed label stack includes at least one label encoding a set of indices uniquely identifying the respective egress devices within the network, wherein the indexed label stack includes a set of labels assigned by the respective egress devices to identify the virtual private network within the network, wherein the at least one label encoding the set of indices uniquely identifying the respective egress devices within the network includes an index bit string having a set of bit positions corresponding to a respective set of devices of the network, wherein ones of the bit positions corresponding to the respective egress devices are set to provide the set of indices uniquely identifying the respective egress devices within the network.

2. The apparatus of claim 1, wherein, for at least one of the egress devices, the respective index uniquely identifying the respective egress device within the network is based on a device identifier of the egress device that is determined by the egress device based on communication with at least one other egress device.

3. The apparatus of claim 1, wherein, for at least one of the egress devices, the respective index uniquely identifying the respective egress device within the network is based on a device identifier of the egress device that is determined by the egress device based on communication with a network controller.

4. The apparatus of claim 1, wherein the indices uniquely identifying the respective egress devices within the network are assigned from a unique index space of the network.

5. The apparatus of claim 4, wherein the unique index space of the network is based on a sorting of a respective set of addresses of a respective set of devices of the network.

6. The apparatus of claim 1, wherein the indexed label stack includes an indexed label stack identifier configured to indicate a presence of the indexed label stack within the packet.

7. The apparatus of claim 1, wherein the labels assigned by the egress devices to identify the virtual private network within the network are positioned within the indexed label stack based on respective positions of the indices of the egress devices within the index bit string.

8. The apparatus of claim 1, wherein the indexed label stack includes, for each of the egress devices, a respective label pair including a respective first label encoding the respective index uniquely identifying the respective egress device within the network and a respective second label encoding the respective label assigned by the respective egress device to identify the virtual private network within the network.

9. The apparatus of claim 1, wherein to support communication of the packet within the network, the instructions, when executed by the at least one processor, cause the apparatus to:
receive the packet at an ingress device of the network via an access link of the ingress device;
determine, based on the access link, that the packet is associated with the virtual private network; and
forward the packet from the ingress device of the network toward a second device of the network based on a next-hop label configured to identify the second device in the multicast distribution tree.

10. The apparatus of claim 9, wherein, to forward the packet, the instructions, when executed by the at least one processor, cause the apparatus to:
generate a multicast packet including the packet and including the next-hop label configured to identify the second device in the multicast distribution tree; and
forward the multicast packet from the ingress device of the network toward the second device of the network.

11. The apparatus of claim 1, wherein, to support communication of the packet within the network, the instructions, when executed by the at least one processor, cause the apparatus to:
receive, at a transit device of the network, a multicast packet including the packet and including a next-hop label identifying the transit device; and
forward the packet from the transit device toward a second device of the network.

12. The apparatus of claim 11, wherein, to forward the packet, the instructions, when executed by the at least one processor, cause the apparatus to:
determine, based on a lookup based on the next-hop label, a next-hop label identifying the second device;
create, based on the lookup based on the next-hop label, a copy of the multicast packet;
swap the next-hop label identifying the transit device with the next-hop label identifying the second device in the copy of the multicast packet to form thereby a new multicast packet; and
forward the new multicast packet from the transit device toward the second device based on the next-hop label identifying the second device.

13. The apparatus of claim 1, wherein to support communication of the packet within the network, the instructions, when executed by the at least one processor, cause the apparatus to:
receive the packet at one of the egress devices;
identify, based on the respective index uniquely identifying the one of the egress devices within the network, the respective label assigned by the one of the egress devices to identify the virtual private network within the network; and
forward the packet from the one of the egress devices based on the respective label assigned by the one of the egress devices to identify the virtual private network within the network.

14. The apparatus of claim 13, wherein, to forward the packet, the instructions, when executed by the at least one processor, cause the apparatus to:
determine, based on a lookup based on the respective label assigned by the one of the egress devices to identify the virtual private network within the network, that the packet is associated with the virtual private network; and
forward the packet network from the one of the egress devices based on a forwarding table of the virtual private network.

15. The apparatus of claim 1, wherein the multicast distribution tree is selected from a set of available multicast distribution trees of the network based on a determination that a set of leaf devices of the multicast distribution tree includes the set of egress devices to which the packet is to be delivered.

16. The apparatus of claim 1, wherein the instructions, when executed by the at least one processor, cause the apparatus to:
support communication of a second packet associated with a second virtual private network using the multicast distribution tree.

17. The apparatus of claim 1, wherein the instructions, when executed by the at least one processor, cause the apparatus to:
support communication of a second packet intended for delivery to one of the egress devices, wherein the second packet is a unicast packet of the virtual private network, wherein the second packet includes the respective label assigned by the one of the egress devices to identify the virtual private network within the network.

18. A non-transitory computer-readable medium storing instructions which, when executed by at least one processor of an apparatus, cause the apparatus to:
support communication of a packet of a virtual private network within a network, wherein the packet is intended for delivery to a set of egress devices via a multicast distribution tree supported within the network, wherein the packet includes an indexed label stack, wherein the indexed label stack includes at least one label encoding a set of indices uniquely identifying the respective egress devices within the network, wherein the indexed label stack includes a set of labels assigned by the respective egress devices to identify the virtual private network within the network, wherein the at least one label encoding the set of indices uniquely identifying the respective egress devices within the network includes an index bit string having a set of bit positions corresponding to a respective set of devices of the network, wherein ones of the bit positions corresponding to the respective egress devices are set to provide the set of indices uniquely identifying the respective egress devices within the network.

19. A method, comprising:

supporting communication of a packet of a virtual private network within a network, wherein the packet is intended for delivery to a set of egress devices via a multicast distribution tree supported within the network, wherein the packet includes an indexed label stack, wherein the indexed label stack includes at least one label encoding a set of indices uniquely identifying the respective egress devices within the network, wherein the indexed label stack includes a set of labels assigned by the respective egress devices to identify the virtual private network within the network, wherein the at least one label encoding the set of indices uniquely identifying the respective egress devices within the network includes an index bit string having a set of bit positions corresponding to a respective set of devices of the network, wherein ones of the bit positions corresponding to the respective egress devices are set to provide the set of indices uniquely identifying the respective egress devices within the network.

\* \* \* \* \*